US011425338B2

(12) United States Patent
Kang et al.

(10) Patent No.: US 11,425,338 B2
(45) Date of Patent: Aug. 23, 2022

(54) REFRIGERATOR, AND SYSTEM AND METHOD FOR CONTROLLING SAME

(71) Applicant: Samsung Electronics Co., Ltd., Suwon-si (KR)

(72) Inventors: Byoung Ik Kang, Suwon-si (KR); Seong Joo Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/979,586

(22) PCT Filed: Mar. 12, 2019

(86) PCT No.: PCT/KR2019/002851
§ 371 (c)(1),
(2) Date: Sep. 10, 2020

(87) PCT Pub. No.: WO2019/177343
PCT Pub. Date: Sep. 19, 2019

(65) Prior Publication Data
US 2021/0014461 A1 Jan. 14, 2021

(30) Foreign Application Priority Data

Mar. 13, 2018 (KR) .................. 10-2018-0028944
Feb. 27, 2019 (KR) .................. 10-2019-0023124

(51) Int. Cl.
*H04N 7/18* (2006.01)
*F25D 29/00* (2006.01)
(Continued)

(52) U.S. Cl.
CPC ............ *H04N 7/183* (2013.01); *F25D 29/00* (2013.01); *G06F 3/0488* (2013.01); *G06F 3/04842* (2013.01); *G06V 20/00* (2022.01)

(58) Field of Classification Search
CPC ...... H04N 7/183; H04N 7/18; G06K 9/00624; G06K 9/6274; G06K 2209/01; G06K 9/00;
(Continued)

(56) References Cited

U.S. PATENT DOCUMENTS

2011/0170787 A1* 7/2011 Gum .................. H04W 76/10
715/764
2014/0111487 A1* 4/2014 Wang ................. G06F 3/04186
345/178
(Continued)

FOREIGN PATENT DOCUMENTS

CN 107024073 A 8/2017
CN 107133650 A 9/2017
(Continued)

OTHER PUBLICATIONS

Extended European Search Report dated Mar. 3, 2021, issued in European Patent Application No. 19766651.4.

*Primary Examiner* — Thai Q Tran
*Assistant Examiner* — Nienru Yang
(74) *Attorney, Agent, or Firm* — Jefferson IP Law, LLP

(57) ABSTRACT

A food management system includes a computing apparatus, and a refrigerator including a storage chamber and configured to transmit an image of the storage chamber to the computing apparatus. The computing apparatus may include a communication device; and a processing device configured to identify a food from an image received from the refrigerator through the communication device and to transmit information related to the food identified by the refrigerator through the communication device. The processing device may identify the food using different processes from different images.

13 Claims, 49 Drawing Sheets

(51) Int. Cl.
    *G06F 3/04842*     (2022.01)
    *G06F 3/0488*     (2022.01)
    *G06V 20/00*     (2022.01)

(58) Field of Classification Search
    CPC .. F25D 29/00; F25D 2500/06; G06F 3/04842;
                                          G06F 3/0488
    USPC ........................................................ 348/143
    See application file for complete search history.

(56) References Cited

U.S. PATENT DOCUMENTS

| 2016/0057394 | A1* | 2/2016 | Marutani | H04N 1/00095 |
| | | | | 348/143 |
| 2016/0253779 | A1* | 9/2016 | Park | G06T 5/002 |
| | | | | 382/264 |
| 2017/0205138 | A1* | 7/2017 | Hwang | G06Q 10/087 |

FOREIGN PATENT DOCUMENTS

| JP | 2014-206290 A | 10/2014 |
| JP | 2015-169412 A | 9/2015 |
| KR | 10-2014-0127590 A | 11/2014 |
| KR | 10-1756620 B1 | 7/2017 |
| KR | 10-2018-0025041 A | 3/2018 |

* cited by examiner

FIG. 8

| ID | Name | Image |
|----|------|-------|
| 01 | Pineapple | Pineapple_1.jpg, Pineapple_2.jpg, |
| 02 | Grape | Grape_1.jpg, Grape_2.jpg, |
| 03 | Apple | Apple_1.jpg |
| 04 | Onion | Onion_1.jpg |

(a)

| ID | Name | Image |
|----|------|-------|
| 01 | Apple | Apple_2.jpg |

| SAMPLE IMAGE | FIRST IDENTIFICATION RESULT | SECOND IDENTIFICATION RESULT |
|---|---|---|
| $[x_1, y_1, h_1, v_1]$ (541) | – | – |
| $[x_2, y_2, h_2, v_2]$ (542) | TRIANGLE | SQUARE |
| $[x_3, y_3, h_3, v_3]$ (543) | CIRCLE | ELLIPSE |
| $[x_4, y_4, h_4, v_4]$ (544) | – | – |
| $[x_5, y_5, h_5, v_5]$ (545) | CIRCLE | PENTAGON |
| $[x_1, y_1, h_1, v_1]$ (546) | – | – |

| | | |
|---|---|---|
| 📷 Inside Fridge | | Food List |
| 🍍 | Pineapple | 10 days — 730 |
| 🥫 Tuna | Tuna | 1 year — 740 |
| 🍇 | Grape | 2 days — 750 |
| 🍎 | Apple | 10 days — 760 |
| 🍇 | Grape | 15 days — 770 |

View Inside

FIG. 49

REFRIGERATOR, AND SYSTEM AND METHOD FOR CONTROLLING SAME

TECHNICAL FIELD

The present disclosure relates to a refrigerator and control method thereof, and more particularly, to a food management system, computing apparatus, and refrigerator capable of identifying a food stored in the refrigerator.

BACKGROUND ART

Refrigerators are devices for storing things, such as groceries, drinks, etc., for a long time in an unspoiled state, and generally include a fridge chamber for keeping things refrigerated and a freezer chamber for keeping things frozen.

The refrigerator maintains the temperature of the storage chamber at a set target temperature by repeatedly executing a refrigeration cycle having compression, condensing, expansion, and evaporation of a refrigerant. In other words, the refrigerator supplies air that is cooled by an evaporator equipped in each of the storage chambers (the fridge chamber and/or the freezer chamber) to the storage chamber based on a target temperature for the storage chamber to maintain the temperature of the storage chamber.

Some of the recent refrigerators include a display for displaying temperatures of the storage chambers and operation modes of the refrigerator. Such a display provides a graphic user interface for the user so that the user may easily obtain information relating to the refrigerator and/or food therein using the graphic user interface and a touch panel and intuitively input a control command.

Especially, the refrigerator may display and manage information about foodstuffs stored in the storage chambers in response to a user input entered through the display.

It has been common for the user to input the information about foods stored in the storage chambers in person. Hence, the user has been bothered to change the information about a food whenever he/she put it in or took it out from the refrigerator.

DISCLOSURE

Technical Problem

The present disclosure provides a food management system, computing apparatus, and refrigerator capable of automatically identifying foodstuffs stored in the refrigerator.

The present disclosure also provides a food management system, computing apparatus, and refrigerator capable of identifying foodstuffs stored in the refrigerator based on machine learning.

The present disclosure also provides a food management system, computing apparatus, and refrigerator capable of providing various services for the user based on the food identified by machine learning.

Technical Solution

In accordance with an aspect of the disclosure, a refrigerator includes a storage chamber; a camera provided in the storage chamber; a touch detection display configured to receive a user's touch input; a communicator configured to communicate with an external device; and a controller configured to control the camera to capture the inside of the storage chamber, to display an inside image of the storage chamber on the touch detection display, to control the communicator to transmit the image to the external device, to receive identification information identified from the image from the external device through the communicator in response to the user's touch input, and to display the identification information on the touch detection display. The identification information may include identification information of a food identified from the image and location information of the identified food in the image. The controller may determine the food corresponding to the user's touch input based on the location information of the user's touch input and the location information of the identified food in the image, and display food information corresponding to the user's touch input on the detection display.

The location information of the identified food in the image may include locations of a plurality of sample images randomly selected from the image. The identification information of the food identified from the image may include the identification information of the food identified from the plurality of sample images.

The controller may select the sample image having a minimum distance from the user's touch input among the plurality of sample images.

The controller may display the identification information of the food identified from the selected sample image on the touch detection display.

The controller may display the selected sample image, a name of the food identified from the selected sample image, and a storage period of the food identified from the selected sample image on the touch detection display.

The identification information of the food identified from the selected sample image may include names of at least two foods. The controller may display at least two pieces of identification information on the touch detection display.

The controller may display any one identification information selected by the user among the at least two pieces of identification information on the touch detection display.

The controller may receive correction of the identification information identified from the image from the user through the touch detection display, and transmit the correction of the identification information identified from the image to the external device.

In accordance with another aspect of the disclosure, in a method of controlling a refrigerator, the refrigerator includes a storage chamber, and a camera provided in the storage chamber. The method includes capturing the inside of the storage chamber; displaying an inside image of the storage chamber on the touch detection display; transmitting the image to an external device; receiving identification information identified from the image from the external device in response to a user's touch input to the touch detection display; and displaying the identification information on the touch detection display. The identification information may include identification information of a food identified from the image and location information of the identified food in the image. The displaying of the identification information on the touch detection display may include determining the food corresponding to the user's touch input based on the location information of the user's touch input and the location information of the identified food in the image; and displaying food information corresponding to the user's touch input on the detection display.

The location information of the identified food in the image may include locations of a plurality of sample images randomly selected from the image. The identification information of the food identified from the image may include the identification information of the food identified from the plurality of sample images.

The determining of the food corresponding to the user's touch input may include selecting the sample image having a minimum distance from the user's touch input among the plurality of sample images.

The displaying of the identification information on the touch detection display may include displaying the identification information of the food identified from the selected sample image on the touch detection display.

The method may further include displaying the selected sample image, a name of the food identified from the selected sample image, and a storage period of the food identified from the selected sample image on the touch detection display.

The identification information of the food identified from the selected sample image may include names of at least two foods. The displaying of the identification information on the touch detection display may include displaying at least two pieces of identification information on the touch detection display.

The displaying of the identification information on the touch detection display may include displaying any one identification information selected by the user among the at least two pieces of identification information on the touch detection display.

In accordance with an aspect of the disclosure, a system includes a refrigerator; and a computing apparatus. The refrigerator may capture the inside of the storage chamber, display an inside image of the storage chamber on the touch detection display, transmit the image to the computing apparatus, receive identification information identified from the image from the computing apparatus in response to a user's touch input to the touch detection display, and display the identification information on the touch detection display. The computing apparatus may receive the inside image of the storage chamber from the refrigerator, randomly select a plurality of sample images from the image, identify a food from each of the plurality of sample images, and transmit location information of each of the plurality of sample images and identification information of the food identified from each of the plurality of sample images to the refrigerator.

The refrigerator may determine the food corresponding to the user's touch input based on location information of the user's touch input and the location information of each of the plurality of sample images.

The refrigerator may select the sample image having a minimum distance from the user's touch input among the plurality of sample images. The refrigerator may display the identification information of the food identified from the selected sample image on the touch detection display.

The refrigerator may display the selected sample image, a name of the food identified from the selected sample image, and a storage period of the food identified from the selected sample image on the touch detection display.

In accordance with an aspect of the disclosure, a food management system includes a server device, and a refrigerator that includes a storage chamber and transmits an image of the storage chamber to the server device. The server device, the communication unit, and a processing unit that identifies food from the image received from the refrigerator through the communication unit and transmits information related to the identified food to the refrigerator through the communication unit. The processing unit may identify food products from different images using different processes.

The processing device may identify a food area based on a difference between the received image of the storage chamber and a reference image, and identify a food from an image of the food area.

The processing device may identify a food by identifying a letter when the letter is extracted from the received image of the storage chamber.

The processing device may divide the received image of the storage chamber into a plurality of areas according to a change in color of the received image of the storage chamber, and identify a food from the plurality of areas.

The processing unit may include an identification engine machine-learned in advance, and may identify food from the received image by using the food identification engine.

The refrigerator may display information related to the identified food and receive a correction input for the information related to the identified food from a user.

The processing unit may receive the user's correction input, and machine-learn the identification engine again using the user's correction input.

The refrigerator may identify a change area from a difference between a first image of the storage room at a first time point and a second image of the storage room at a second time point, and may transmit the change region to the server device in order to identify the food in the change region.

In accordance with an aspect of the disclosure, a food management method includes obtaining an image of the storage chamber by photographing the interior of the storage compartment; identifying food from the image of the storage chamber using a previously machine-learned identification engine; and displaying information related to the identified food. The identifying of the food product may include identifying the food product using different processes from different images.

The identifying of the food may include identifying a food area based on a difference between the image and a reference image, and identifying food from the image of the food area.

The identifying of the food may include identifying the food by identifying the character when the character is extracted from the image.

The identification of the food may include dividing the image of the storage chamber into a plurality of regions according to a change in color of the image and identify the food from the plurality of areas.

The food management method may further include receiving a correction input for information related to the identified food from a user.

The food management method may further include machine learning the identification engine again by using the user's correction input.

The food management method further includes identifying a change area from a difference between a first image of the storage chamber at a first time point and a second image of the storage chamber at a second time point, and identifying the food product in the change area.

In accordance with an aspect of the disclosure, a refrigerator includes a display; storage chamber; a camera provided in the storage chamber; and a controller configured to control the camera to photograph the storage chamber, identify food stored in the storage chamber from the image of the storage chamber, and display information related to the identified food on the display device. The control unit may identify food using different processes from different images.

The control unit may include an identification engine machine-learned in advance, and may identify food from an image of the storage chamber using the food identification engine.

The controller may identify a food area based on a difference between the image of the storage chamber and a reference image, and identify a food from an image of the food area.

The controller may identify a food by identifying a letter when the letter is extracted from the image of the storage chamber.

The controller may divide the received image into a plurality of areas according to a change in color of the image of the storage chamber, and identify a food from the plurality of areas.

Advantageous Effects

According to embodiments of the disclosure, a food management system, computing apparatus, and refrigerator capable of automatically identifying foodstuffs stored in the refrigerator may be provided.

According to embodiments of the disclosure, a food management system, computing apparatus, and refrigerator capable of identifying foodstuffs stored in the refrigerator based on machine learning may be provided.

According to embodiments of the disclosure, a food management system, computing apparatus, and refrigerator capable of providing various services for the user based on the food identified by machine learning may be provided.

DESCRIPTION OF DRAWINGS

FIG. 8 shows data stored in a computing apparatus, according to an embodiment.

FIGS. 16 and 17 show another example of object identification by an object identification engine included in a computing apparatus, according to an embodiment.

FIG. 30 shows an example of displaying information relating to an additional food, according to the food identification method shown in FIG. 28.

FIGS. 48 and 49 show an example of providing a recipe according to the method of providing a recipe shown in FIG. 47.

BEST MODE

Figure 1:
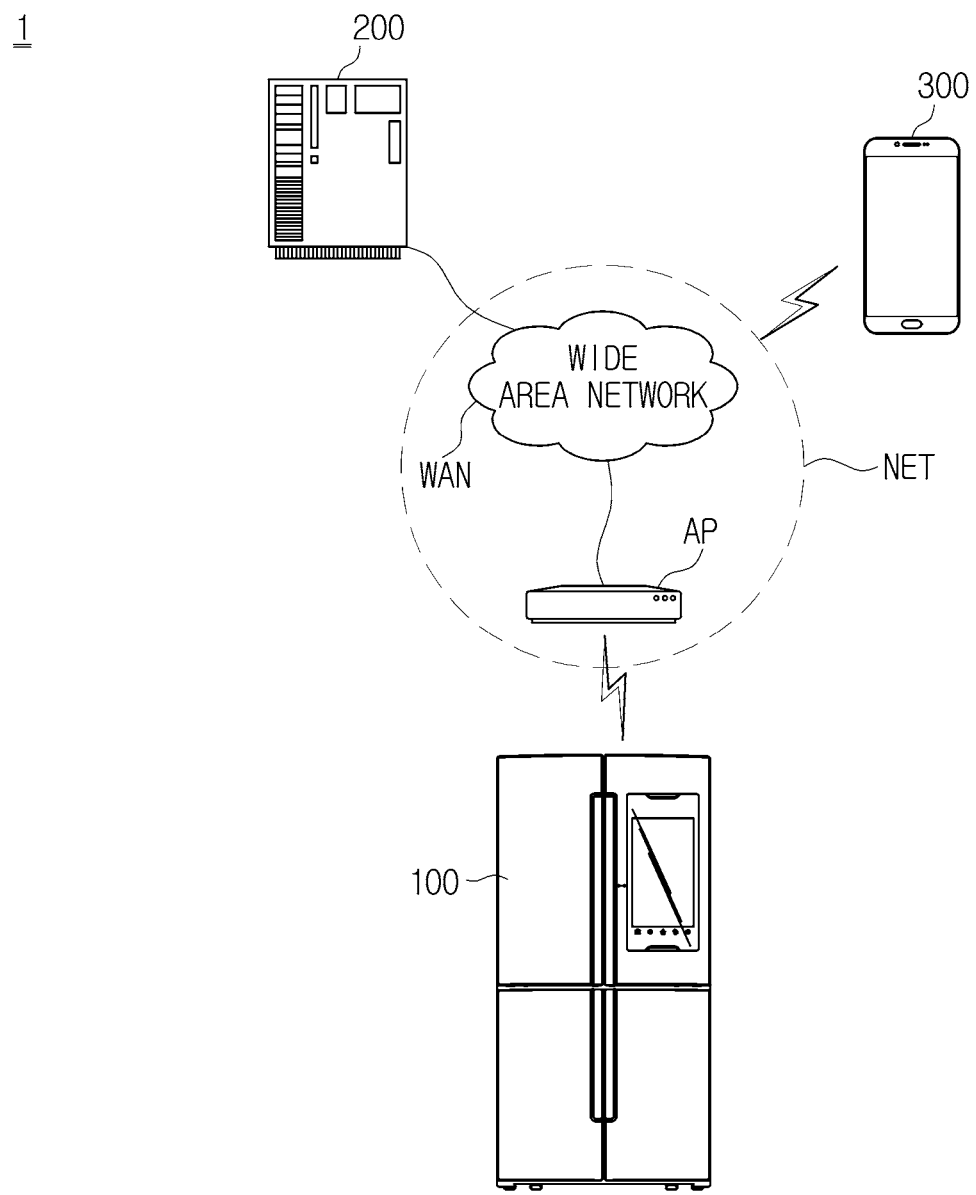
FIG. 1 shows a food management system, according to an embodiment.

In the following description, like reference numerals refer to like elements throughout the specification. This specification does not describe all elements of the embodiments, and in the technical field to which the present invention pertains, there is no overlap between the general contents or the embodiments. Terms such as "unit," "module," "member," and "block" may be embodied as hardware or software. According to embodiments, a plurality of "units," "modules," "members," or "blocks" may be implemented as a single component or a single "unit," "module," "member," or "block" may include a plurality of components.

In all specifications, it will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

Throughout the specification, when one member is positioned "on" another member, this includes not only the case where one member abuts another member, but also the case where another member exists between the two members.

The terms first, second, etc. are used to distinguish one component from another component, and the component is not limited by the terms described above.

An expression used in the singular form encompasses the expression of the plural form, unless it has a clearly different meaning in the context.

The reference numerals used in operations are used for descriptive convenience and are not intended to describe the order of operations and the operations may be performed in an order different unless otherwise stated.

Hereinafter, embodiments of the present disclosure will be described with reference to the accompanying drawings.

FIG. 1 shows a food management system, according to an embodiment.

Referring to FIG. 1, a food management system 1 includes a refrigerator 100 for storing food, a computing apparatus 200 for identifying (or recognizing) foodstuffs stored in the refrigerator 100, and user equipment (UE) 300 for providing the user with information relating identified (or recognized) food.

The refrigerator 100, the computing apparatus 200, and the UE 300 included in the food management system 1 may be connected through a communication network NET. The communication network NET may include both a wired communication network and a wireless communication network. The wired communication network may include a cable network or a telephone network, and the wireless communication network may include a communication network for transmitting and receiving signals in radio waves. The wired communication network and the wireless communication network may be linked to each other. For example, the wired communication network may include a wide area network (WAN) such as the Internet, and the wireless communication network may include an access point (AP) connected to the WAN.

The refrigerator 100 may keep foods refrigerated or frozen. For example, the refrigerator 100 may include a storage chamber for accommodating foods and a cooling device for cooling the storage chamber. The refrigerator 100 may use the cooling device to supply cool air to the storage chamber in order to prevent the food stored in the storage chamber from going bad.

The refrigerator 100 may provide the user with information relating to the food stored in the storage chamber in response to a request of the user. For example, the refrigerator 100 may take a picture of the storage chamber with food stored therein, and thus obtain the image of the inside of the storage chamber. To obtain information relating to a food stored in the storage chamber, the refrigerator 100 may transmit the image of the inside of the storage chamber to the computing apparatus 200 over the communication network NET. Furthermore, the refrigerator 100 may receive information relating to the food stored in the storage chamber (food-related information) from the computing apparatus 200, and display or transmit the received food-related information to the UE 300.

The computing apparatus 200 may process data received from another device over the communication network NET, and store or transmit the processed data to the other device. For example, the computing apparatus 200 may include a communication device for communicating with another device, a processing device for processing data, and a storage medium for storing the processed data. The computing apparatus 200 may be interchangeably called a server, a client, a workstation, a personal computer, a clod, a data drive, a data station, etc.

The computing apparatus 200 may include an object recognition algorithm for identifying an object. For example, the computing apparatus 200 may include an object recognition algorithm that may identify an object based on machine learning.

The computing apparatus 200 may receive the image of the inside of the storage chamber from the refrigerator 100 over the communication network NET, and identify a food included in the image of the inside of the storage chamber, i.e., a food stored in the storage chamber. Furthermore, the computing apparatus 200 may store information relating to the identified food or transmit the information to the refrigerator 100 and/or the UE 300. The information relating to the identified food may include an image, name, category, shelf life, etc., of the identified food.

The UE 300 may process data received from another device over the communication network NET, and display the processed data to the user. Especially, the UE 300 may be carried by the user or arranged at the user's home or office, so the user may easily access the UE 300. The UE 300 may be interchangeably called a workstation, a personal computer, a terminal, a portable telephone, a smart phone, a handheld device, a wearable device, etc.

The UE 300 may receive the information relating to a food stored in the refrigerator 100 from the refrigerator 100 and/or the computing apparatus 200, and display the information relating to the food stored in the refrigerator 100. For example, the UE 300 may display a name, category, shelf life, etc., of a food stored in the refrigerator 100.

As described above, the food management system 1 may obtain an image of the inside of the storage chamber of the refrigerator 100 by taking a picture of the storage chamber, and identify a food included in the image of the inside of the storage chamber. In other words, the food management system 1 may use an image of the inside of the storage chamber to identify a food stored in the storage chamber. In addition, the food management system 1 may provide information relating to food stored in the storage chamber based on the identification result.

Consequently, without receiving information relating to a food stored in the refrigerator 100 from the user, the refrigerator 100 may identify the food using the computing apparatus 200 and thus obtain the information relating to the food.

A configuration and operation of the refrigerator 100 included in the food management system 1 will now be described.

Figure 2:
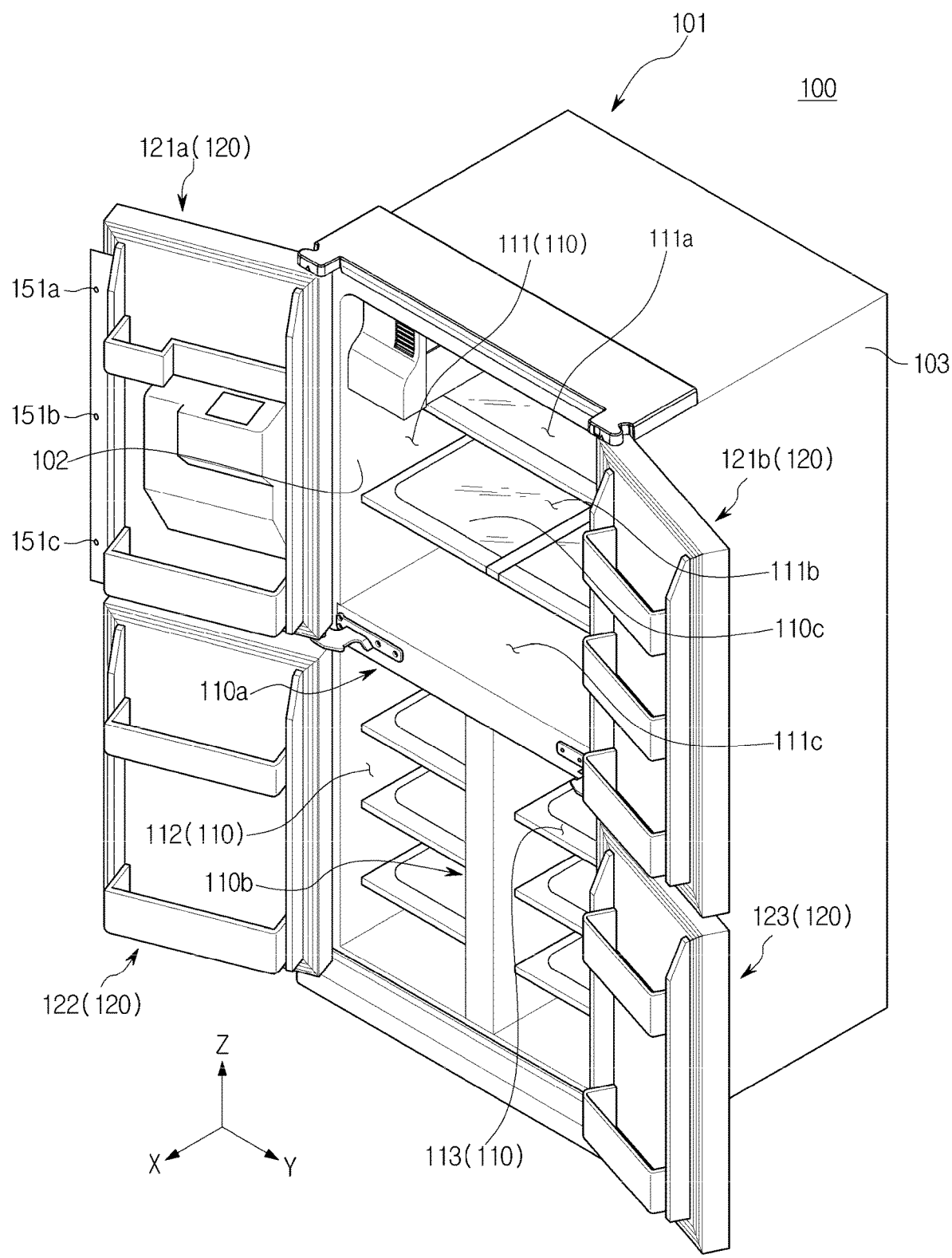
FIG. 2 shows the exterior of a refrigerator, according to an embodiment.
Figure 3:
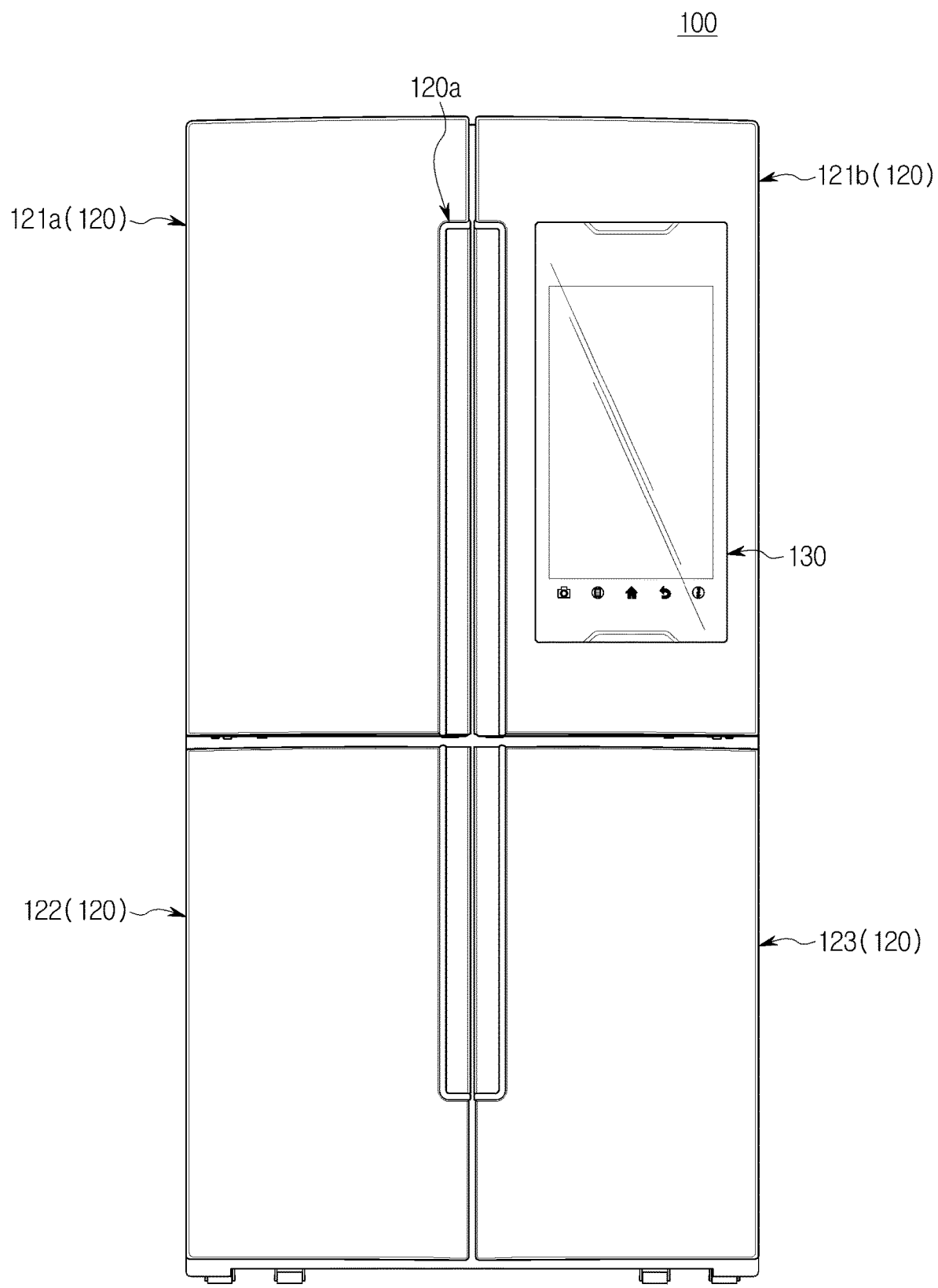
FIG. 3 shows the front of a refrigerator, according to an embodiment.
Figure 4:
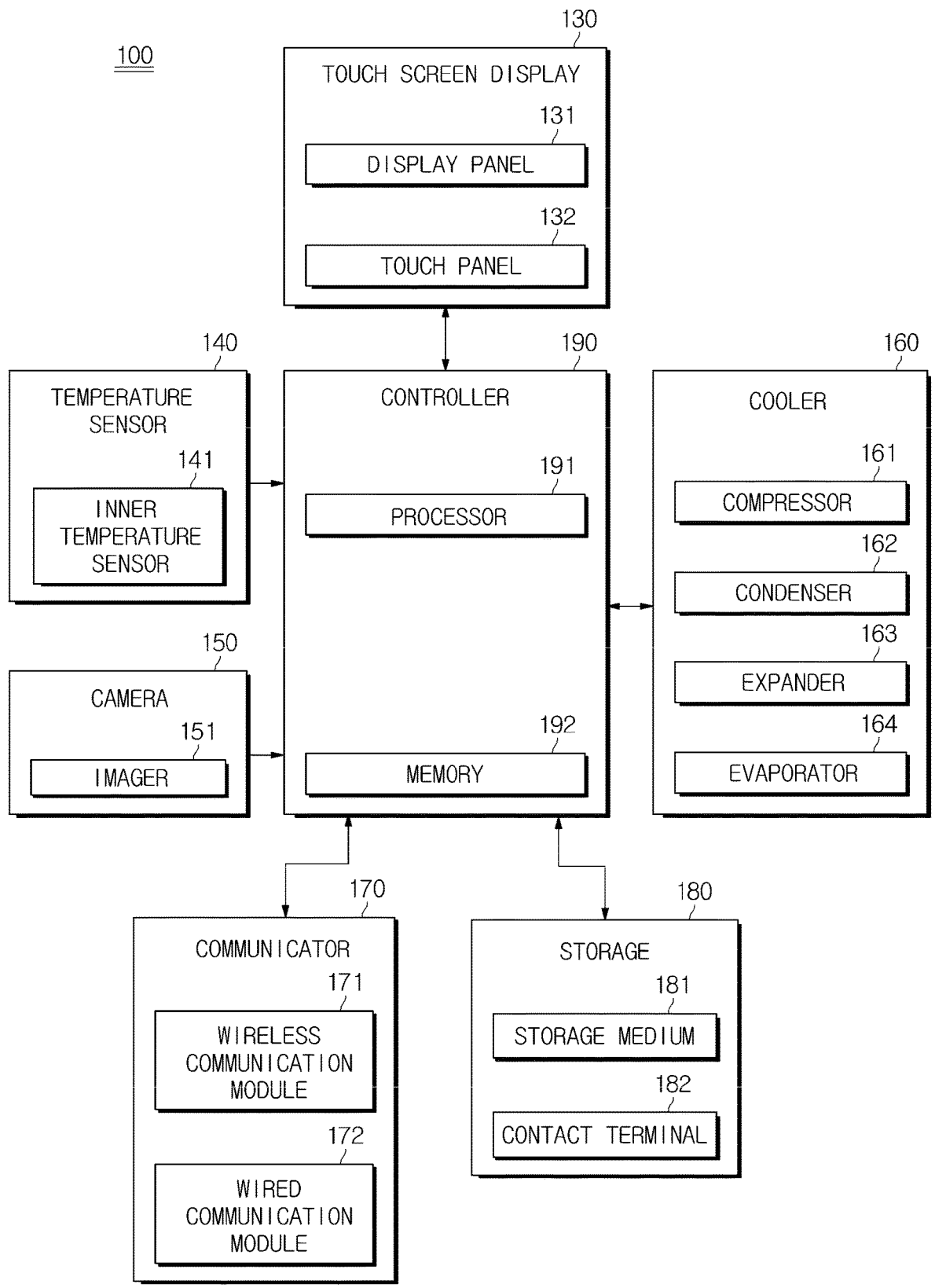
FIG. 4 is a block diagram of a refrigerator, according to an embodiment.
Figure 5:
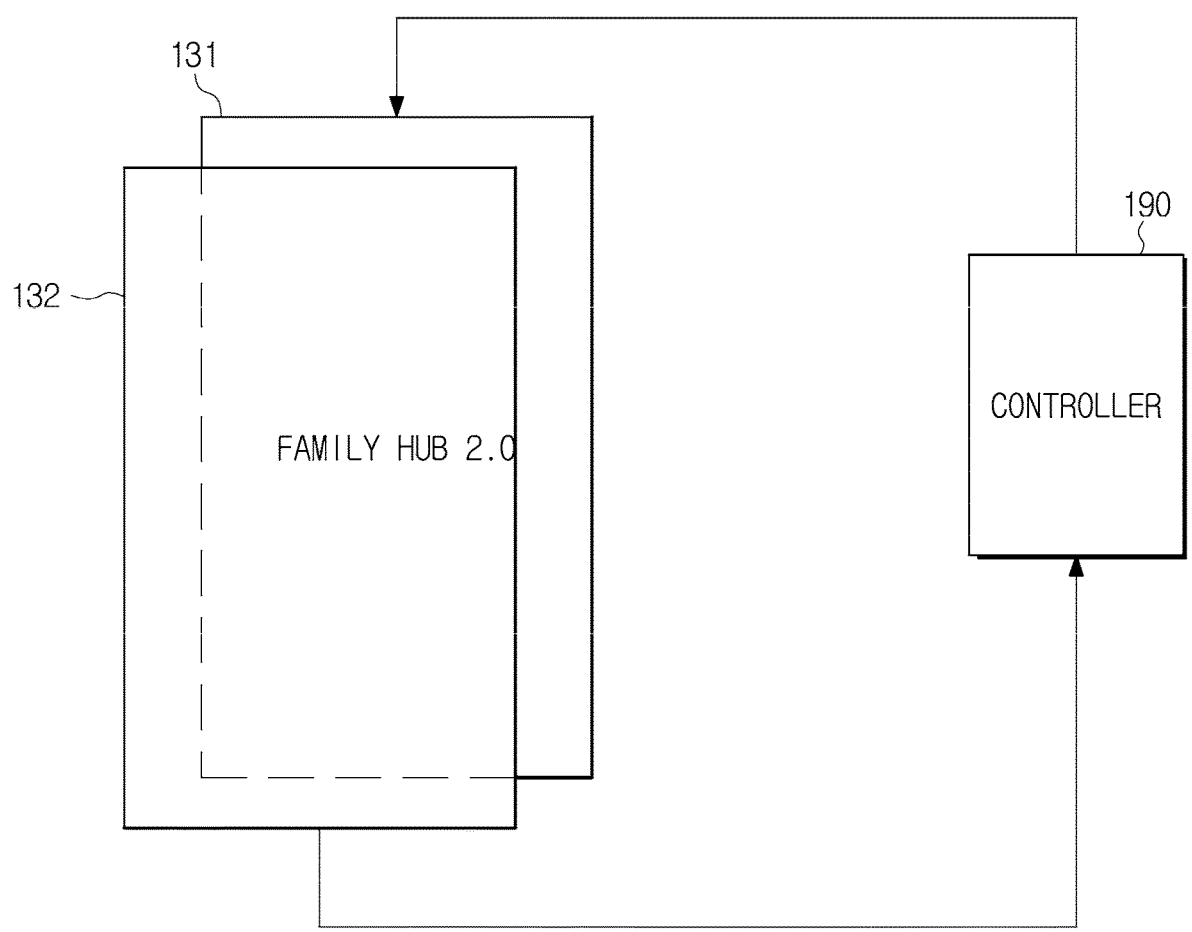
FIG. 5 shows a touch screen display included in a refrigerator, according to an embodiment.

FIG. 2 shows the exterior of a refrigerator, according to an embodiment. FIG. 3 shows the front of a refrigerator, according to an embodiment. FIG. 4 is a block diagram of a refrigerator, according to an embodiment. FIG. 5 shows a touch screen display included in a refrigerator, according to an embodiment.

Referring to FIGS. 2, 3, 4 and 5, a refrigerator 100 may include a main body 101 with an open front, a storage chamber 110 formed inside the main body 101 to keep food refrigerated and/or frozen, and a door 30 for opening or closing the open front of the main body 101.

The main body 101 may form the exterior of the refrigerator 100. The main body 101 may include an inner case 102 that forms the storage chamber 110, and an outer case 103 combined with the outer side of the inner case 102 to form the exterior. Insulation (not shown) may be packed between the inner case 102 and the outer case 103 of the main body 101 to prevent leakage of cool air from the storage chamber 110.

The storage chamber 110 may be divided by horizontal and vertical partition walls 110a and 110b into a plurality of chambers. For example, as shown in IG. 2, the storage chamber 110 may be divided into an upper storage chamber 111, a first lower storage chamber 112, and a second lower storage chamber 113.

The storage chamber 110 may have shelves 110c to put foodstuffs thereon. The inner storage space of the storage chamber 110 may be partitioned by the shelves 110c. For example, the upper storage chamber 111 may be partitioned into a first storage space 111a, a second storage space 111b, and a third storage space 111c.

The storage chamber 110 may be opened or closed by the door 120. For example, as shown in FIG. 2, the upper storage chamber 111 may be opened or closed by a first upper door 121a and a second upper door 121b; the first lower storage chamber 112 may be opened or closed by a first lower door 122; and the second lower storage chamber 113 may be opened or closed by a second lower door 123.

A handle 120a may be mounted on the door 120 to easily open or close the door 120. The handle 120a may be formed to run in the vertical direction between the first and second upper doors 121a and 121b and between the first and second lower doors 122 and 123. This makes the handle 120a look like a single unit while the door 120 is closed.

Referring to FIG. 4, the refrigerator 100 may also include a touch screen display 130, a temperature sensor 140, a camera 150, a cooler 160, a communicator 170, a storage 180, and a controller 190.

The touch screen display 130 may include a display panel 131 for displaying images and a touch panel 132 for receiving touch inputs.

The display panel 131 may convert image data received from the controller 190 to an optical signal viewable to the user, as shown in FIG. 5.

The display panel 131 may employ a Liquid Crystal Display (LCD) panel, a Light Emitting Diode (LED) panel, an Organic Light Emitting Diode (OLED) panel, a micro Light Emitting Diode (uLED) panel, a Plasma Display Panel (PDP), or the like. The display panel 131 is not, however, limited thereto, but may employ other various displays capable of visually presenting an optical image corresponding to the image data.

The touch panel 132 may receive the user's touch input as shown in FIG. 5, and output an electric signal corresponding to the received touch input to the controller 190.

For example, the touch panel 132 may detect the user's touch on the touch panel 132 from a change in electrical resistance or capacitance, and output an electric signal corresponding to a coordinate of a point of the user's touch to the controller 190. The controller 190 may identify the coordinate of the point of the user's touch based on an electric signal received from the touch panel 132. Furthermore, the controller 190 may identify an input from the user based on the coordinate of the point of the user's touch.

The touch panel 132 may be arranged on the front of the display panel 131. In other words, the touch panel 132 may be arranged on a plane in which an image is displayed. Hence, the touch panel 132 may be formed of a transparent material to prevent distortion of an image displayed on the display panel 131.

The touch panel 132 may employ a resistive touch panel or a capacitive touch panel. It is not, however, limited thereto, and the touch panel 132 may employ other various touch panels capable of detecting the user's touch or proximity and outputting an electric signal corresponding to a coordinate of a point of the detected touch or proximity.

The touch screen display 130 may then receive the touch input from the user and forward it to the controller 190, and display an image from the controller 190 that responds to the touch input from the user. That is, the touch screen display 130 may interact with the user.

The touch screen display 130 may be built in the door 120 for convenience of the user. For example, as shown in FIG. 3, the touch screen display 130 may be installed on the second upper door 121b. In the following description, the touch screen display 130 installed on the second upper door 121b will be focused, but it may not be limited thereto. For example, the touch screen display 130 may be installed anywhere viewable to the user, such as on the first upper door 121a, on the first lower door 122, on the second lower door 123, and on the outer case 103 of the main body 10.

The touch screen display 130 may have a wakeup function that is automatically activated when the user approaches within a certain range. For example, when the user approaches within a certain range, the touch screen display 130 may be activated. In other words, the touch screen display 130 may be turned on. Furthermore, when a certain time elapses after the user gets out of the certain range, the touch screen display 130 may be deactivated. In other words, the touch screen display 130 may be turned off.

The temperature sensor 140 may include inner temperature sensors 141 provided inside the storage chamber 110 for detecting the temperature of the inside of the storage chamber 110.

The inner temperature sensors 141 may each be installed in one of the plurality of storage chambers 111, 112, and 113 for detecting the temperature and output an electric signal corresponding to the detected temperature to the controller 190. Each of the inner temperature sensors 141 may include a thermistor whose electric resistance is changed by the temperature.

The camera 150 may be installed inside the storage chamber 110 to obtain an image of the inside of the storage chamber 110. For example, as shown in FIG. 2, the camera 150 may be installed on the inner side of the door 120 to face and capture an image of the inside of the storage chamber 110. The camera 150 may capture an image of the inside of the storage chamber 110 in substantially the same direction as the line of sight of the user.

The camera 150 may include an imager 151 for capturing an image and converting the image to an electric signal. The imager 151 may include a plurality of photo diodes that convert an optical signal to an electric signal, and the plurality of photo diodes may be arrayed in two dimensions (2D). The imager 151 may include, e.g., Charge-Coupled Device (CCD) image sensors or Complementary metal-oxide-semiconductor (CMOS) image sensors.

The camera 150 may include a plurality of imagers 151*a*, 151*b*, and 151*c* to capture an image of the inside of the storage chambers 110 partitioned by the shelves 110*c*. For example, the camera 150 may include first and second imagers 151*a* and 151*b* for taking images of the first and second storage spaces 111*a* and 111*b* of the upper storage chamber 111, respectively, and a third imager 151*c* for taking an image of the third storage space 111*c*.

Especially, when a food is stored in the storage chamber 110, an image of the inside of the storage chamber 110 captured by the camera 150 may contain an image of the food stored in the storage chamber 110.

The camera 150 may send the captured image to the controller 190. Specifically, the camera 150 may send the image of the inside of the storage chamber 110 containing the food image to the controller 190.

The cooler 160 may supply cool air to the storage chamber 110. Specifically, the cooler 160 may make the temperature of the storage chamber 110 remain within a range set by the user by using evaporation of a refrigerant.

The cooler 160 may include a compressor 161 for compressing a gaseous refrigerant, a condenser 162 for changing the compressed gaseous refrigerant into a liquid state, an expander 163 for depressurizing the liquid refrigerant, and an evaporator 164 for changing the depressurized liquid refrigerant into a gaseous state.

The cooler 160 may cool the air in the storage chamber 110 using a phenomenon in which a liquid refrigerant absorbs thermal energy of ambient air while changing the refrigerant from liquid to gaseous state.

The cooler 160 is not, however, limited to having the compressor 161, the condenser 162, the expander 163, and the evaporator 164.

For example, the cooler 160 may include a Peltier device that uses the Peltier effect. The Peltier effect refers to an effect where when a current is applied to a contact surface between different types of metals, a heating phenomenon occurs to one metal while heat absorption phenomenon occurs to the other metal. The cooler 160 may use the Peltier device to cool the air in the storage chamber 110.

In another example, the cooler 160 may include a magnetic cooling device that uses the magneto-caloric effect. The magneto-caloric effect refers to an effect where a particular material (e.g., a magneto-caloric material) emits heat when magnetized and absorbs heat when demagnetized. The cooler 160 may use the magnetic cooling device to cool the air in the storage chamber 110.

The communicator 170 may exchange data with the computing apparatus 200 and/or the UE 300. For example, the communicator 170 may transmit an image of the inside of the storage chamber captured by the camera 150 to the computing apparatus 200, and receive information relating to a food contained in the image of the inside of the storage chamber from the computing apparatus 200.

The communicator 170 may include a wired communication module 172 for wiredly exchanging data with the computing apparatus 200 and/or the UE 300, and a wireless communication module 171 for wirelessly exchanging data with the computing apparatus 200 and/or the UE 300.

The wired communication module 172 may access a wired communication network and communicate with the computing apparatus 200 and/or the UE 300 over the wired communication network. For example, the wired communication module 172 may access a wired communication network through Ethernet, the IEEE 802.3 technology standard, and receive data from the apparatus 200 and/or the UE 300 over the wired communication network.

The wireless communication module 171 may communicate wirelessly with a base station or an AP, and access the wired communication network via the base station or the AP. The wireless communication module 171 may communicate with the computing apparatus 200 and/or the UE 300 connected to the wired communication network via the base station or the AP. For example, the wireless communication module 171 may use Wi-Fi, the IEEE 802.11 technology standard, to communicate with an AP, or use code divisional multiple access (CDMA), wideband code division multiple access (WCDMA), Global Systems for Mobile communications (GSM), Long Term Evolution (LTE), WiBro, etc., to communicate with a base station. The wireless communication module 171 may receive data from the computing apparatus 200 and/or the UE 300 via the base station or the AP.

In addition, the wireless communication module 171 may communicate directly with the computing apparatus 200 and/or the UE 300. For example, the wireless communication module 171 may use Wireless Fidelity (Wi-Fi), Bluetooth which is the IEEE 802.15.1 technology standard, ZigBee which is the IEEE 802.15.4 technology standard, etc., to wirelessly receive data from the computing apparatus 200 and/or the UE 300.

In this way, the communicator 170 may exchange data with the computing apparatus 200 and/or the UE 300, and output the data received from the computing apparatus 200 and/or the UE 300 to the controller 190.

The storage 180 may include a storage medium 181 for storing a program and/or data, and a contact terminal 182 that may contact with an external storage medium having the program and/or data stored therein. The program may include a plurality of instructions combined to perform a particular function, and the data may be processed according to the plurality of instructions included in the program. Furthermore, the program and/or data may include a system program and/or system data directly related to operation of the refrigerator 100, and an application program and/or application data for providing convenience and entertainment for the user.

The storage medium 181 may store the program and/or data in a file format. For example, the storage medium 181 may store the program and/or data in the format of a file such as "*.exe", "*.jpg", "*.mpg", etc.

The storage medium 181 may store content data electrically, magnetically, or optically. For example, the storage medium 181 may include a solid state drive (SSD), a hard disc drive (HDD), or an optical disc drive (ODD).

The storage medium 181 may output the program and/or data to the controller 190 in response to a loading instruction from the controller 190. The contact terminal 182 may be connected to an external storage medium that stores a program and/or data. For example, the contact terminal 182 may include a universal serial bus (USB) terminal and may be connected to an external USB storage medium.

Like the storage medium 181 of the refrigerator 100, the external storage medium may store the program and/or data in a file format and store them electrically, magnetically, or optically. Furthermore, the external storage medium may output the program and/or data to the controller 190 through the contract terminal 182 in response to a loading instruction from the controller 190.

In this way, the storage 180 may store and output a program and/or data to the controller 190. In other words, the storage 180 may store a program and/or data that may be executed by the controller 190 to perform an operation as will be described below.

The controller 190 may include a memory 192 that loads and stores the program and/or data stored in the storage 180, and a processor 191 that processes user input data of the touch screen display 130 and communication data of the communicator 170 according to the program and/or data stored in the memory 192. The controller 190 may further include software, such as the program and/or data stored in the memory 192 and processed by the processor 191 in addition to hardware such as the memory 192 and the processor 191.

The memory 192 may store programs and/or data for controlling components of the refrigerator 100, and store temporary data produced while the components of the refrigerator 100 is controlled.

For example, the memory 192 may store a program and/or data for controlling operation of the cooler 160 based on a detection result of the temperature sensor 140, and may temporarily store the detection result of the temperature sensor 140. The memory 192 may store a program and/or data for controlling operation of the touch screen display 130, and may temporarily store an image displayed on the touch screen display 130 and a touch input (or user input) entered through the touch screen display 130. The memory 192 may store a program and/or data for controlling capturing operation of the camera 150 based on opening or closing of the door 120, and may temporarily store an image captured by the camera 150. The memory 192 may store a program and/or data for controlling communication operation of the communicator 170, and may temporarily store communication data transmitted or received by the communicator 170. Furthermore, the memory 192 may store a program and/or data for the refrigerator 100 to perform an operation as will be described later.

The memory 192 may include a non-volatile memory, such as a Read Only Memory (ROM), a flash memory, and/or the like, which may store data for a long period, and a volatile memory, such as a static random access memory (SRAM), a dynamic RAM (DRAM), or the like, which may temporarily store data.

The processor 191 may process a touch input of the touch screen display 130 and/or communication data of the communicator 170 according to a program and/or data stored in the memory 192, and generate control signals to control operations of the camera 150, touch screen display 130, and/or communicator 170.

For example, the processor 191 may receive temperature information of the storage chamber 110 from the temperature sensor 140, and generate a cooling control signal to control operation of the cooler 160 based on the temperature information of the storage chamber 110. The processor 191 may receive the user's touch input from the touch screen display 130, and in response to the user's touch input, send a display control signal and image data to the touch screen display 130 to display an image. The processor 191 may generate a shoot control signal for the camera 150 to capture an image of the inside of the storage chamber 110 as soon as the door 120 which has been opened is shut, and receive the inside image of the storage chamber 110 from the camera 150. The processor 191 may generate a communication control signal to control the communicator 170 to send the inside image of the storage chamber 110 to the computing apparatus 200 in response to reception of the inside image of the storage chamber 110 from the camera 150. The processor 191 may generate a display control signal to display the food-related information on the touch screen display 130 in response to reception of the information relating to the food stored in the storage chamber 110 from the computing apparatus 200 through the communicator 170. Furthermore, the processor 191 may generate a control signal for the refrigerator 100 to perform an operation as will be described later.

The processor 191 may include a core for performing logic operation and arithmetic operation, and a register for storing the data resulting from the operation.

In this way, the controller 190 may control the cooler 160, the touch screen display 130, and the communicator 170 based on the temperature of the storage chamber 110 detected by the temperature sensor 140, a user's touch input entered through the touch screen display 130, and/or communication data via the communicator 170.

The controller 190 may include a single processor and a single memory or a plurality of processors and a plurality of memories in controlling the components included in the refrigerator 190 as described above. For example, the controller 190 may include a processor and memory for controlling operations of the temperature sensor 140 and/or the cooler 160, a processor and memory for controlling operation of the touch screen display 130, and a processor and memory for controlling operation of the communicator 170.

A configuration and operation of the computing apparatus 200 included in the food management system 1 will now be described.

Figure 6:
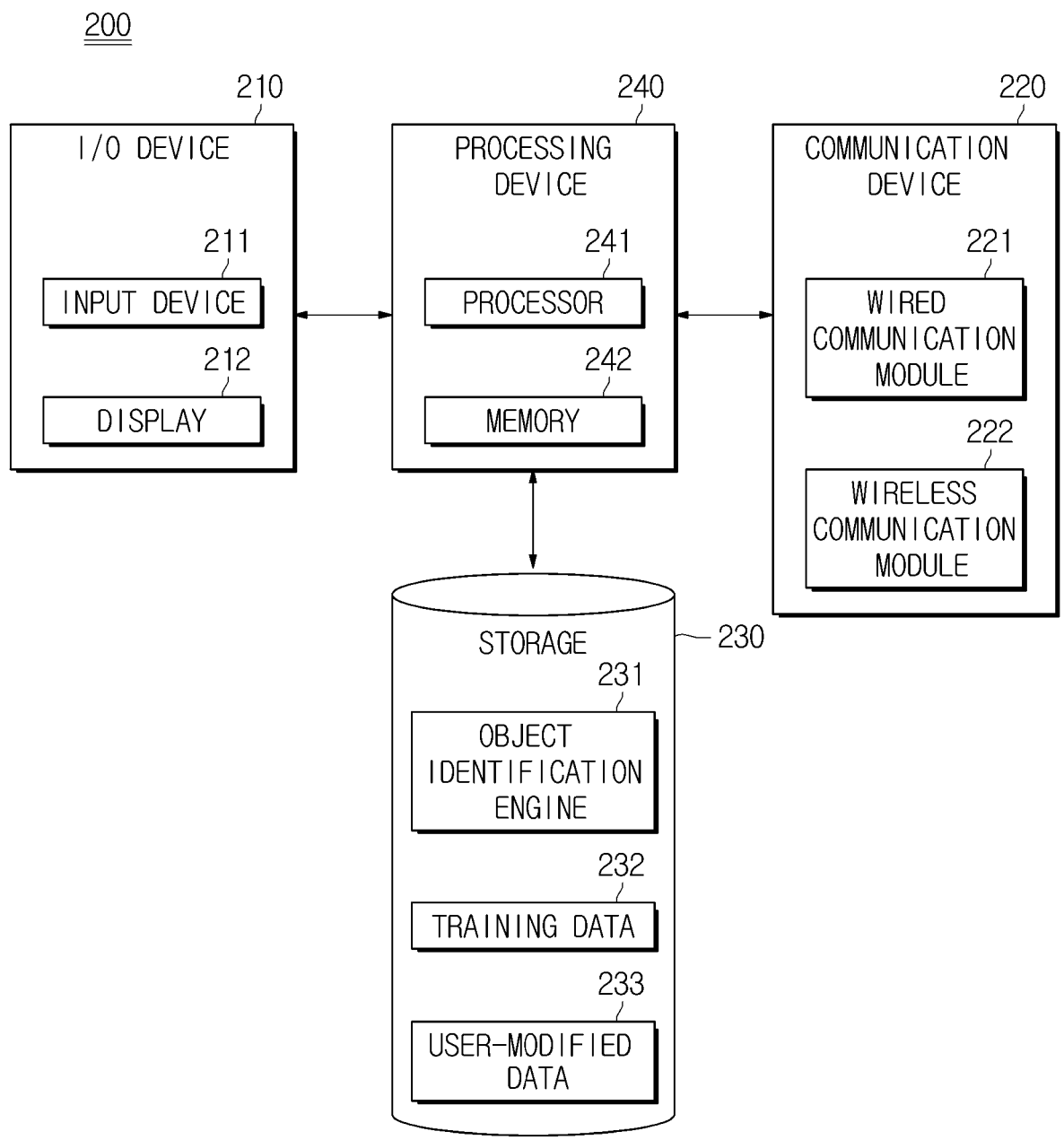
FIG. 6 is a block diagram of a computing apparatus, according to an embodiment.
Figure 7:
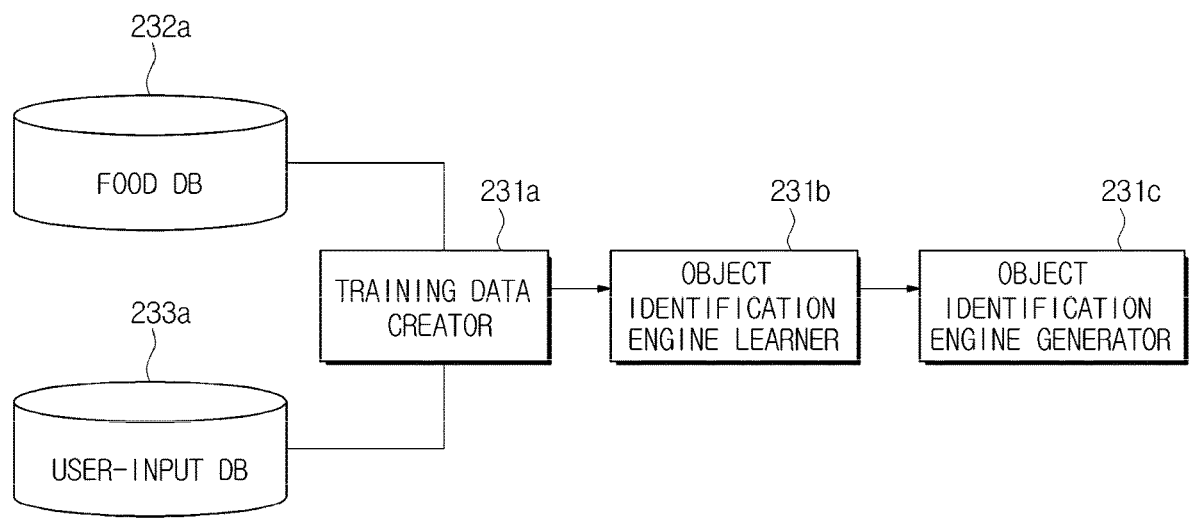
FIG. 7 is a block diagram of an object identification engine included in a computing apparatus, according to an embodiment.
Figure 9:
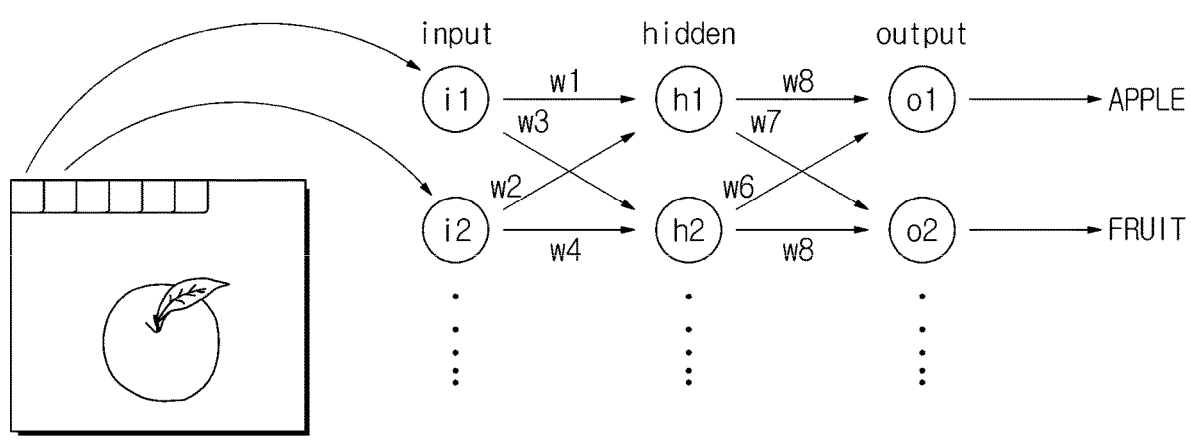
FIG. 9 shows an example of a learning engine for object identification included in a computing apparatus, according to an embodiment.
Figure 10:
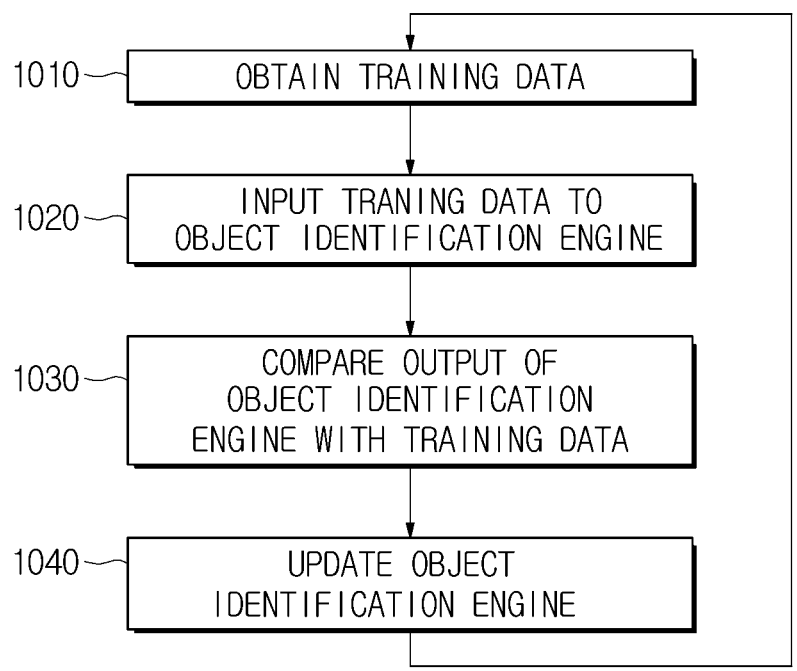
FIG. 10 shows an example of machine learning of a computing apparatus for object identification, according to an embodiment.
Figure 10:
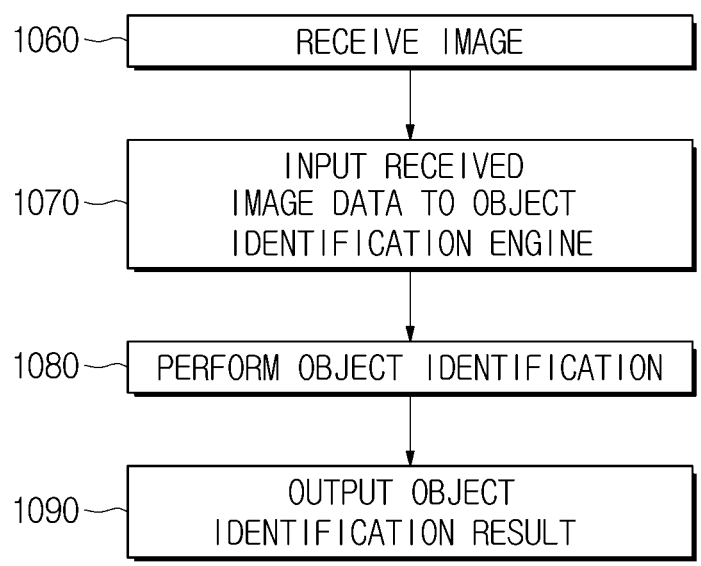

FIG. 6 is a block diagram of a computing apparatus, according to an embodiment. FIG. 7 is a block diagram of an object identification engine included in a computing apparatus, according to an embodiment. FIG. 8 shows data stored in a computing apparatus, according to an embodiment. FIG. 9 shows an example of a learning engine for object identification included in a computing apparatus, according to an embodiment. FIG. 10 shows an example of machine learning of a computing apparatus for object identification, according to an embodiment.

Referring to FIGS. 6, 7, 8, 9, and 10, the computing apparatus 200 may include an input/output (I/O) device 210, a communication device 220, a storage 230, and a processing device 240.

The I/O device 210 may include an input device for receiving a control command for the computing apparatus 200 from a user and/or manager, and a display device for displaying operation information of the computing apparatus 200.

For example, the I/O device 210 may include a hardware input device 211 for receiving an input from the user and/or manager, such as various buttons, a switch, a pedal, a keyboard, a mouse, a track ball, various levers, a handle, a stick, etc., or a graphical user interface (GUI), i.e., a software input device 211 for receiving an input from the user and/or manager, such as a touch pad. Furthermore, the I/O device 210 may include a display 212 to display operation of the computing apparatus 200.

Especially, the I/O device 210 may include a terminal provided separately from the computing apparatus 200. For example, the I/O device 210 may include a fixed terminal including a keyboard and a monitor, or a portable terminal including a keyboard, a touch pad, a display, and a touch screen display.

The communication device 220 may exchange data with the refrigerator 100 and/or the UE 300. For example, the communication device 220 may receive an inside image of the storage chamber from the refrigerator 100, and send information relating to a food included in the inside image of the storage chamber to the refrigerator 100 and/or the UE 300.

The communication device 220 may include a wired communication module 221 for wiredly exchanging data with the refrigerator 100 and/or the UE 300, and a wireless communication module 222 for wirelessly exchanging data with the refrigerator 100 and/or the UE 300. The wired communication module 221 and the wireless communication module 222 have the same configurations and operations as those of the refrigerator 100.

In this way, the communication device 220 may exchange data with the refrigerator 100 and/or the UE 300, and output the data received from the refrigerator 100 and/or the UE 300 to the processing device 240.

The storage 230 may store a program and/or data for handling a request of the refrigerator 100 or the UE 300.

For example, the storage 230 may include an object identification engine 231 for identifying an object from an image, training data 232 for training the object identification engine 231, and user-modified data 233 for re-training the object identification engine 231 according to a modification of the user.

The object identification engine 231 may identify an object from an image using supervised learning or unsupervised learning. For example, the object identification engine 231 may identify a food contained in an image based on pre-training or post-training, and output information about the food, such as a name of the identified food.

The object identification engine 231 may include algorithms such as supervised learning that learns under supervision of a manager, unsupervised leaning that learns without supervision of a manager, and reinforcement learning that learns by reward without supervision of a manager. To help understanding, in the following description, the object identification engine 231 is assumed to have the supervised learning algorithm.

The object identification engine 231 may include other various learning algorithms to identify an object in an image.

For example, the object identification engine 231 may include a neural network algorithm, a support vector machine (SVM) algorithm, an AdaBoost algorithm, a random forest algorithm, etc.

The object identification engine 231 may be trained in advance with the training data 232. Furthermore, the object identification engine 231 may be re-trained ex post with the user modified data 233.

The training data 232 may include an image and a name of an object corresponding to the image. For example, the training data 232 may include a file containing "an image of an apple" and the corresponding food name "apple".

Furthermore, the user-modified data 233 may include an image of an object, and a user-modified name of the object. For example, the user-modified data 233 may include a file containing "an image of an apple" and a user-modified food name "apple".

For example, as shown in FIGS. 7 and 8, the storage 230 may include a food database 232*a* and a user-input database 233*a*.

The food database 232*a* may contain training data 232 for training the object identification engine 231. The training data 232 in the food database 232*a* may be stored in advance by a designer, and the object identification engine 231 may be trained with the training data 232 in the food database 232*a* at an early stage.

The training data 232 in the food database 232*a* may include a name of a food and images of the food. For example, as shown in (a) of FIG. 8, the food database 232*a* may contain a name 'pineapple' and at least one image, pineapple_1.jpg and pineapple_2.jpg that represents the pineapple, a name 'grape' and at least one image, Grape_1.jpg and Grapge_2.jpg that represents the grape, and a name 'apple' and at least one image, Apple_1.jpg that represents the apple.

The user-input database 233*a* may contain user-modified data 233 entered or modified by the user. Once the user-modified data 233 is entered by the user, the object identification engine 231 may be re-trained with the user-modified data 233. The user-modified data 233 in the user-input database 233*a* may include a name of a food entered by the user and images corresponding to the user-modified name of the food. For example, as shown in (b) of FIG. 8, the user-input database 233*a* may include a name 'apple' entered by the user and an image, Apple_2.jpg, corresponding to the modified name 'apple'.

In order to re-train the object identification engine 231 with the user-modified data 233 in the user-input database 233*a*, the storage 230 may further include a training data creator 231*a*, an object identification engine learner 231*b*, and an object identification engine generator 231*c*.

The training data creator 231*a* may create training data to re-train the object identification engine 231 using the existing training data 232 and the user-modified data 233 entered by the user. For example, the training data creator 231*a* may mix the training data 232 and the user-modified data 233, and adjust the ratio between the training data 232 and the user-modified data 233.

The object identification engine learner 231*b* may train the object identification engine 231 using training data newly created by the training data creator 231*a*. As will be described below, the object identification engine learner 231*b* may input a food image among the training data to the object identification engine 231, compare a food name corresponding to the food image with a food name output from the object identification engine 231, and adjust coefficients included in the object identification engine 231 based on the comparison result.

The object identification engine generator 231c may generate an object identification engine 231 trained by the object identification engine learner 231b.

In this way, the storage 230 may store and output a program and/or data to the processing device 240. In other words, the storage 230 may store a program and/or data to be executed by the processing device 240 to perform an operation as will be described below. For example, the storage 230 may store the object identification engine 231 for object identification, the training data 232 and user-modified data 233 for training a learning engine.

The processing device 240 may include a memory 242 that loads and stores a program and/or data stored in the storage 230, and a processor 241 that processes data received from the refrigerator 100 and/or the UE 300 according to the program and/or data stored in the memory 242. The processing device 240 may further include software, such as the program and/or data stored in the memory 242 and processed by the processor 241 in addition to hardware such as the memory 242 and the processor 241.

The memory 242 may store a program and/or data for processing data received from the refrigerator 100 and/or the UE 300, and store temporary data produced while the data received from the refrigerator 100 and/or the UE 300 is processed.

For example, the memory 242 may store the object identification engine 231, which has not yet been trained, and store a program and/or data for training the not-trained object identification engine 231 with the training data 232 stored in the storage 230. The memory 242 may store the object identification engine 231, which has been trained, and store a program and/or data for identifying an object of an image from image data using the trained object identification engine 231. Furthermore, the memory 242 may store a program and/or data for the computing apparatus 200 to perform an operation as will be described later.

The memory 242 may include a non-volatile memory, such as a Read Only Memory (ROM), a flash memory, and/or the like, which may store data for a long period, and a volatile memory, such as a static random access memory (SRAM), a dynamic RAM (DRAM), or the like, which may temporarily store data.

The processor 241 may process the data received from the refrigerator 100 and/or the UE 300 according to a program and/or data stored in the memory 242, and generate control signals to send the process result to the refrigerator 100 and/or the UE 300.

For example, the processor 241 may train the not-trained object identification engine 231, which is stored in the memory 242. Specifically, the processor 241 may input the training data 232 to the not-trained object identification engine 231, and compare an output of the object identification engine 231 with the training data 232 to update (train) the object identification engine 231.

Furthermore, the processor 241 may identify an object from an image using the trained object identification engine 231, which is stored in the memory 242. Specifically, the processor 241 may input the inside image of the storage chamber transmitted from the refrigerator 100 to the trained object identification engine 231, and identify foodstuffs contained in the inside image of the storage chamber based on an output of the object identification engine 231. In other words, the processor 241 may use the trained object identification engine 231 to identify foodstuffs stored in the storage chamber 110 of the refrigerator 100 and output information relating to the identified foodstuffs. Furthermore, the processor 241 may generate a control signal for the computing apparatus 200 to perform an operation as will be described later.

The processor 241 may include a core for performing logic operation and arithmetic operation, and a register for storing the data resulting from the operation.

As described above, the processing device 240 may train the not-trained object identification engine 231, and identify an object in an input image using the trained object identification engine 231.

For example, the object identification engine 231 may include a neural network, as shown in FIG. 9. The object identification engine 231 may include an input layer (input) to which image data is input, an output layer (output) from which information relating to an identified object is output, and a hidden layer (hidden) between the input layer (input) and the output layer (output).

The input layer may include a plurality of input nodes i1, i2, and each of the plurality of input nodes i1, i2, receives image data. For example, a luminance value and/or a color value of each of a plurality of pixels included in an image may be input to one of the plurality of input nodes i1, i2.

The hidden layer (hidden) may include a plurality of hidden nodes h1, h2, and each of the plurality of hidden nodes h1, h2 may receive a sum of output values of the plurality of input nodes i2, i2, the output values having weights (w1, w2, w3, w4) applied thereto. For example, the processing device 240 may input a sum of an output value of the first input node i1 to which a first weight w1 is applied and an output value of the second input node i2 to which a second weight w2 is applied to the first hidden node h1. Furthermore, the processing device 240 may input a sum of an output value of the first input node i1 to which a third weight w3 is applied and an output value of the second input node i2 to which a fourth weight w4 is applied to the second hidden node h2.

The processing device 240 may apply the step function or the sigmoid function to a value input to the hidden layer (hidden). For example, the processing device 240 may input the input value of the first hidden node h1 to the sigmoid function, and output an output value of the sigmoid function to the output layer (output). Moreover, the processing device 240 may input the input value of the second hidden node h2 to the sigmoid function, and apply weights w5, w6, w7, and w8 to an output value of the sigmoid function and output the weighted output values to the output layer (output).

The output layer (output) may include a plurality of output nodes o1, o2, and each of the plurality of output nodes o1, o2 may receive a sum of output values of the plurality of hidden nodes h2, h2, the output values having weights (w5, w6, w7, w8) applied thereto. For example, the processing device 240 may input a sum of an output value of the first hidden node h1 to which a fifth weight w5 is applied and an output value of the second hidden node h2 to which a sixth weight w6 is applied to the first output node o1. Furthermore, the processing device 240 may input a sum of an output value of the first hidden node h1 to which a seventh weight w7 is applied and an output value of the second hidden node h2 to which an eighth weight w8 is applied to the second output node o2.

The processing device 240 may apply the step function or the sigmoid function to a value input to the output layer (output). For example, the processing device 240 may input the input value of the first output node o1 to the sigmoid function, and output an output value of the sigmoid function. Furthermore, the processing device 240 may input the input value of the second output node o2 to the sigmoid function, and output an output value of the sigmoid function.

Each of the plurality of output nodes o1, o2 included in the output layer (output) is allocated an object, and an output value of each of the plurality of output nodes o1, o2 may represent a probability of being the allocated object. The processing device 240 may identify an object contained in an image based on the outputs of the plurality of output nodes o1, o2.

According to the neural network algorithm, the output of the object identification engine 231 may vary depending on the weights w1 to w8 among the layers (input, hidden, and output). Accordingly, the processing device 240 may set suitable weights w1 to w8 for accurate identification of an object, and specifically, set the suitable weights w1 to w8 for the object identification engine 231 using the training data 232. Training the object identification engine 231 with the training data 232 as described above is called "learning".

The computing apparatus 200 may train the not-trained object identification engine 231, as shown in (a) of FIG. 10.

The computing apparatus 200 obtains the training data 232, in 1010.

The processing device 240 may load the training data stored in the storage 230. The training data 232 may include a plurality of images and a name of an object corresponding to each of the plurality of images.

Furthermore, the computing apparatus 240 may obtain the training data 232 from another device connected to a WAN.

The computing apparatus 200 inputs the training data 232 to the object identification engine 231, in 1020.

The processing device 240 may input a luminance value and/or an RGB value (data for a red sub-pixel, data for a green sub-pixel, and data for a blue sub-pixel) of each of a plurality of pixels constituting the image of the training data 232 to the object identification engine 231. For example, the processing device 240 may input RGB values of the plurality of pixels of an image of the training data 232 to the input nodes i1, i2 of the input layer (input) of the neural network.

The computing apparatus 200 compares the training data 232 with an output of the object identification engine 231, in 1030.

The processing device 240 performs object identification on an image of the training data 232 using the object identification engine 231. For example, the processing device 240 may apply weights w1 to w4 to outputs of the input nodes i1, i2 of the input layer (input) of the neural network and input the weighted outputs to the hidden nodes h1, h2 of the hidden layer (hidden). The processing device 240 may input the inputs of the hidden nodes h1, h2 to the sigmoid function, and apply the weights w5 to w8 to the outputs of the sigmoid function and output the weighted outputs to the output nodes o1, o2 of the output layer (output). After this, the processing device 240 may input the inputs of the output nodes o1, o2 to the sigmoid function, and output an output of the sigmoid function.

The processing device 240 may identify an object contained in an image of the training data 232 based on the output of the object identification engine 231. For example, each of the plurality of output nodes o1, o2 of the neural network may output a probability that the object contained in the image matches an object allocated to the output node, and the processing device 240 may identify the object contained in the image of the training data 232 based on the probability output from the neural network.

Furthermore, the processing device 240 may compare the object identified based on the output of the object identification engine 231 with an object according to the training data 232.

The computing apparatus 200 updates the object identification engine 231 based on the output of the objection identification engine 231 and the training data 232.

The processing device 240 may determine whether the object identified based on the output of the object identification engine 231 is identical to an object according to the training data 232.

When the object identified based on the output of the object identification engine 231 is not identical to the object according to the training data 232, the processing device 240 updates the object identification engine 231 in a suitable method. For example, when the probability output from the neural network for the object according to the training data is less than a threshold, the processing device 240 may change the weights w1 to w8 of the neural network.

After this, the computing apparatus 200 may repeat obtaining the training data 232, inputting the training data 232, evaluating an output of the object identification engine 231, and updating the object identification engine 231. With this training operation, the object identification engine 231 is trained to identify an object contained in an image of the training data 232. For example, weights w1 to w8 of the neural network are set to identify an object contained in an image of the training data 232 according to the training operation.

The computing apparatus 200 may also identify an object in an image using the trained object identification engine 231, as shown in (b) of FIG. 10.

The computing apparatus 200 receives an image, in 1060.

The processing device 240 may receive an image containing an object to be identified from an external device through the communication device 220. For example, the processing device 240 may receive an inside image of the storage chamber 110 from the refrigerator 100 through the communication device 220.

The computing apparatus 200 inputs the received image to the object identification engine 231, in 1070.

The processing device 240 may input a luminance value and/or an RGB value (data for a red sub-pixel, data for a green sub-pixel, and data for a blue sub-pixel) of each of a plurality of pixels constituting the image to the object identification engine 231. Operation 1070 may be the same as operation 1020.

The computing apparatus 200 performs identification of an object, in 1080.

The processing device 240 may perform identification of the object contained in the received image using the object identification engine 231, and identify an object contained in an image of the training data 232 based on the output of the object identification engine 231. Operation 1080 may be the same as operation 1030.

The computing apparatus 200 outputs a result of object identification, in 1090.

The processing device 240 may control the communication device 220 to transmit information about the object in the received image to another device. For example, the processing device 240 may transmit information about a food identified in an inside image of the storage chamber 110 to the refrigerator 100 through the communication device 220.

To identify a food stored in the storage chamber 110 of the refrigerator 100, the computing apparatus 200 may identify the food using a special method.

Figure 11:
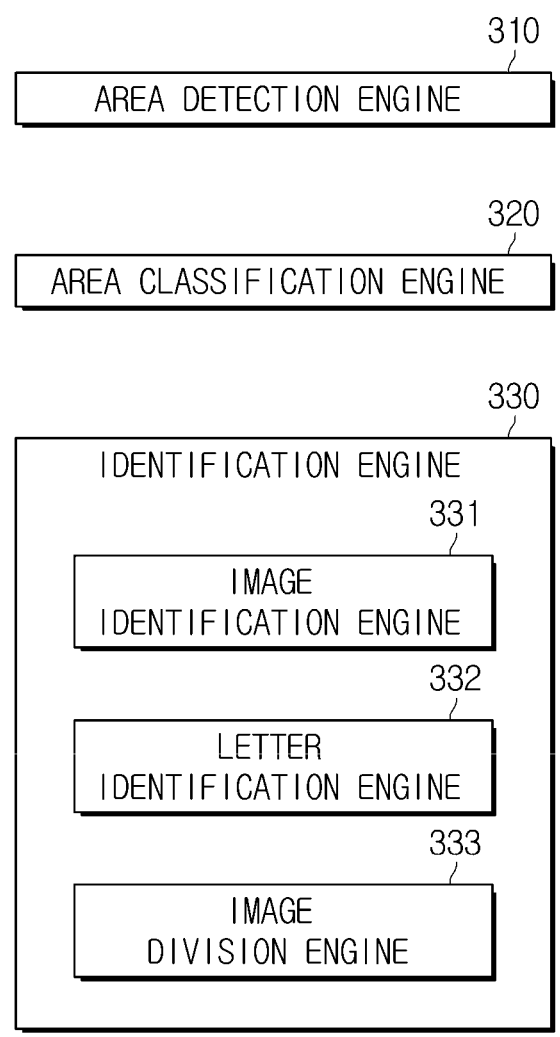
FIG. 11 shows a configuration of an object identification engine of a computing apparatus, according to an embodiment.
Figure 12:
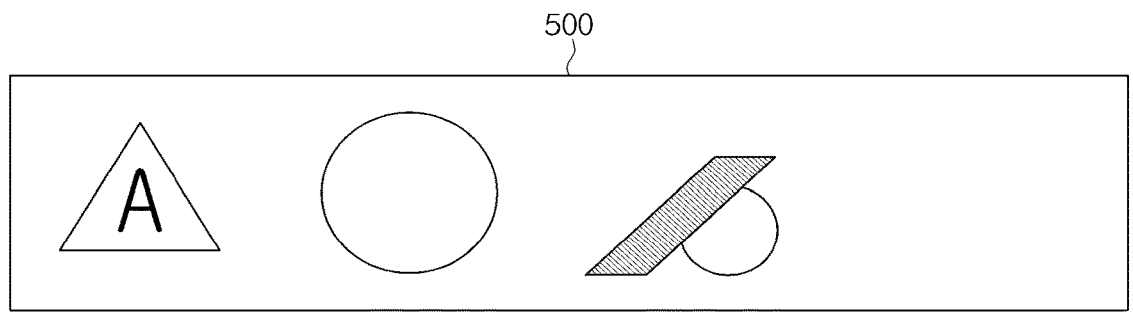
FIGS. 12, 13, and 14 show an example of object identification by an object identification engine included in a computing apparatus, according to an embodiment.
Figure 12:
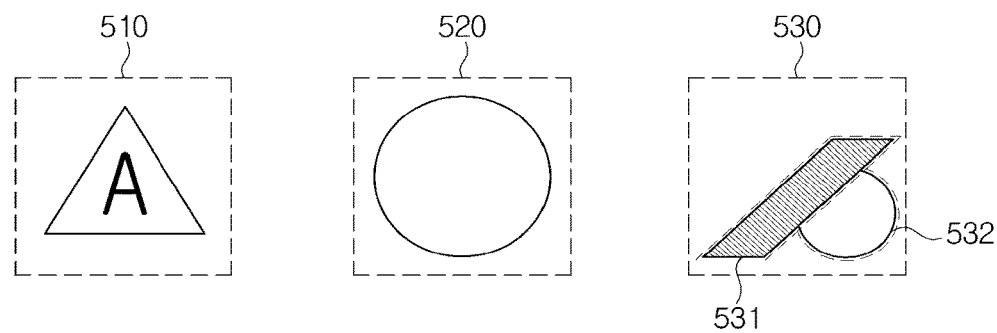
Figure 12:
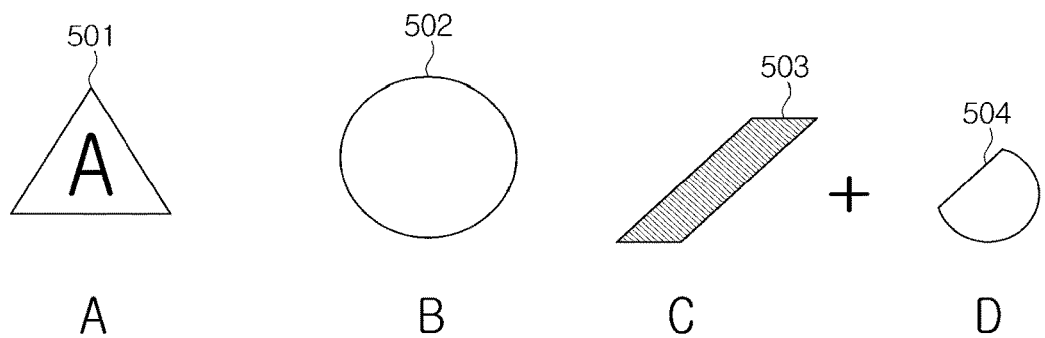
Figure 13:
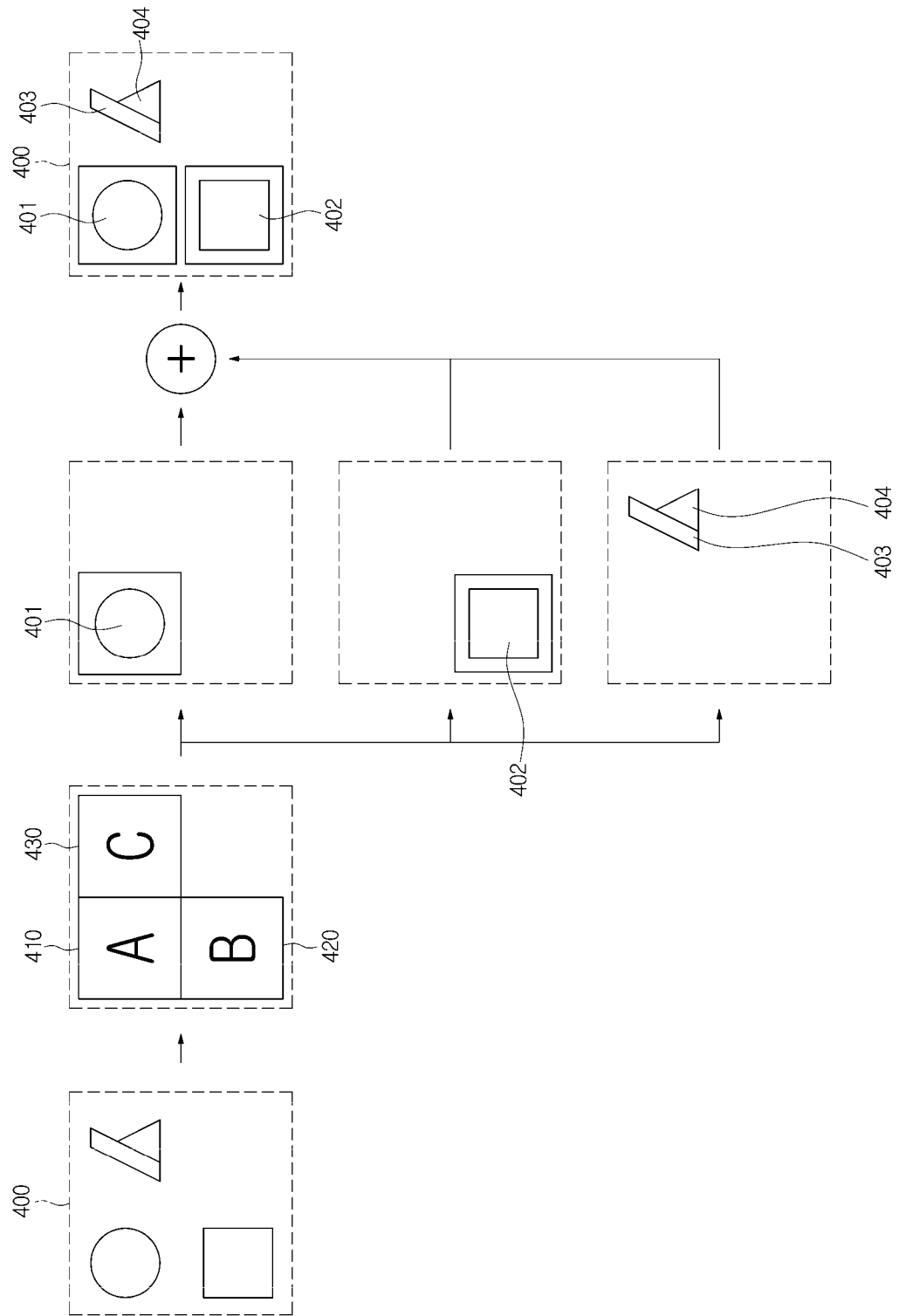
Figure 14:
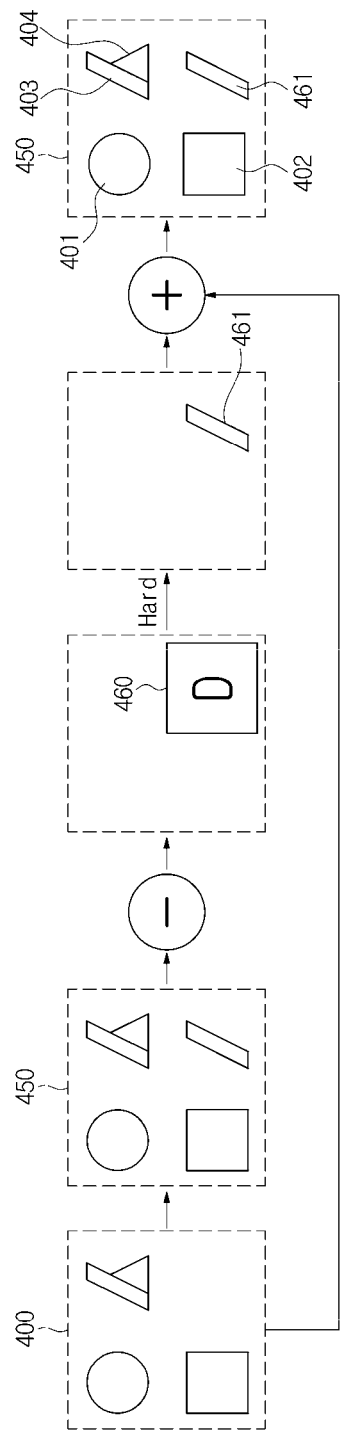

FIG. 11 shows a configuration of an object identification engine of a computing apparatus, according to an embodiment. FIGS. 12, 13, and 14 show an example of food identification by an object identification engine included in a computing apparatus, according to an embodiment.

Referring to FIG. 11, the computing apparatus 200 may include an area detection engine 251, an area classification engine 252, and an identification engine 253. The area detection engine 251, the area classification engine 252, and the identification engine 253 may each be implemented in hardware or software. For example, the area detection engine 251, the area classification engine 252, and the identification engine 253 may each be hardware, i.e., part of the processor 241, or software, i.e., part of a program stored in the storage 230.

The area detection engine 251 may obtain a storage chamber inside image 500 obtained by taking a picture of the inside of the storage chamber 100 and identify food areas 510, 520, and 530 in which foods 501, 502, 503, and 504 are located in the storage chamber inside image 500.

The area detection engine 251 may identify the food areas 510, 520, and 530 in which foods are located in different directions.

For example, the area detection engine 251 may separate the food areas 510, 520, and 530 from the background area based on a difference between an inside image of the empty storage chamber 110 and the inside image of the storage chamber 110 with foods stored therein. The area detection engine 251 may receive the storage chamber inside image and a reference image, which is the inside image of the empty storage chamber, from the refrigerator 100, and separate the food areas 510, 520, and 530 in which foods are located from the background area that is a background to the storage chamber 110.

In another example, the area detection engine 251 may extract contours (edge detection) from the storage chamber inside image, and separate the food areas 510, 520, and 530 in which foods are located from the background area based on the contours in the image.

In yet another example, the area detection engine 251 may extract information about a change in color from the storage chamber inside image, and separate the food areas 510, 520, and 530 in which foods are located from the background area based on a boundary subjected to dramatically changing color in the storage chamber inside image.

Furthermore, the area detection engine 251 may eliminate images of shelves 110c and/or a reflected image of a food from the food areas 510, 520, and 530 to increase the food identification rate.

For example, the area detection engine 251 may obtain the storage chamber inside image 500 as shown in (a) of FIG. 12, and identify the food areas 510, 520, and 530 in which foods 501, 502, 503, and 504 are located from the storage chamber inside image 500, as shown in (b) of FIG. 12. The area detection engine 251 may identify a first food area 510 where first food A 501 is located, a second food area 520 where second food B 502 is located, and a third food area 530 where third and fourth foods C and D 503 and 504 are located.

The area classification engine 252 may classify the food areas 510, 520 and 530 identified by the area detection engine 251. For example, the area classification engine 252 may classify the food areas 510, 520, and 530 by level of difficulty in identifying a food from each of the food areas 510, 520, and 530.

The area classification engine 252 may classify the food areas 510, 520, and 530 into a letter identification area in which a letter is detected, an image identification area in which a single food is detected, and an image division area in which a plurality of foods are detected.

The area classification engine 252 may sort out the letter identification area by extracting a letter from the food areas 510, 520, and 530 using a letter extraction algorithm. For example, canned foods or canned hams do not have unique shape from which to identify the food, but some letter(s) is written on the outside of the food. A food in the letter identification area may be identified by letter identification.

If no letter is extracted by the letter extraction algorithm, the area classification engine 252 may determine whether a single food is located or a plurality of foods are located by overlapping each other in the food areas 510, 520, and 530 by using the edge detection and/or color change detection for the food areas 510, 520, and 530.

Especially, when a boundary subjected to dramatically changing color is detected in the food area 510, 520, and 530, the area classification engine 252 may categorize it as the image division area where a plurality of foods are located by overlapping each other in the food area 510, 520, and 530. Furthermore, when a boundary subjected to dramatically changing color is not detected in the food area 510, 520, and 530, the area classification engine 252 may categorize it as the image identification area where a single food is located in the food area 510, 520, and 530.

For example, the area classification engine 252 may extract letter "A" from the first food area 510 shown in (b) of FIG. 12, using a letter extraction algorithm. Accordingly, the area classification engine 252 may categorize the first food area 510 as the letter identification area.

Furthermore, the area classification engine 252 may extract no letter from the second food area 520 shown in (b) of FIG. 12 and may not detect any boundary subjected to dramatically changing color in the second food area 520. Accordingly, the area classification engine 252 may categorize the second food area 520 as the image identification area.

Moreover, the area classification engine 252 may detect a boundary subjected to dramatically changing color in the third food area 530 shown in (b) of FIG. 12. Accordingly, the area classification engine 252 may categorize the third food area 530 as the image division area.

The identification engine 253 may identify foods in the food areas 510, 520, and 530 categorized by the area classification engine 252, using different food identification methods or engines. Specifically, the identification engine 253 may identify foods in the food areas 510, 520, and 530 using at least one of the letter identification engine 331, the image identification engine 332, and the image division engine 333.

For example, the identification engine 253 may use the letter identification engine 331 to identify letter "A" from the first food area 510 as shown in (c) of FIG. 12, and identify the food A 501 of the first food area 510 based on the letter "A".

Furthermore, the identification engine 253 may use the image identification engine 332 to identify the food B 502 from the second food area 520, as shown in (c) of FIG. 12. Specifically, the identification engine 253 may identify the food B 502 from the image itself of the second food area 520.

Furthermore, the identification engine 253 may use the image division engine 333 to divide an image in which foods overlap each other. For example, the image division engine 333 may convert the image division area into a color space in which the plurality of foods are distinguished, and then divide the color space into a plurality of food areas based on a suitable threshold. Moreover, the image division engine 333 may divide the image division area into a plurality of divided food areas by grouping areas having similar colors.

As a result of image division, the third food area 530 shown in (b) of FIG. 12 may be divided into a first divided food area 531 and a second divided food area 532. Furthermore, the identification engine 253 may perform food identification on each of the first divided food area 531 and the second divided food area 532 using the image identification engine 333. The identification engine 253 may identify food C 503 from the first divided food area 531 and food D 504 from the second divided food area 532.

As described above, the area detection engine 251 may compare the image of the empty storage chamber 110 with the received image to identify the food areas 510, 520, and 530 where foods are located. The area classification engine 252 may classify the food areas 510, 520, and 530 based on whether the food areas 510, 520, and 530 contain a letter and/or a color boundary.

The identification engine 253 may identify a food using different identification algorithms for the food areas 510, 520, and 530 classified into different groups. For example, the identification engine 253 may use the letter identification engine 331 for a food area containing a letter to identify a food in the food area, and the image division engine 333 for a food area containing a color boundary to divide the food area. Furthermore, the identification engine 253 may use the image identification engine 332 to identify a food from an image.

In addition, as shown in FIG. 13, the computing apparatus 200 may output a storage chamber inside image 400 containing information about foods 401, 402, 403, and 404.

The area detection engine 251 may obtain the storage chamber inside image 400, and identify a first food area 410 where first food 401 is located, a second food area 420 where second food 402 is located, and a third food area 430 where third and fourth foods 403 and 404 are located from the storage chamber inside image 400.

The area classification engine 252 may categorize the first food area 410 from which a letter is extracted as the letter identification area, the second food area 410 from which no letter is extracted as the image identification area, and the third food area 430 having a boundary subjected to dramatically changing color as the image division area.

The letter identification engine 331 of the identification engine 253 may identify the first food 401 in the first food area 410 by letter identification, and the image identification engine 332 of the identification engine 253 may identify the second food 402 in the second food area 420 by image identification. The image division engine 333 of the identification engine 253 may divide the third food area 430 into an image of the third food 403 and an image of the fourth food 404, and the letter identification engine 331 and/or the image identification engine 332 may identify the third food 403 and the fourth food 404 from the image of the third food 403 and the image of the fourth food 404, respectively.

The identification engine 253 may tag the first food 401 to the first food area 410, the second food 402 to the second food area 420, and the third food 403 and fourth food 404 to the third food area 430. Furthermore, the area detection engine 253 may output the storage chamber inside image 400 that contains the first food area 410 to which the first food 401 is tagged, the second food area 420 to which the second food 402 is tagged, and the third food area 430 to which the third food 403 and the fourth food 404 are tagged.

As shown in FIG. 14, the computing apparatus 200 may use the storage chamber inside image 400 from which the foods 401, 402, 403, and 404 are identified in advance, to identify a food 461 added to a new storage chamber inside image 450.

The area detection engine 251 may obtain the new storage chamber inside image 450, and identify a fourth food area 460 in which the fifth food 461 is located based on a difference between the old storage chamber inside image 400 and the new storage chamber inside image 450.

The area classification engine 252 may categorize the fourth food area 460 as one of the letter identification area, the image identification area, and the image division area.

The identification engine 253 may identify the fifth food 461 in the fourth food area 460 according to the category of the fourth food area 460, i.e., whether the fourth food area 460 is the letter identification area, or the image identification area, or the image division area.

The identification engine 253 may tag the fifth food 461 to the fourth food area 460. Furthermore, the identification engine 253 may output the new storage chamber inside image 450 to which the fifth food 461 is additionally tagged by combining the fourth food area 460 to which the fifth food 461 is tagged with the old storage chamber inside image 400.

Figure 15:
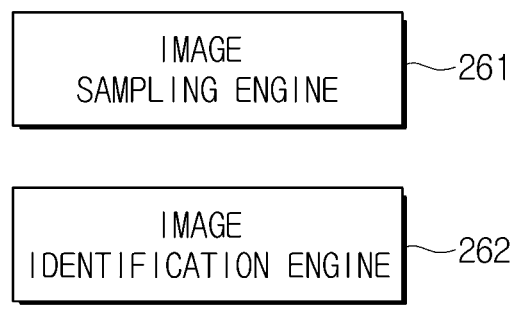
FIG. 15 shows another example of an object identification engine of a computing apparatus, according to an embodiment.
Figure 16:
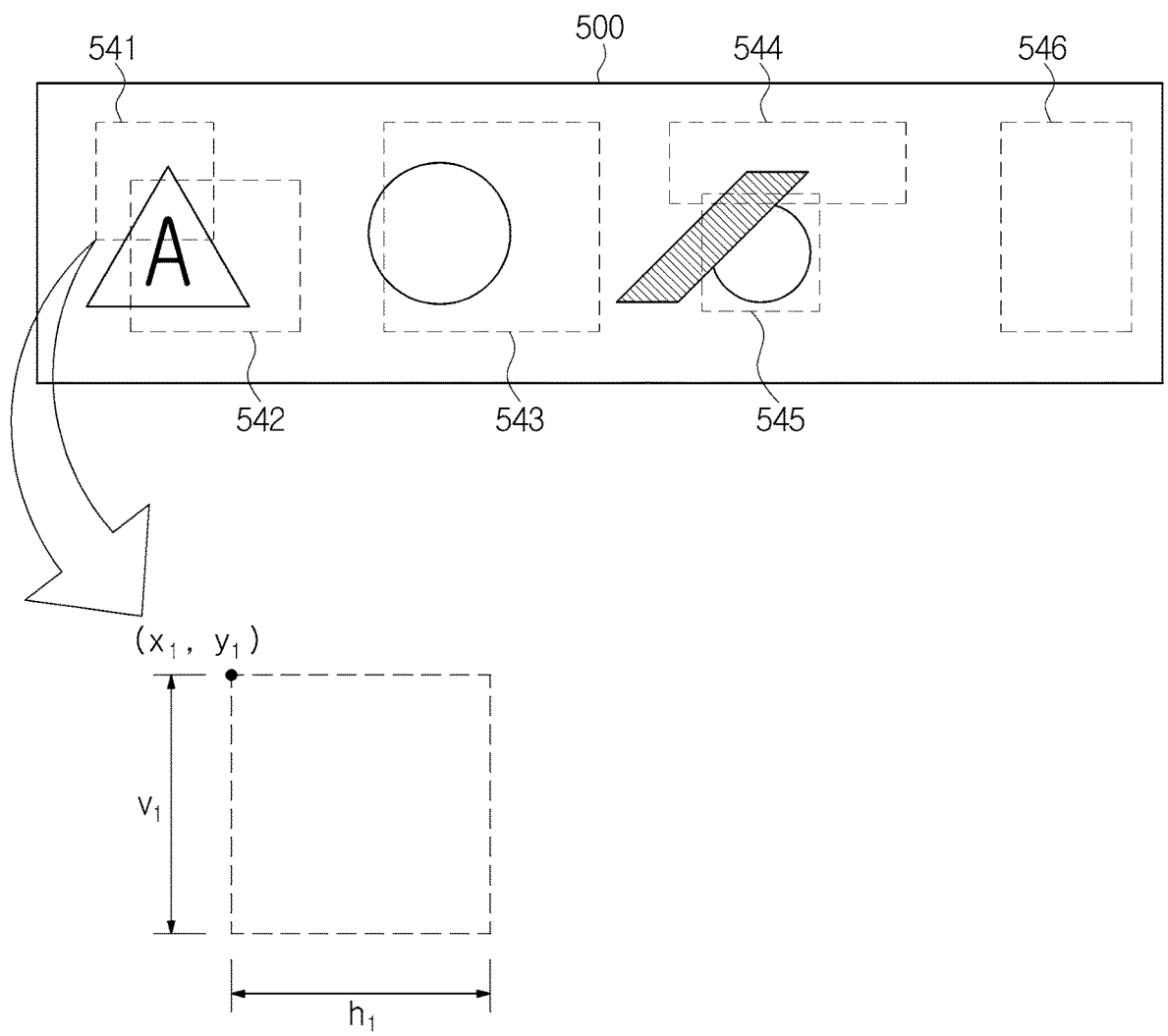

FIG. 15 shows another example of an object identification engine of a computing apparatus, according to an embodiment, and FIGS. 16 and 17 show another example of object identification by an object identification engine included in a computing apparatus, according to an embodiment.

Referring to FIG. 15, the computing apparatus 200 may include an image sampling engine 261 and an image identification engine 262. The image sampling engine 261 and the image identification engine 262 may each be implemented in hardware or software. For example, the image sampling engine 261 and the image identification engine 262 may each be hardware, i.e., part of the processor 241, or software, i.e., part of a program stored in the storage 230.

The image sampling engine 261 may obtain a storage chamber inside image 500 by taking a picture of the inside of the storage chamber 100 and extract a plurality of sample images 541 to 546 in the storage chamber inside image 500.

The image sampling engine 261 may extract the sample images 541 to 546 in various ways.

The image sampling engine 261 may extract the sample images 541 to 546 having an arbitrary size (horizontal length and vertical length) at arbitrary positions (x-axis coordinate and y-axis coordinate). The image sampling engine 261 may include a random function, and may select an x-axis coordinate (x), a y-axis coordinate (y), a horizontal length (h), and a vertical length (v) of the sample image using the random function. The image sampling engine 261 may extract an image having the selected coordinates (x, y) and size (h, v) from the storage chamber inside image 500.

For example, as shown in FIG. 16, the image sampling engine 261 may select an arbitrary first coordinate (x1, y1) and an arbitrary first size (h1, v1), and may extract a first sample image 541 having the first coordinate (x1, y1) and the first size (h1, v1) from the storage chamber inside image 500. In addition, the image sampling engine 261 may extract a second sample image 542 having a second coordinate (x2, y2) and a second size (h2, v2), a third sample image 543 having a third coordinate (x3, y3) and a third size (h3, v3), a fourth sample image 542 having a fourth coordinate (x4, y4) and a fourth size (h4, v4), . . . , and an n-th sample image having an n-th coordinate and an n-th size. The number of sample images is not limited.

In addition, the image sampling engine 261 may extract the plurality of sample images having a predetermined size from a predetermined location. For example, the image sampling engine 261 may partition the storage chamber inside image 500 into the predetermined size, and may obtain the sample images partitioned from the storage chamber inside image 500. As another example, the image sampling engine 261 may obtain the sample images having the predetermined size from the storage chamber inside image 500 at predetermined intervals.

In addition, the image sampling engine 261 may extract the plurality of sample images having the predetermined size at an arbitrary location.

The image identification engine 262 may identify foods included in the storage chamber inside image 500 based on the plurality of sample images 541 to 546 extracted by the image sampling engine 261.

Each of the plurality of sample images 541 to 546 is provided to the image identification engine 262, and the image identification engine 262 may identify foods included in each of the plurality of sample images 541 to 546. The image identification engine 262 may include, for example, the neural network. Luminance values and/or color values of the plurality of pixels included in the sample image may be input to each of the plurality of input nodes i1, i2 of the neural network, and the plurality of output nodes o1, o2 may output numerical values (e.g., probability) indicating which food among the plurality of predetermined foods are included in the sample images.

The image identification engine 262 may output a first identification result and a second identification result based on the numerical values output from the neural network. For example, the image identification engine 262 may select the food with the largest numerical value output from the neural network as the first identification result, and select the food with the second largest numerical value output from the neural network as the second identification result.

The image identification engine 262 may output identification data including the coordinate and size indicating the sample image, the first identification result of the sample image, and the second identification result of the sample image. For example, as shown in FIG. 17, the identification data may include the coordinate (x1, y1) and size (h1, v1) of the first sample image 541, the first identification result and the second identification result; the coordinate (x2, y2) and size (h2, v2) of the second sample image 542, the first identification result and the second identification result; the coordinate (x3, y3) and size (h3, v3) of the third sample image 543, the first identification result and the second identification result; . . . , and the coordinate and size of the n-sample image, the first identification result and the second identification result. Hereinafter, operation of the food management system 1 including the refrigerator 1, the computing apparatus 200, and the UE 300 was described.

Hereinafter, the operation of the food management system 1 including the refrigerator 100, the server device 200, and the user device 300 will be described.

Figure 18:
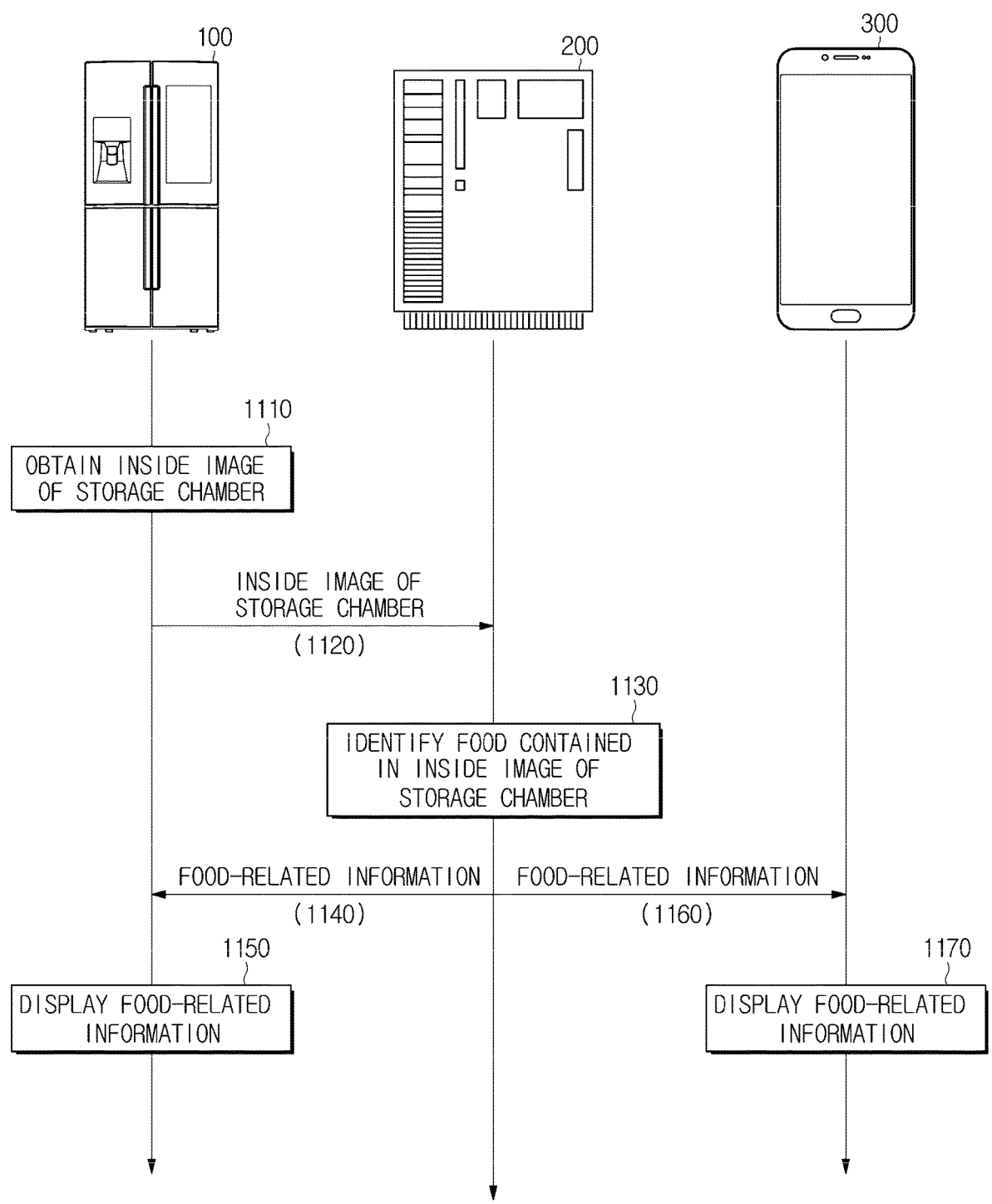
FIG. 18 shows an example of a food identification method of a food management system, according to an embodiment.
Figure 19:
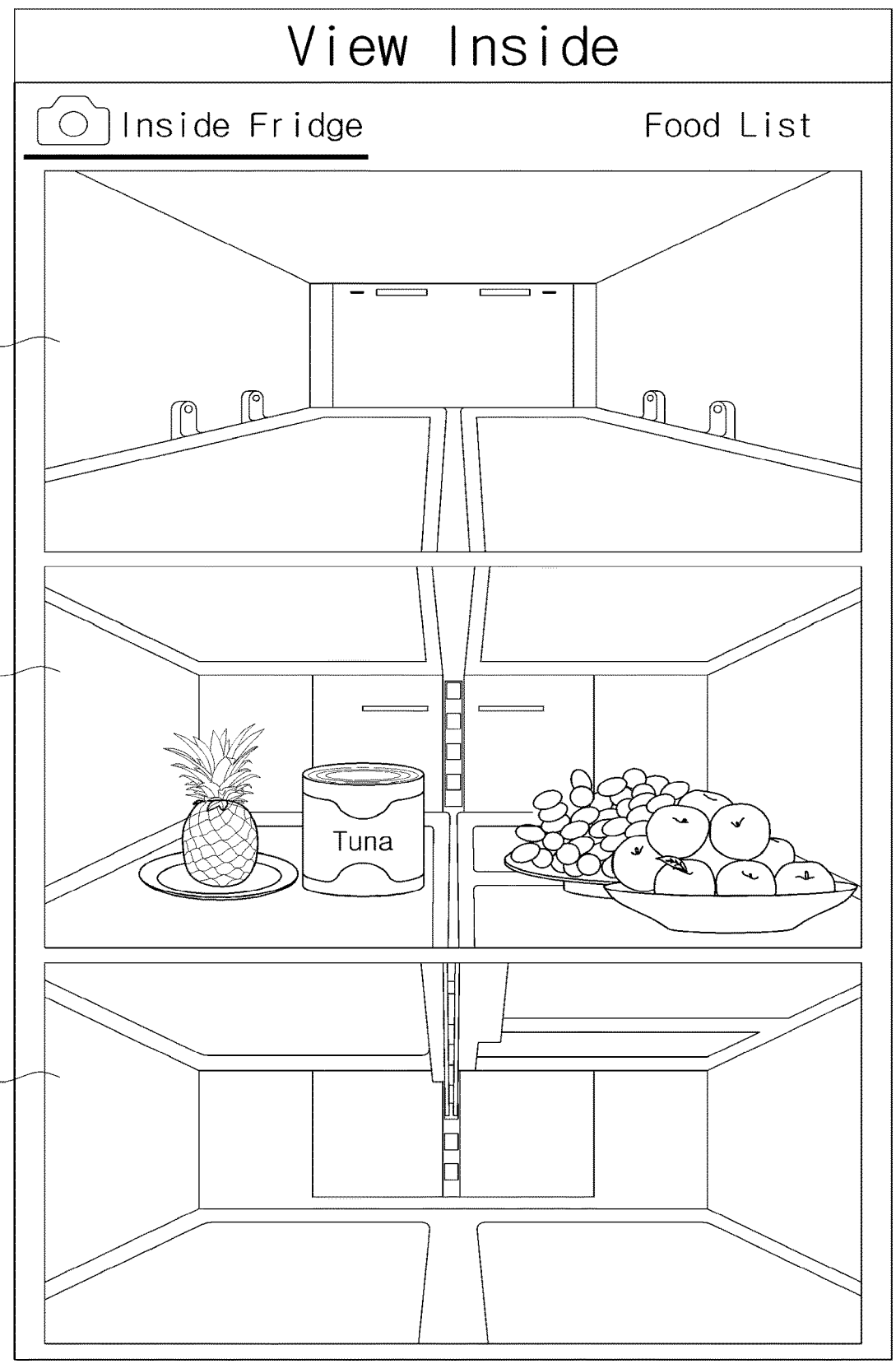
FIG. 19 shows an image of the inside of a storage chamber captured according to the food identification method shown in FIG. 18.
Figure 20:
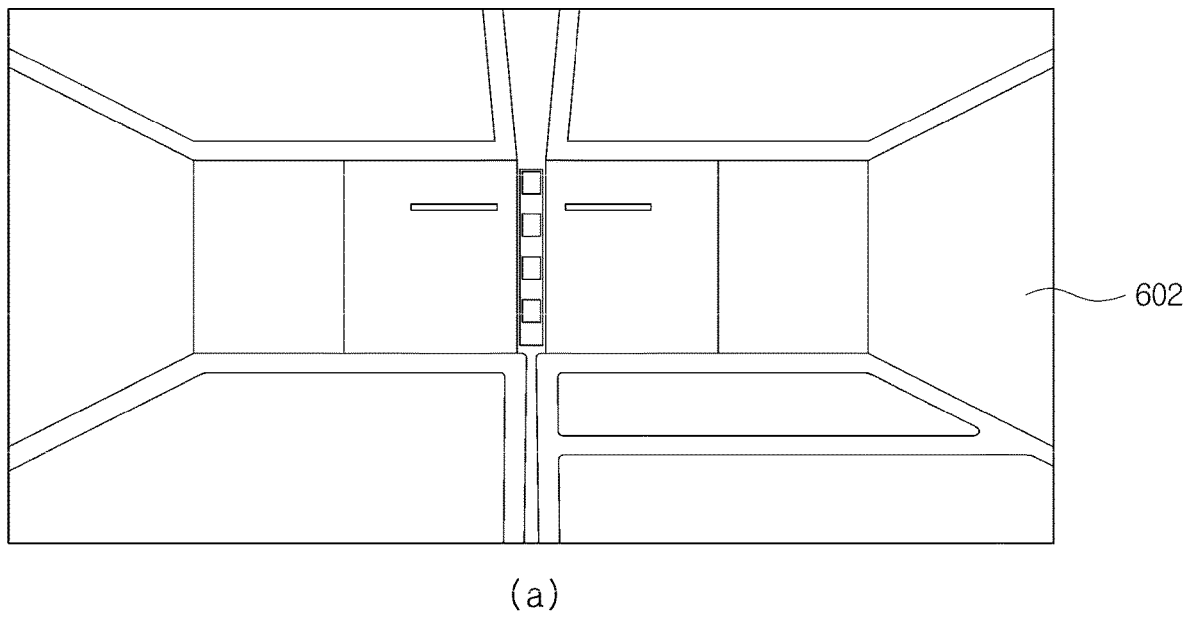
FIG. 20 shows an example of identification of food areas according to the food identification method shown in FIG. 18.
Figure 20:
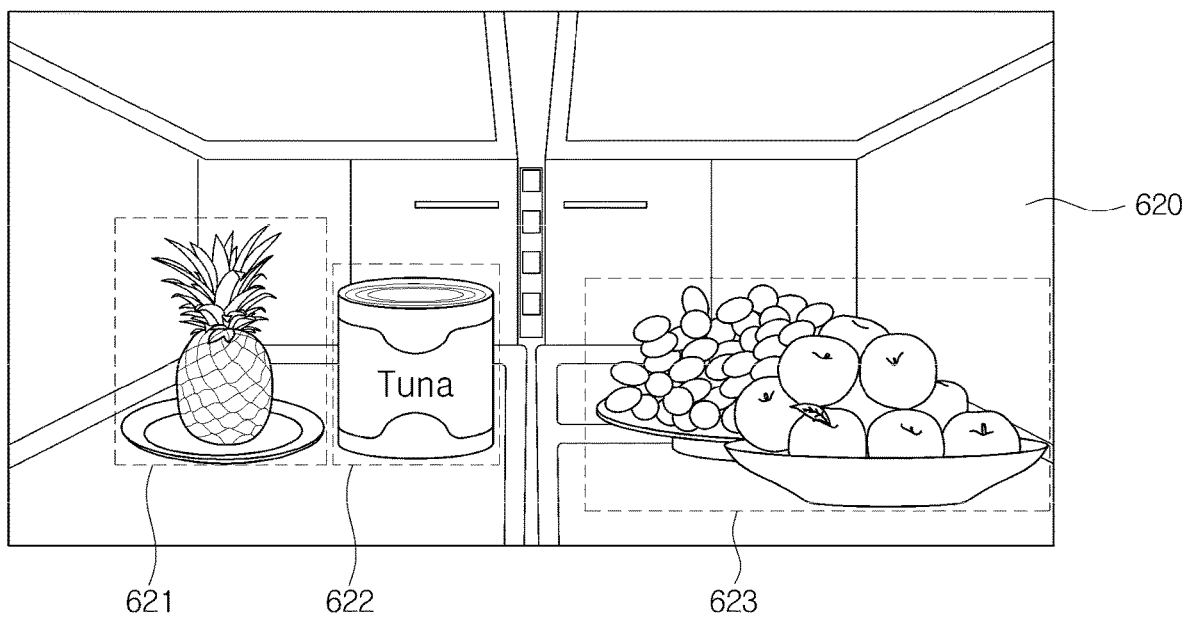
Figure 21:
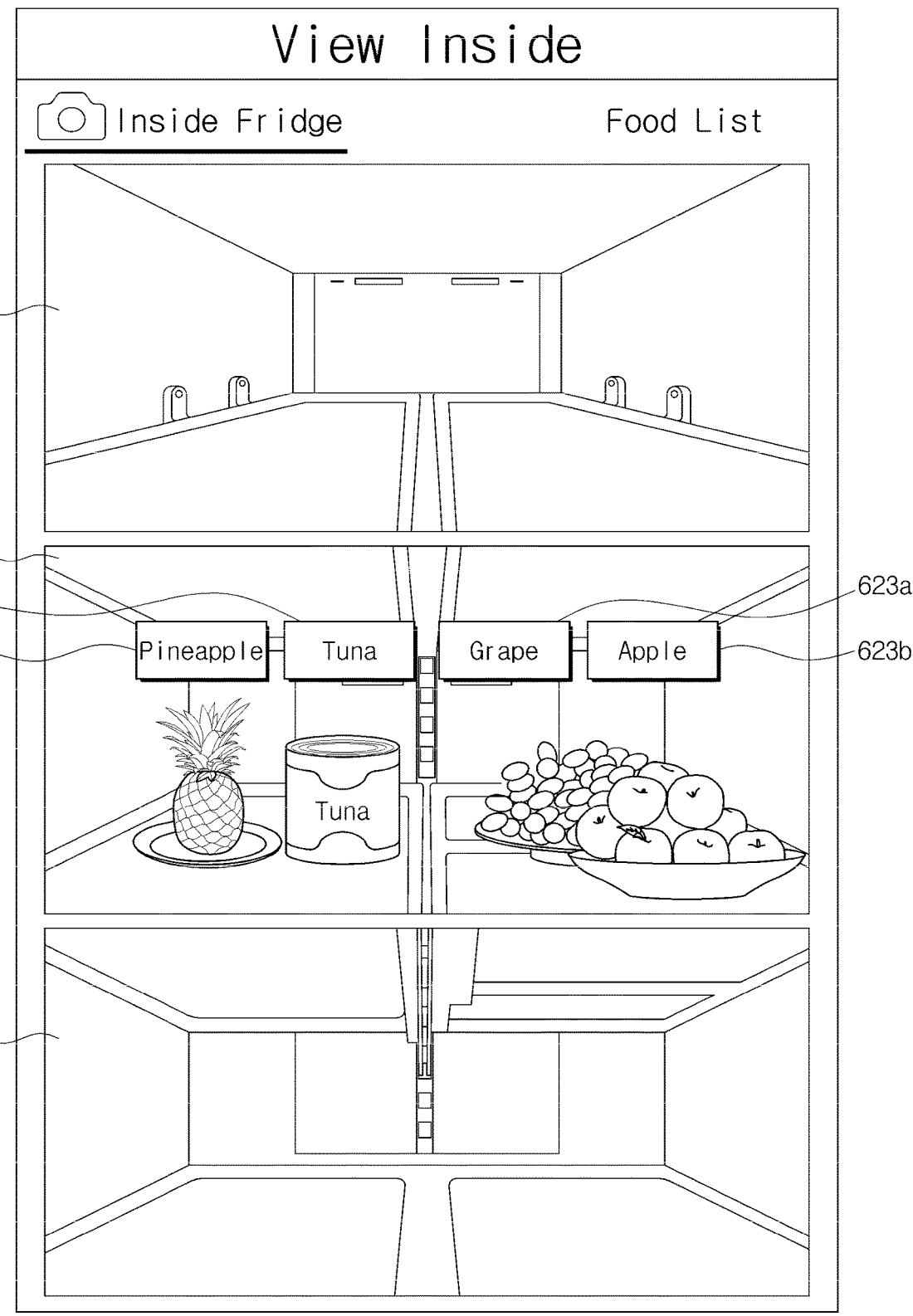
FIG. 21 shows an example of displaying food-related information according to the food identification method shown in FIG. 18.
Figure 22:
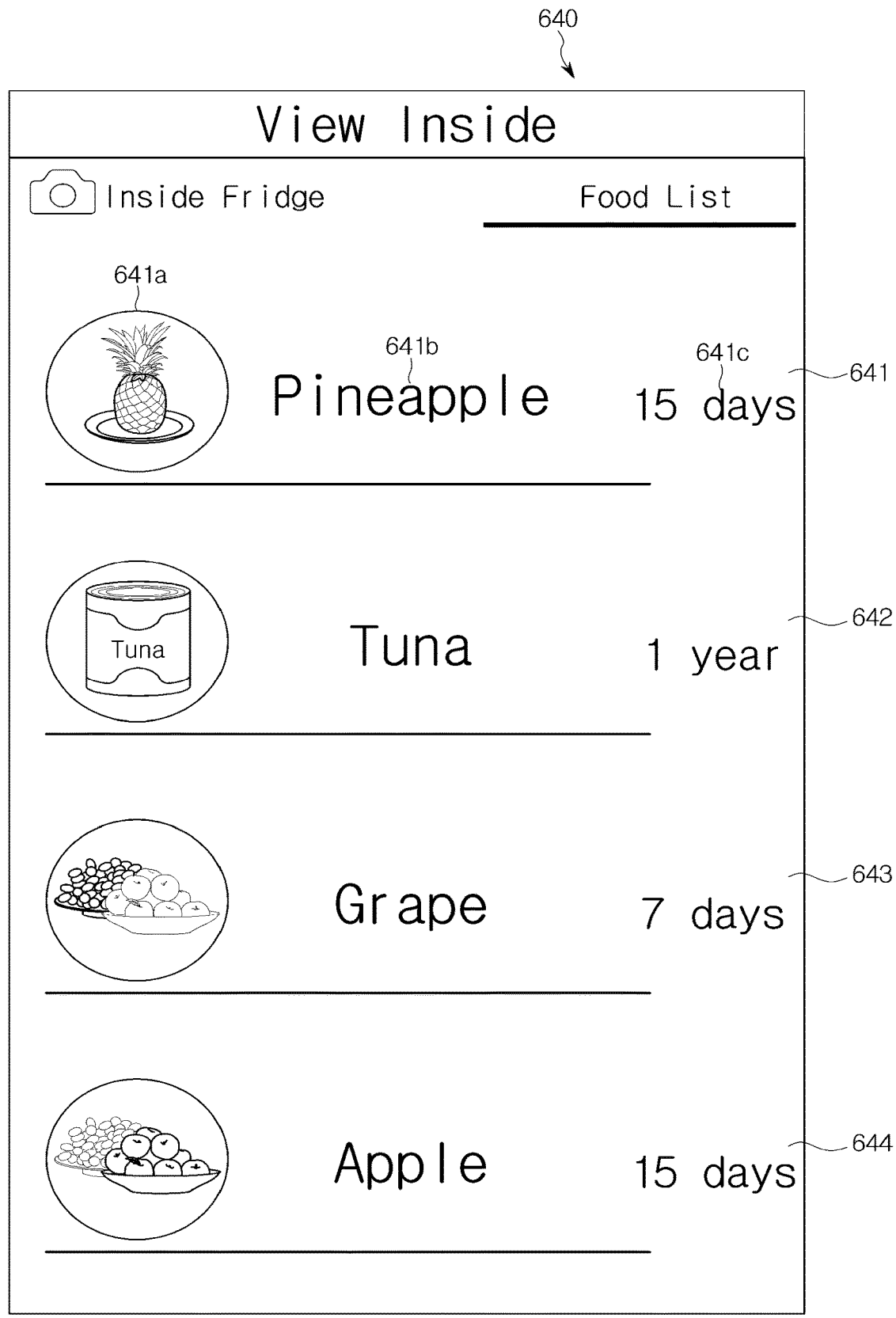
FIG. 22 shows another example of displaying food-related information according to the food identification method shown in FIG. 18.

FIG. 18 shows an example of a food identification method of a food management system, according to an embodiment; FIG. 19 shows an image of insides of storage chambers captured according to the food identification method shown in FIG. 18. FIG. 20 shows an example of identification of food areas according to the food identification method shown in FIG. 18. FIG. 21 shows an example of displaying food-related information according to the food identification method shown in FIG. 18. FIG. 22 shows another example of displaying food-related information according to the food identification method shown in FIG. 18.

A food management method 1100 of the food management system 1 will be described in connection with FIGS. 18, 19, 20, 21, and 22.

The refrigerator 100 obtains an inside image of the storage chamber 110, in 1110.

The refrigerator 100 may capture an image of the inside of the storage chamber 110 with the camera 150, and obtain an inside image of the storage chamber 110.

The controller 190 may control the camera 150 to capture an image of the inside of the storage chamber 110 when detecting that the door 120, which has been opened, is closed. The camera 150 may capture an image of a plurality of spaces separated by the shelves 110c. For example, the first imager 151 of the camera 150 may capture an image of the first storage space 111a of the upper storage chamber 111, the second imager 151 may capture an image of the second storage space 111b, and the third imager 151 may capture an image of the third storage space 111c. The controller 190 may obtain the inside image of the storage chamber 110 from the camera 150.

In another example, the controller 190 may control the camera 150 to capture an inside image of the storage chamber 110 in response to an input from a user through the touch screen display 130, and obtain the inside image of the storage chamber 110 from the camera 150.

Furthermore, the controller 190 may display the inside image of the storage chamber 110 captured by the camera 150 on the touch screen display 130, as shown in FIG. 19. For example, the controller 190 may display an inside image 610 of the first storage space 111a, an inside image 620 of the second storage space 111b, and an inside image 630 of the third storage space 111c on the touch screen display 130.

The refrigerator 100 sends the inside image of the storage chamber 110 to the computing apparatus 200, which in turn receives the inside image of the storage chamber 110 from the refrigerator 100, in 1120.

The refrigerator 100 may send the inside image of the storage chamber 110 to the computing apparatus 200 over the communication network NET. The controller 190 may control the communicator 170 to send the inside image of the storage chamber 110 to the computing apparatus 200.

The computing apparatus 200 may receive the inside image of the storage chamber 110 from the refrigerator 100 over the communication network NET. The processing device 240 may obtain the inside image of the storage chamber 110 through the communication device 220.

The computing apparatus 200 identifies a food contained in the inside image of the storage chamber 110, in 1130.

The computing apparatus 200 may use the trained object identification engine 231 to identify a food contained in the inside image of the storage chamber 110.

The processing device 240 may identify food areas 621, 622, and 623 where foods are located, from a storage chamber inside image 620. For example, the processing device 240 may separate the food areas 621, 622, and 623 from the background area based on a difference between an inside image 602 of the empty storage chamber 110 and the inside image 620 of the storage chamber 110 with foods stored therein, as shown in FIG. 20. The processing device 240 may identify the first food area 621 where a pineapple is located, the second food area 622 where a can is located, and the third food area 623 where overlapping grapes and apples are located.

The processing device 240 may classify the food areas 621, 622, and 623. For example, the processing device 240 may classify the food areas 621, 622, and 623 into a letter identification area in which a letter is detected, an image identification area in which a single food is detected, and an image division area in which a plurality of foods are detected.

The processing device 240 may categorize the first food area 621 where the pineapple is located as the image identification area, the second food area 622 where the can is located as the letter identification area, and the third food area 623 where overlapping grapes and apples are located as the image division area.

The processing device 240 may identify the pineapple by applying an image identification algorithm for the first food area 621, and identify the can by applying a letter identification algorithm for the second food area 622. Furthermore, the processing device 240 may separate an image of the grapes and an image of the apples from the third food area 623, and identify the grapes and apples by applying the image identification algorithm for each of the image of the grapes and the image of the apples.

For example, the processing device 240 may include the object identification engine 231 that employs neural network. The processing device 240 may input a luminance value and/or a color value of each of the plurality of pixels included in the image to each of the plurality of input nodes i1, i2 of the neural network. The processing device 240 may apply weights w1 to w4 to values of the plurality of input nodes i1, i2, and output the weighted values to the plurality of hidden nodes h1, h2. The processing device 240 may input the values input to the plurality of hidden nodes h1, h2 to the sigmoid function, and apply the weights w5 to w8 to the output values of the sigmoid function and output the weighted output values to the plurality of output nodes o1, o2. The processing device 240 may input the values input to the plurality of output nodes o1, o2 to the sigmoid function, and output values of the sigmoid function are outputs of the neural network. Each of the plurality of output nodes o1, o2 is allocated a food, and an output value of each of the plurality of output nodes o1, o2 may represent a probability of being the allocated food. The processing device 240 may identify a food based on the outputs of the plurality of output nodes o1, o2.

The processing device 240 may collect information relating to a food identified from each of the food areas 621, 622 and 623 (food-related information). For example, the food-related information may include an image, e.g., location of the food image in the storage chamber inside image, name, category, and shelf life for refrigeration (or freezing) of the food.

Furthermore, the processing device 240 may integrate pieces of information relating to the food identified from the food areas 621, 622 and 623.

The computing apparatus 200 sends the food-related information to the refrigerator 100, and the refrigerator 100 receives the food-related information from the computing apparatus 200, in 1140.

The computing apparatus 200 may send the food-related information to the refrigerator 100 over the communication network NET. The processing device 240 may control the communication device 220 to send the food-related information to the refrigerator 100.

The refrigerator 100 may receive the food-related information from the computing apparatus 200 over the communication network NET. The controller 190 may obtain the food-related information through the communicator 170.

The refrigerator 100 displays the food-related information received from the computing apparatus 200, in 1150.

The controller 190 may display the food-related information received from the computing apparatus 200 on the touch screen display 130.

For example, the controller 190 may additionally display food-related information 621a, 622a, 623a, and 623b onto the inside images 610, 620, and 630 of the storage chamber 110. As shown in FIG. 21, the controller 190 may display the information 621a about the pineapple, the information 622a about the can, and the information 623a about the grapes, and the information 623b about the apples on the inside images 610, 620, and 630 of the storage chamber 110. For example, the controller 190 may display the name of the pineapple, the name of the can, the name of the grapes, and the name of the apples on the inside images 610, 620, and 630 of the storage chamber 110.

In another example, the controller 190 may display a list 640 of information of foods stored in the storage chamber 110. As shown in FIG. 22, the controller 190 may display the information 641 about the pineapple, the information 642 about the can, the information 643 about the grapes, and the information 644 about the apples. The controller 190 may display images, e.g., images of food areas separated from the storage chamber inside image, names, categories, and shelf lives for refrigeration (or freezing) on the touch screen display 130. For example, as shown in FIG. 22, the controller 190 may display an image of a pineapple 641a contained in the inside image of the storage chamber 110, a name of the pineapple 641b, and a shelf life of the pineapple 641c.

The computing apparatus 200 sends the food-related information to the UE 300, and the UE 300 receives the food-related information from the computing apparatus 200, in 1160.

The UE 300 displays the food-related information received from the computing apparatus 200, in 1170.

As described above, the computing apparatus 200 may receive an image of a food stored from the refrigerator 100, and identify the food stored in the refrigerator 100 using the object identification engine 231. The refrigerator 100 may also display the food-related information received from the computing apparatus 200. In other words, the refrigerator 100 may display information relating to a food stored in the storage chamber 110 without an input from the user.

Figure 23:
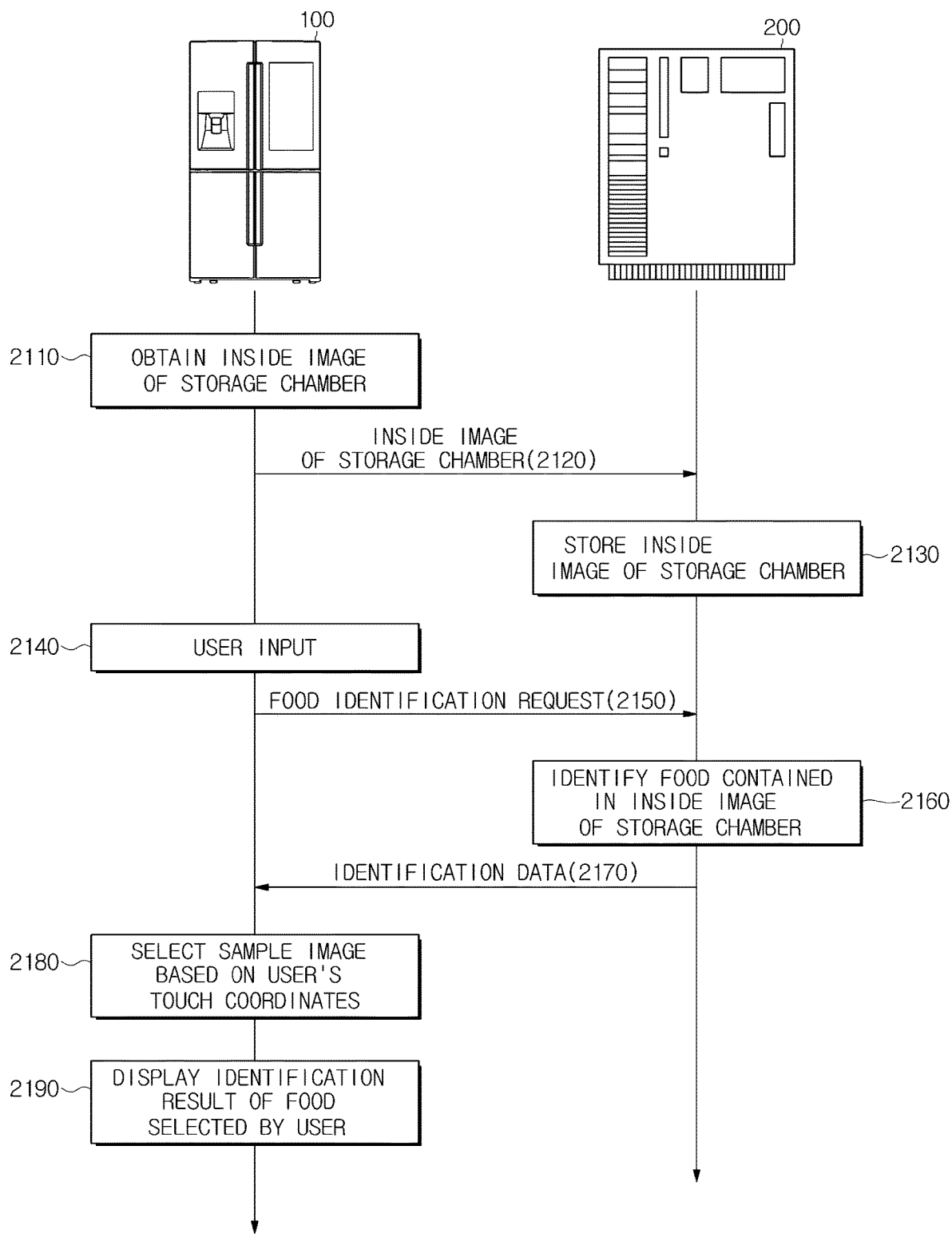
FIG. 23 shows another example of a food identification method of a food management system, according to an embodiment.
Figure 24:
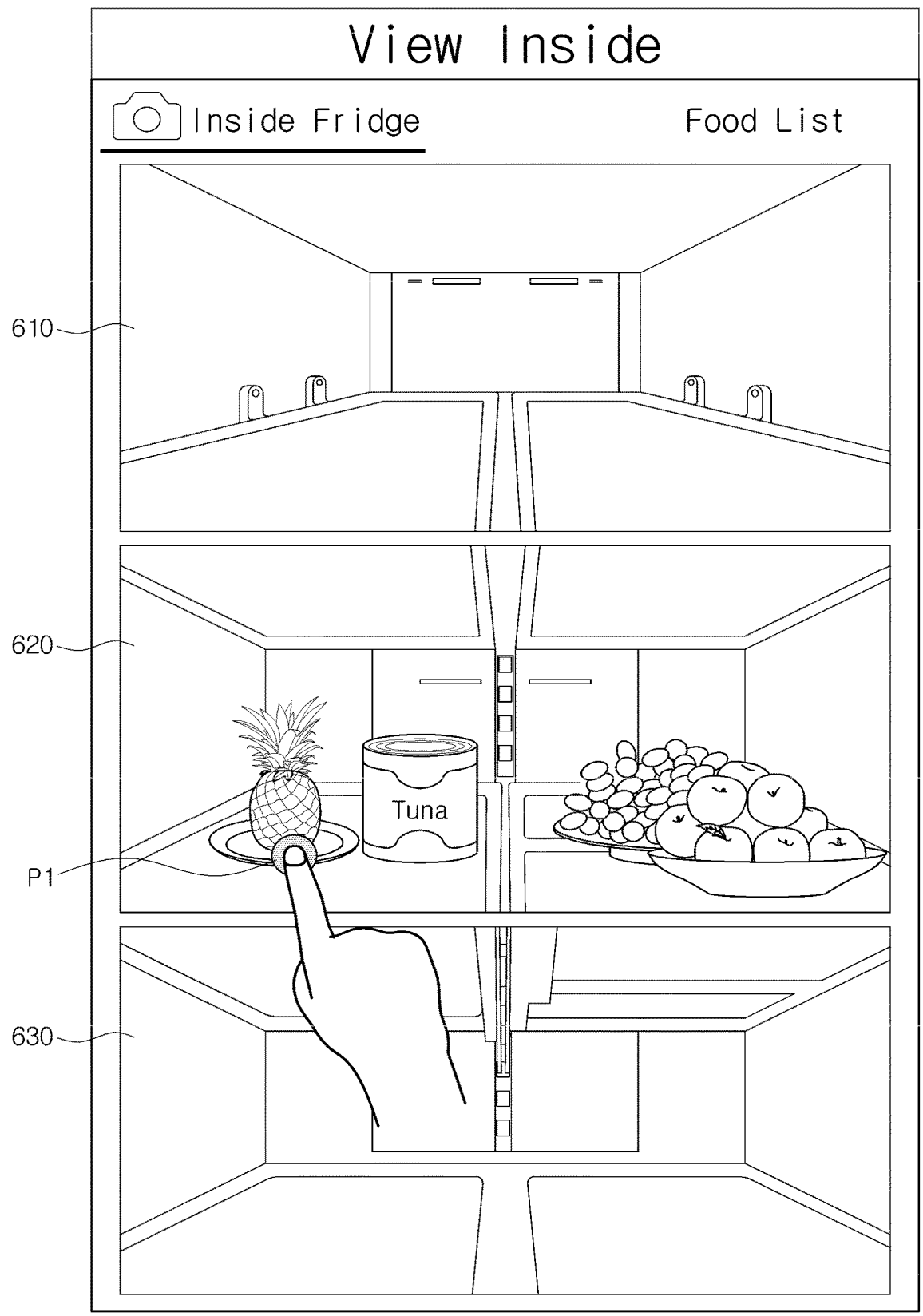
FIG. 24 shows an example of receiving a user's touch input according to the food identification method shown in FIG. 23.
Figure 25:
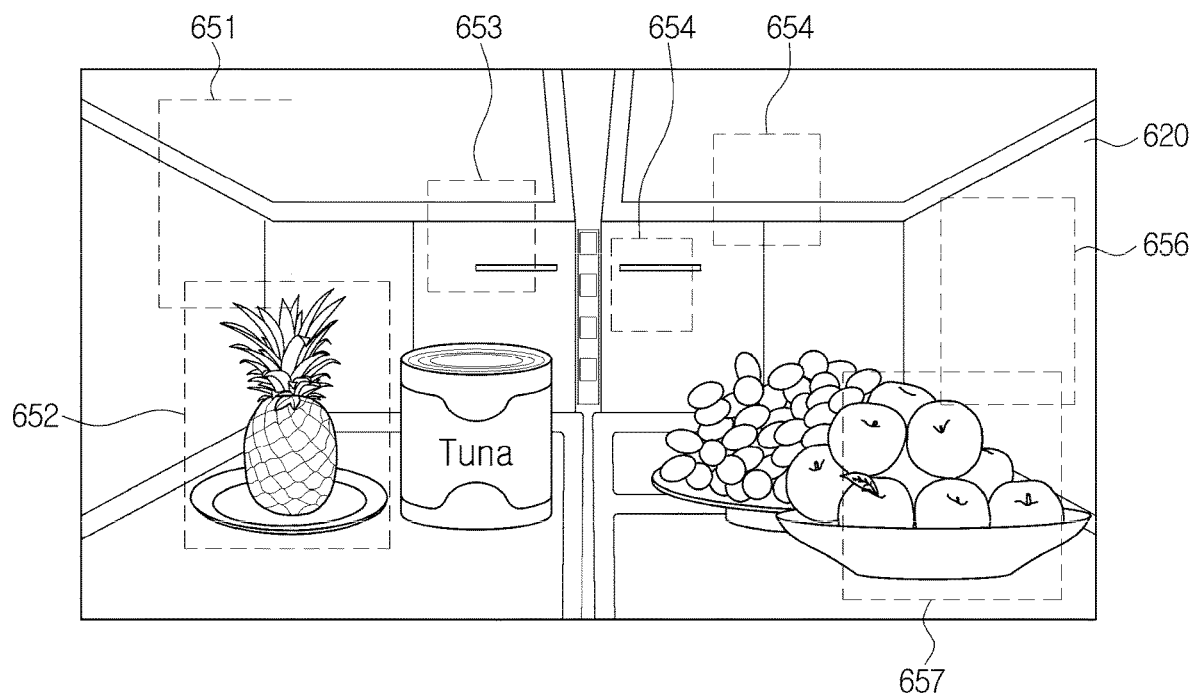
FIG. 25 shows an example of extracting a sample image according to the food identification method shown in FIG. 23.
Figure 26:
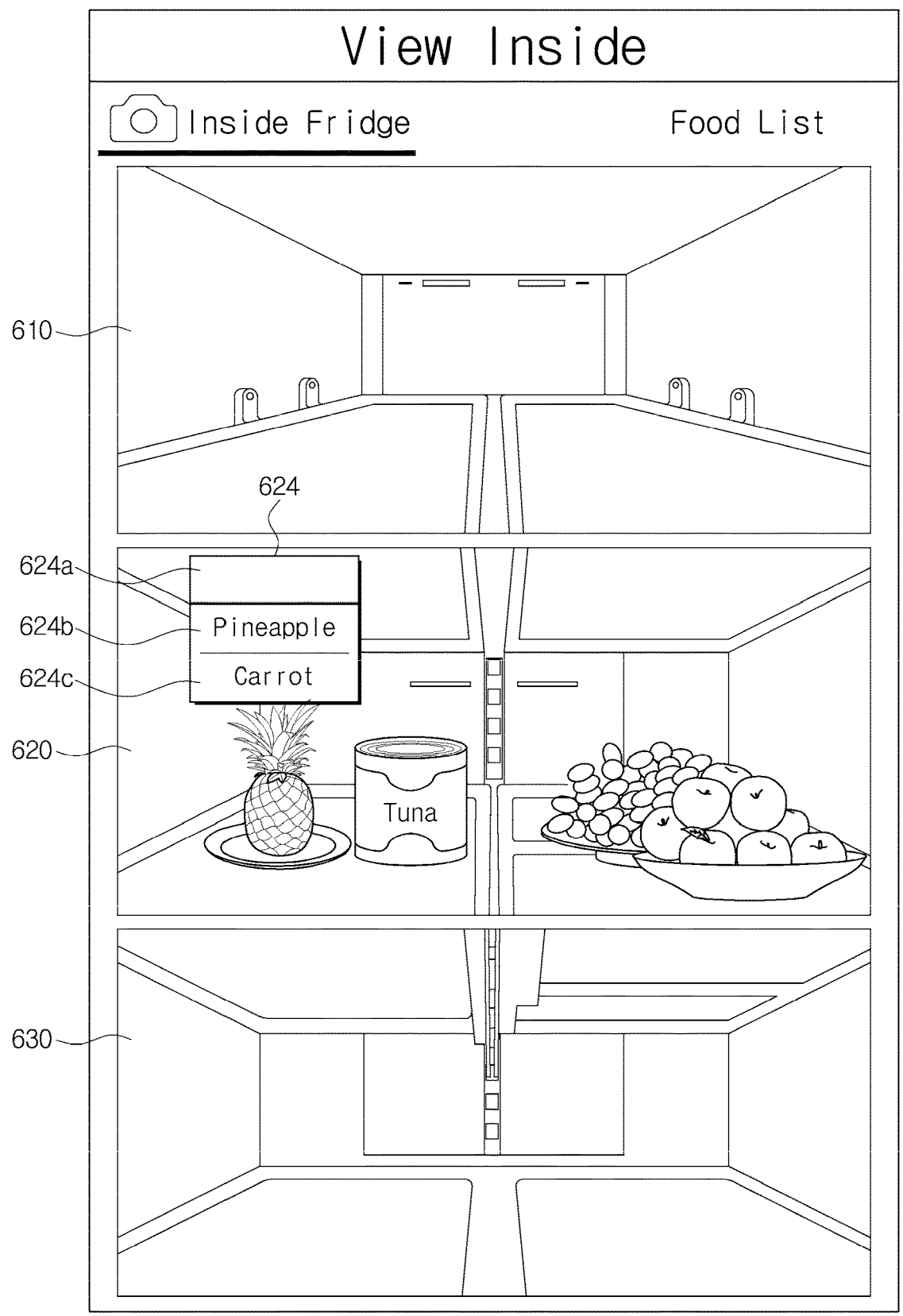
FIG. 26 shows an example of displaying food-related information according to the food identification method shown in FIG. 23.
Figure 27:
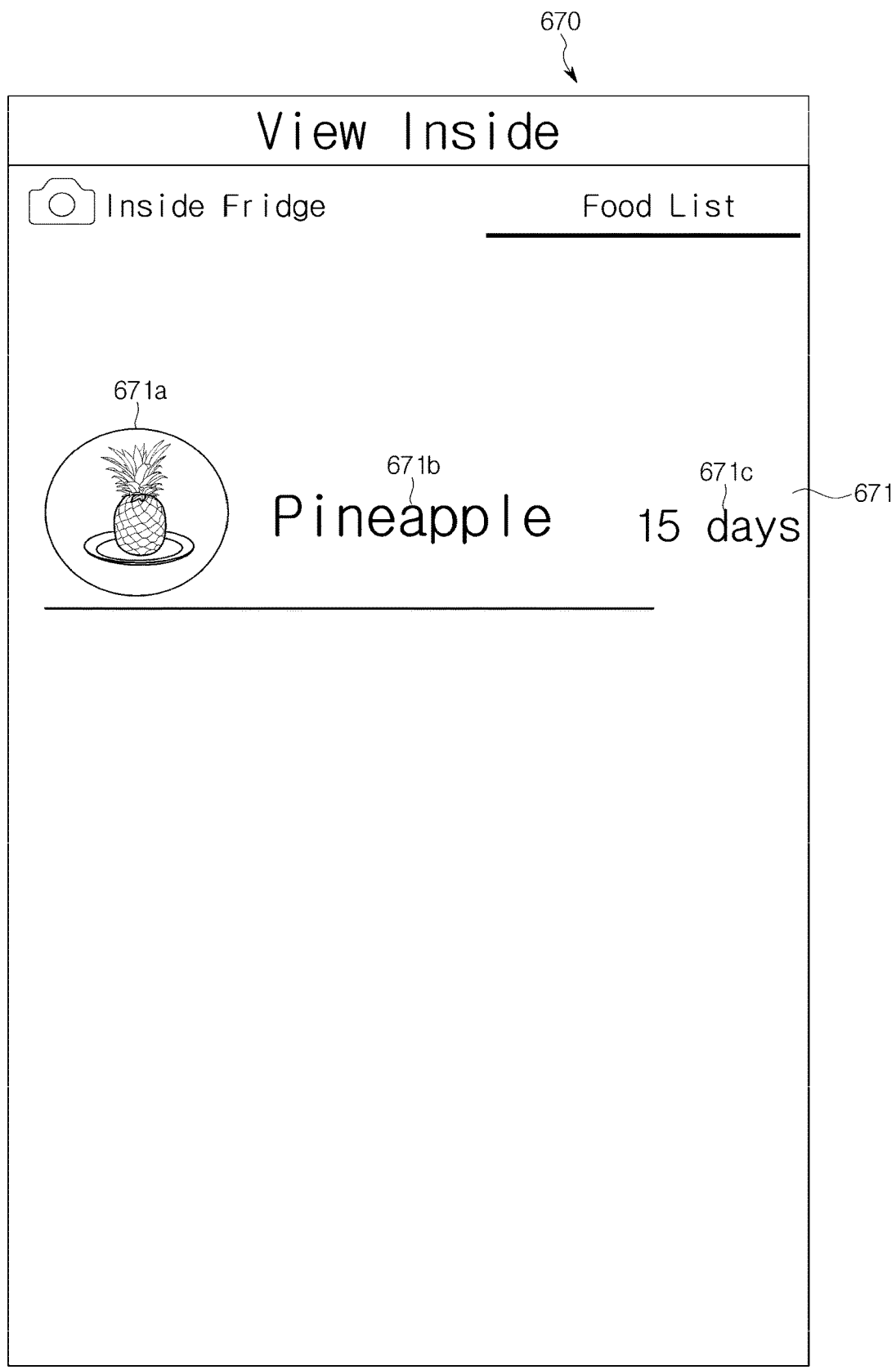
FIG. 27 shows another example of displaying food-related information according to the food identification method shown in FIG. 23.

FIG. 23 shows another example of a food identification method of a food management system, according to an embodiment. FIG. 24 shows an example of receiving a user's touch input according to the food identification method shown in FIG. 23. FIG. 25 shows an example of extracting a sample image according to the food identification method shown in FIG. 23. FIG. 26 shows an example of displaying food-related information according to the food identification method shown in FIG. 23. FIG. 27 shows another example of displaying food-related information according to the food identification method shown in FIG. 23.

Referring to FIGS. 23 to 27, a food identification method of the food management system 1 may be described, in 2100.

The refrigerator 100 may obtain the inside image of the storage chamber 110, 2110.

The refrigerator 100 may capture the inside of the storage chamber 110 through the camera 150 and obtain the inside image of the storage chamber 110.

Operation 2110 may be the same as operation 1110 shown in FIG. 18.

The refrigerator 100 may transmit the inside image of the storage chamber 110 to the computing apparatus 200, and the computing apparatus 200 may receive the inside image of the storage chamber 110 from the refrigerator 100, in 2120.

Operation 2120 may be the same as operation 1120 shown in FIG. 18.

The computing apparatus 200 may store the inside image of the storage chamber 110, in 2130.

The processing device 240 may store the inside image of the storage chamber 110 received from the refrigerator 100 in the storage 230. For example, the processing device 240 may store a predetermined number of inside images. The processing device 240 may arrange the inside images of the storage chamber 110 according to the order received from the refrigerator 100, and delete the inside image received the longest time in response to the reception of a new inside image.

Thereafter, the refrigerator 100 may receive the user's touch input from the user, in 2140.

The refrigerator 100 may display the inside image of the storage chamber 110 captured by the camera 150 on the touch screen display 130.

The controller 190 may control the touch screen display 130 to display the inside image 610 of the first storage space 111*a*, the inside image 620 of the second storage space 111*b*, and the inside image 630 of the third storage space 111*c*.

The user may touch the touch screen display 130 on which the inside image of the storage chamber 110 is displayed. For example, the user may touch the touch screen display 130 at a location corresponding to the image of the food, in order to set a storage deadline of the newly received food. For example, as shown in FIG. 24, the user may touch the inside of a pineapple image of the inside image 620 of the second storage space 111*b* or the periphery of the pineapple image.

The touch screen display 130 may detect touch coordinates of the user's touch input and provide touch coordinates to the controller 190. The controller 190 may receive touch coordinates of the touch input from the touch screen display 130.

The refrigerator 100 receiving the user's touch input may transmit a food identification request to the computing apparatus 200, and the computing apparatus 200 may receive the food identification request from the refrigerator 100, in 2150.

The refrigerator 100 may transmit the food identification request to the computing apparatus 200 through the communication network NET. The controller 190 may control the communicator 170 to transmit the food identification request to the computing apparatus 200 in response to receiving the user's touch input.

The computing apparatus 200 may receive the food identification request from the refrigerator 100 through the communication network NET. The processing device 240 may receive the food identification request through the communicator 220.

The computing apparatus 200 may identify the food included in the inside image of the storage chamber 110, in 1130.

The computing apparatus 200 may identify the food included in the inside image of the storage chamber 110 using the trained object identification engine 231.

The processing device 240 may extract a plurality of sample images 651 to 657 from the storage chamber inside image 620. For example, the processing device 240 may extract the sample images 651 to 657 having the arbitrary size (horizontal length, vertical length) at the arbitrary position (x-axis coordinate and y-axis coordinate). The processing device 240 may select the x-axis coordinate (x), the y-axis coordinate (y), the horizontal length (h), and the vertical length (v) of the sample images using the random function, and may extract the image having the selected coordinate (x, y) and size (h, v) from the storage chamber inside image 620. As shown in FIG. 25, the processing device 240 may extract the first sample image 651 and the second sample image 652, and the third sample image 653, . . . , and n sample image from the storage chamber inside image 620. The number of sample images is not limited.

The processing device 240 may identify foods included in the storage chamber inside image 620 based on the plurality of sample images 651 to 657 using the trained object identification engine 231. The processing device 240 may identify foods included in each of the plurality of sample images 651 to 657 using the image identification algorithm using the neural network.

For example, the image identification algorithm using the neural network may output numerical values (e.g., probability) indicating which food among the plurality of predetermined foods are included in the sample images. The processing device 240 may select the food with the largest value output from the neural network as a first candidate food, and select the food with the second largest value output from the neural network as a second candidate food.

For example, the processing device 240 may output a pineapple as the first candidate food of the second sample image 652 and output a carrot as the second candidate food of the second sample image 652. Also, the processing device 240 may output an apple as the first candidate food of the seventh sample image 657 and output an onion as the second candidate food of the seventh sample image 657.

The processing device 240 may output identification data including coordinates and sizes representing the plurality of sample images 651 to 657, the first candidate food of the plurality of sample images 651 to 657, and the second candidate food of the plurality of sample images 651 to 657.

The computing apparatus 200 may transmit the identification data to the refrigerator 100, and the refrigerator 100 may receive the identification data from the computing apparatus 200, in 2170.

The computing apparatus 200 may transmit the identification data to the refrigerator 100 through the communication network NET. The processing device 240 may control the communicator 220 to transmit the identification data to the refrigerator 100.

The refrigerator 100 may receive the identification data from the computing apparatus 200 through the communication network NET. The controller 190 may receive the identification data through the communicator 170.

The refrigerator 100 may select the sample image based on the user's touch coordinates, in 2180.

The refrigerator 100 may compare the touch coordinates of the user touching the touch screen display 130 with center coordinates of the plurality of sample images 651 to 657, and select the sample image having the closest center coordinates to the user's touch coordinates.

The controller 190 may obtain the touch coordinates of the user's touch input from the touch screen display 130 in operation 2140.

In addition, the controller 190 may receive identification data including coordinates and sizes representing the plurality of sample images 651 to 657, the first candidate food of the plurality of sample images 651 to 657, and the second candidate food of the plurality of sample images 651 to 657. The controller 190 may determine the coordinates of centers of the sample images 651 to 657 from the coordinates and sizes of the sample images 651 to 657. For example, the controller 190 may determine coordinates (x+h/2, y+v/2) of the centers of the sample images 651 to 657 from a sum of the half of the size (h, v) of the sample images 651 to 657 and the coordinates (x, y).

The controller 190 may determine a distance between the user's touch input and the center of each of the plurality of sample images 651 to 657. For example, the controller 190 may determine the distance between the user's touch input and the center of the sample image from a sum of squares of a difference between the coordinates of the touch input and the center coordinates of the sample image.

The controller 190 may identify the sample image in which the distance between the center of the plurality of sample images 651 to 657 and the user's touch input is minimum.

For example, as shown in FIGS. 24 and 25, the controller 190 may determine that the distance between the center of the second sample image 652 among a plurality of sample images 651 to 657 and a user's touch input P1 is the minimum. The controller 190 may select the second sample image 652 as the image corresponding to the user's touch input P1.

The refrigerator 100 may display the identification result of the food selected by the user, in 2190.

In operation 2180, the refrigerator 100 may determine the sample image whose center is a minimum distance from the user's touch input. For example, the refrigerator 100 may select the second sample image 652 as the image corresponding to the user's touch input P1.

The controller 190 may determine that the sample image whose center is the minimum distance from the user's touch input is the image representing the food at the location touched by the user. Also, the controller 190 may determine that the first candidate food or the second candidate food identified based on the sample image whose center is the minimum distance from the user's touch input is the food selected by the user.

The controller 190 may display the identification result of the food selected by the user around the user's touch input. For example, as shown in FIG. 26, the controller 190 may display food identification information 624 around the user's touch input on the storage chamber inside image 600. The food identification information 624 may include a name area 624a for indicating a name of the food, a name of the first candidate food 624a (pineapple), and a name of the second candidate food 624c (carrot). The user may select one of the name of the first candidate food 624a (pineapple) and the name of the second candidate food 624c (carrot). The name of the food selected by the user may be displayed in the name area 624a. For example, as shown in FIG. 26, when the pineapple is selected, the controller 190 may display "pineapple" in the name area 624a.

The controller 190 may collect information about the food based on the name of the food selected by the user. For example, the controller 190 may collect a food category selected by the user, the food storage deadline, and the like. For example, the controller 190 may collect the food category of the pineapple, the storage deadlines, and the like.

The controller 190 may integrally store the sample image representing the food selected by the user, the name, the category, and the storage deadline.

The controller 190 may display a list 670 of foods selected by the user on the touch screen display 130. For example, as shown in FIG. 27, the controller 190 may display information 671 about the pineapple on the touch screen display 130.

The controller 190 may display a sample image 671a closest to the user's touch input, a food name 671b identified from the second sample image 625, and a storage deadline 671c of the food identified from the second sample image 625 on the touch screen display 130. For example, as shown in FIG. 27, the controller 190 may display the second sample image 652 and the "pineapple" and the storage deadline of the pineapple on the touch screen display 130.

As described above, the computing apparatus 200 may receive the image of the food stored from the refrigerator 100 and identify the food stored in the refrigerator 100 using the object identification engine 231. In addition, the refrigerator 100 may display the food-related information received from the computing apparatus 200. In other words, the refrigerator 100 may display information related to food stored in the storage chamber 110 without the user's input.

Figure 28:
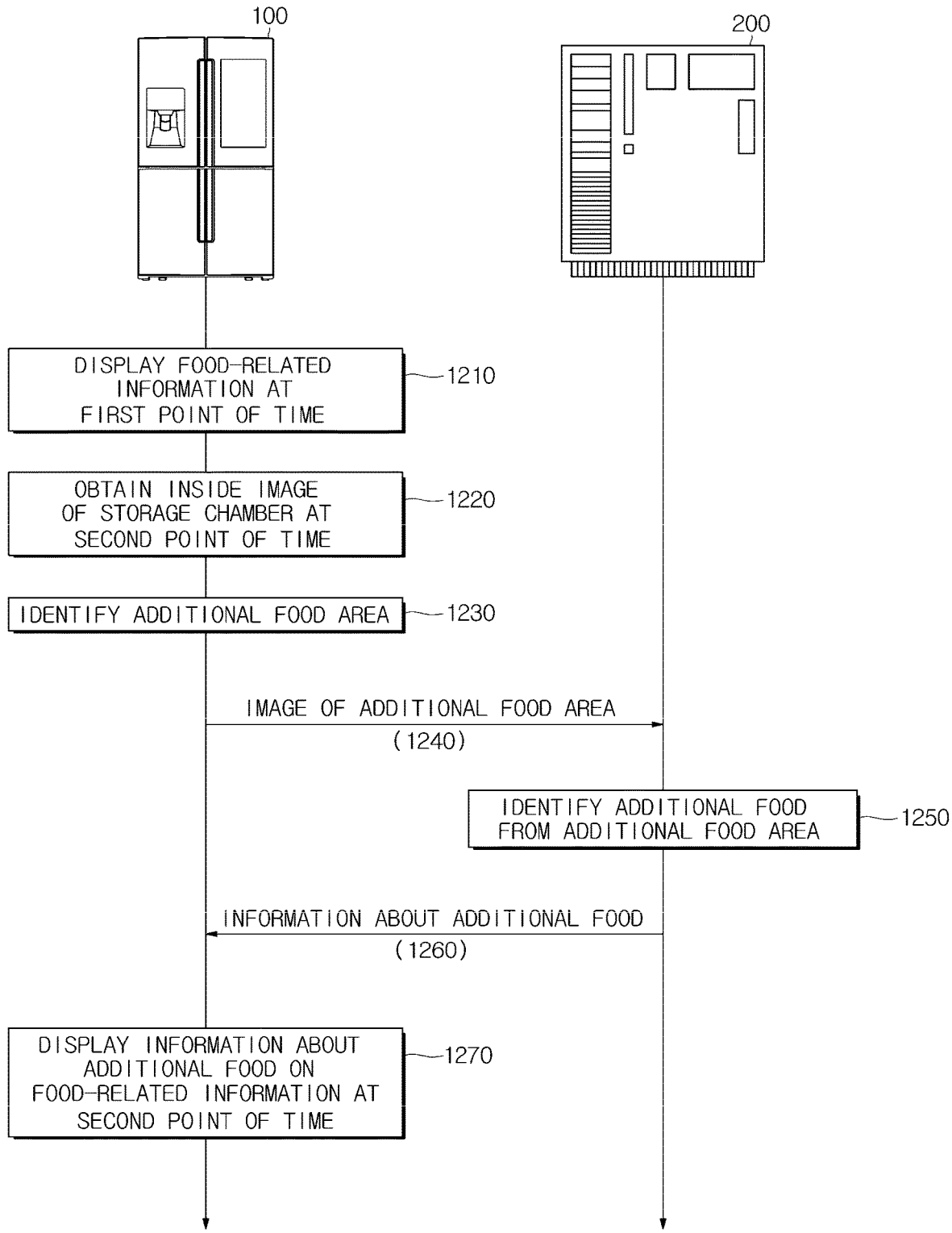
FIG. 28 shows another example of a food identification method of a food management system, according to an embodiment.
Figure 29:
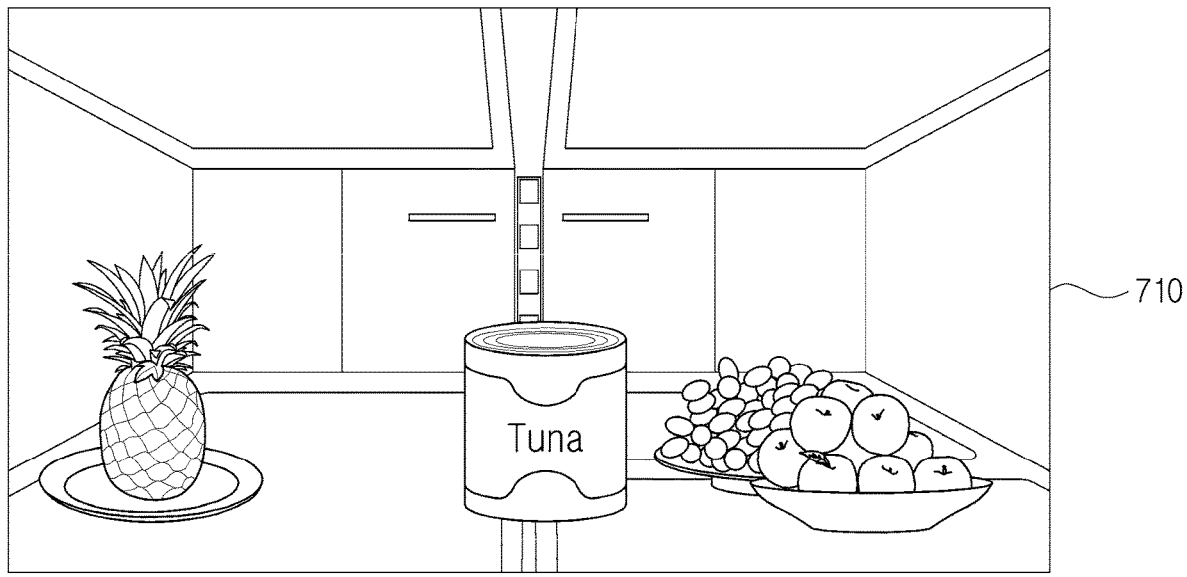
FIG. 29 shows an example of identification of an additional food area according to the food identification method shown in FIG. 28.
Figure 29:
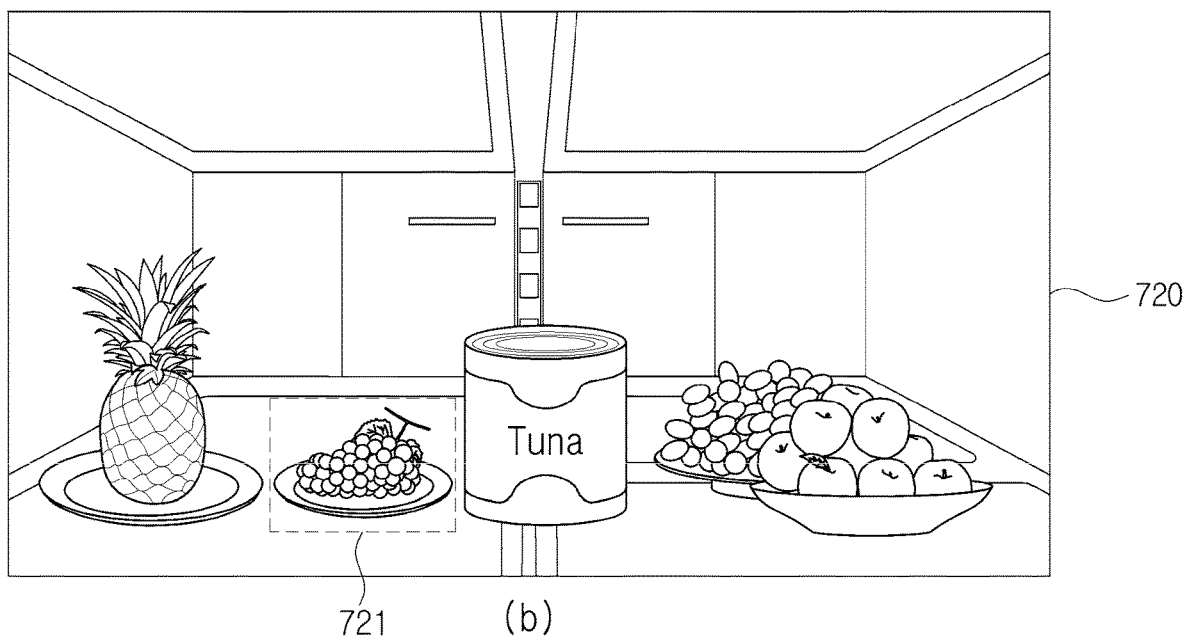

FIG. 28 shows another example of a food identification method of a food management system, according to an embodiment. FIG. 29 shows an example of identification of an additional food area according to the food identification method shown in FIG. 28. FIG. 30 shows an example of displaying information relating to an additional food, according to the food identification method shown in FIG. 28.

A food management method 1200 of the food management system 1 will be described in connection with FIGS. 28, 29, and 30.

The refrigerator 100 displays information relating to a food stored in the storage chamber 110 at a first point of time, in 1210.

The refrigerator 100 may obtain and display the information relating to a food stored in the storage chamber 110 at the first point of time.

The refrigerator 100 may capture and obtain an image of the inside of the storage chamber 110 at the first point of time. Furthermore, the refrigerator 100 may send the inside image of the storage chamber 110 captured at the first point of time to the computing apparatus 200. For example, the refrigerator 100 may obtain a first inside image 710 captured at the first point of time as shown in (a) of FIG. 29, and send the first inside image 710 to the computing apparatus 200.

The computing apparatus 200 may use the object identification engine 231 to identify a food from the inside image of the storage chamber 110 captured at the first point of time, and send information relating to the identified food to the refrigerator 100. For example, the computing apparatus 200 may identify a pineapple, a can, grapes, and apples from the first inside image 710, and send information about the pineapple, can, grapes, and apples to the refrigerator 100.

The refrigerator 100 may receive the information relating to the food stored in the storage chamber 110 at the first point of time from the computing apparatus 200 and display the received food-related information.

The refrigerator 100 obtains an inside image of the storage chamber 110 at a second point of time, in 1220.

The controller 190 may control the camera 150 to capture an image of the inside of the storage chamber 110 at the second point of time, and the camera 150 may capture an image of a plurality of spaces separated by the shelves 110c. The controller 190 may obtain the inside image of the storage chamber 110 captured at the second point of time from the camera 150. For example, the refrigerator 100 may obtain a second inside image 720 of the storage chamber 110 captured at the second point of time as shown in (b) of FIG. 29.

The refrigerator 100 identifies an additional food area 721, in 1230.

The controller 190 may identify the additional food area 721 based on a difference between the inside images of the storage chamber 110 captured at the first and second points of time. For example, the controller 190 may identify the additional food area 721 based on a difference between the first inside image 710 captured at the first point of time and the second image captured at the second point of time.

The refrigerator 100 sends an image of the additional food area 721 to the computing apparatus 200, and the computing apparatus 200 receives the image of the additional food area 721 from the refrigerator 100, in 1240.

Operation 1240 may be the same as operation 1120.

The computing apparatus 200 identifies a food contained in the image of the additional food area 721, in 1250.

The computing apparatus 200 may use the trained object identification engine 231 to identify the food contained in the image of the additional food area 721.

Operation 1250 may be the same as operation 1130.

The processing device 240 may collect information relating to the food identified from the additional food area 721. For example, the food-related information may include an image, name, category, and shelf life for refrigeration (or freezing) of the food.

The computing apparatus 200 sends the additional food-related information to the refrigerator 100, and the refrigerator 100 receives the additional food-related information from the computing apparatus 200, in 1260.

Operation 1260 may be the same as operation 1140.

The refrigerator 100 displays information relating to a food stored in the storage chamber 110 at the second point of time, in 1270.

The controller 190 may add the additional food-related information received from the computing apparatus 200 to the information relating to the food stored in the storage chamber 110 at the first point of time, and as a result, may obtain the information relating to a food stored in the storage chamber 110 at the second point of time.

The controller 190 may display the information relating to the food stored in the storage chamber 110 at the second point of time on the touch screen display 130. For example, as shown in FIG. 30, the controller 190 may additionally display information 770 about grapes identified from the additional food area 721 along with information 730 about the pineapple, information 740 about the can, information 750 about the grapes, and information 760 about the apples.

Furthermore, the controller 190 may identify the same kind of foods stored at different times. For example, the controller 190 may identify a pineapple stored at the first point of time and another pineapple newly stored at the second point of time.

As described above, the refrigerator 100 may add the newly added food-related information to the existing food-related information based on a difference between the inside image of the storage chamber 110 captured previously and the inside image of the storage chamber 110 captured newly. As a result, the refrigerator 100 may identify the same kind of foods stored at different times.

Figure 31:
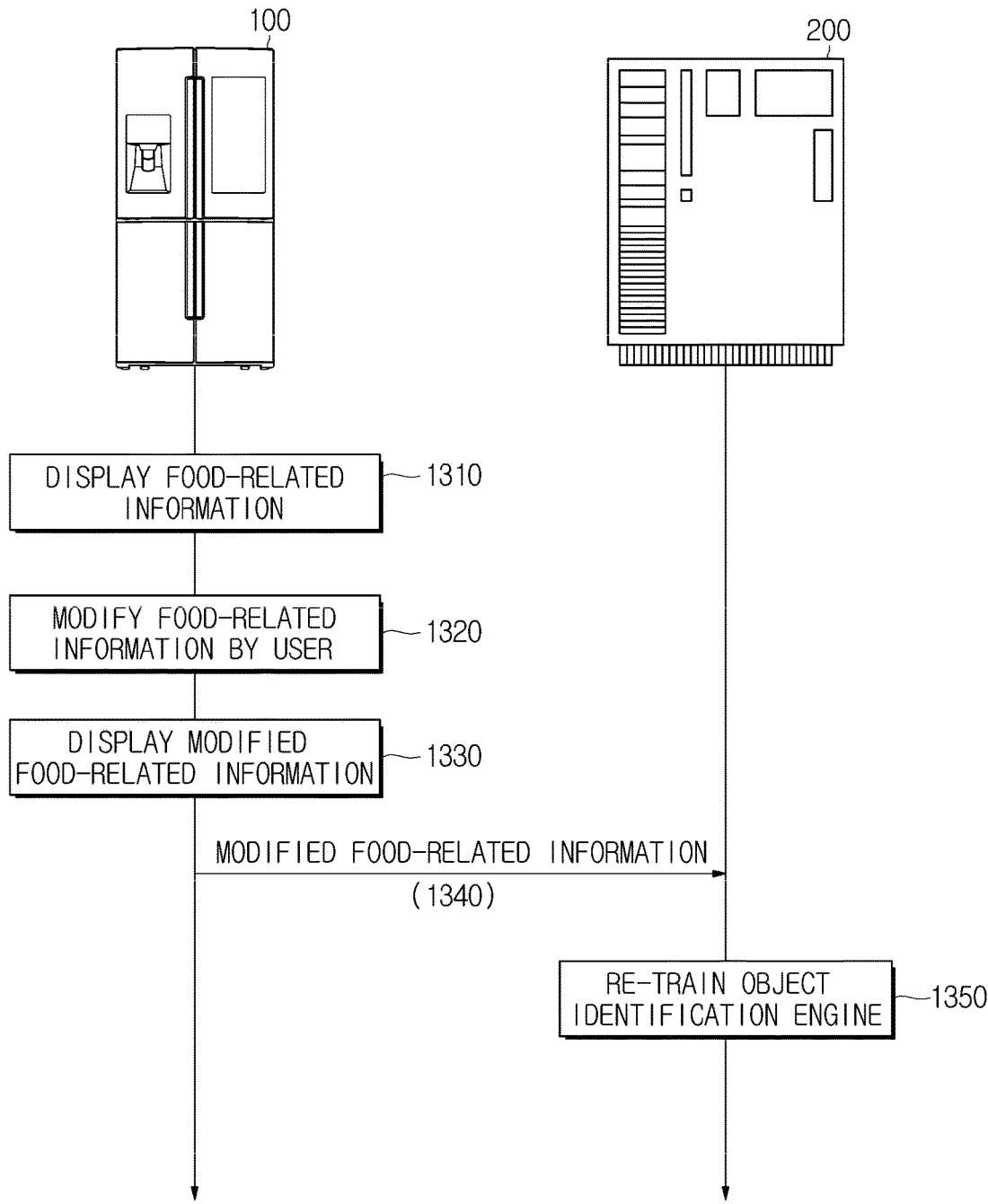
FIG. 31 shows another example of a food identification method of a food management system, according to an embodiment.
Figure 32:
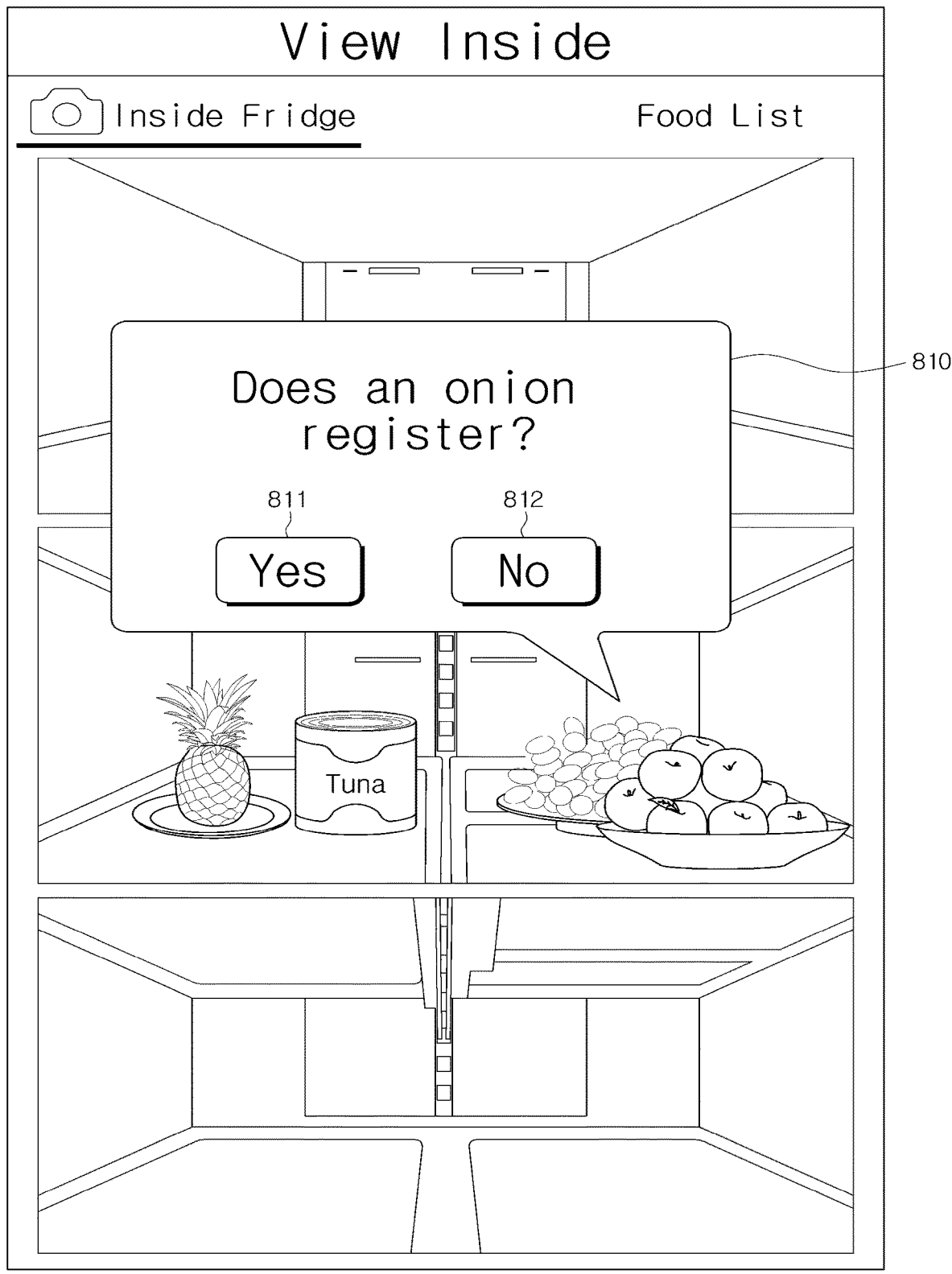
FIGS. 32 and 33 show an example of modifying food-related information according to the food identification method shown in FIG. 31.
Figure 33:

FIG. 31 shows another example of a food identification method of a food management system, according to an embodiment. FIGS. 32 and 33 show an example of modifying food-related information according to the food identification method shown in FIG. 31.

A food management method 1300 of the food management system 1 will be described in connection with FIGS. 31, 32, and 33.

The refrigerator 100 displays information relating to a food stored in the storage chamber 110, in 1310.

The refrigerator 100 may capture and obtain an image of the inside of the storage chamber 110. Furthermore, the refrigerator 100 may send the captured inside image of the storage chamber 110 to the computing apparatus 200.

The computing apparatus 200 may use the object identification engine 231 to identify a food from the inside image of the storage chamber 110, and send information relating to the identified food to the refrigerator 100.

The refrigerator 100 may receive the information relating to a food stored in the storage chamber 110 from the computing apparatus 200 and display the received food-related information.

The refrigerator 100 receives a modification of the user to the food-related information, in 1320.

The user may check the food-related information displayed on the touch screen display 130 and modify the food-related information.

For example, as shown in FIG. 32, the controller 190 may display an information display window 810 that displays information relating to the identified food. The information display window 810 may include a confirm button (yes) 811 to confirm the information relating to the identified food and a cancel button (no) 812 to modify the food-related information.

In the information display window 810, wrong information about a food (e.g., that wrongly identifies "apple" as "onion") may be displayed. In this case, the user may touch or press the cancel button 812 and modify the wrong information about the food. In response to the touch on the cancel button 812, the refrigerator 100 may display the food-related information to be modified and a keyboard 830 to enter new food-related information, as shown in FIG. 33. The user may use the keyboard 830 to modify the name of the food from "onion" to "apple".

The refrigerator 100 displays the food-related information modified by the user, in 1330.

The controller 190 may display the user-modified food-related information on the touch screen display 130.

The refrigerator 100 sends the user-modified food-related information to the computing apparatus 200, and the computing apparatus 200 receives the user-modified food-related information, in 1340.

The refrigerator 100 may send an image showing a user-modified food and the user-modified food-related information to the computing apparatus 200 over the communication network NET. The controller 190 may control the communicator 170 to send the food image and the modified food-related information to the computing apparatus 200.

The computing apparatus 200 may receive the food image and the modified food-related information from the refrigerator 100 over the communication network NET. The processing device 240 may obtain the food image and the modified food-related information through the communication device 220.

The computing apparatus 200 re-trains the object identification engine 231, in 1350.

The processing device 240 may store the food image and the modified food-related information received through the communication device 220 in the storage 230. The food image and the modified food-related information may be the user-modified data 233.

The processing device 240 may re-train the object identification engine 231 with the user-modified data 233. For example, the processing device 240 may input an image of the food modified by the user to the object identification engine 231, and compare an output of the object identification engine 231 and the user-modified food related information. Furthermore, the processing device 240 may update the object identification engine 231 based on the comparison result.

The processing device 240 may re-train the object identification engine 231 at various points of time.

For example, the processing device 240 may re-train the object identification engine 231 with the user-modified data 233 at preset intervals.

In another example, the processing device 240 may re-train the object identification engine 231 with the user-modified data 233 when an amount (or the number) of the user-modified data 233 exceeds a reference amount (the reference number).

In another example, the processing device 240 may re-train the object identification engine 231 with the user-modified data 232 when a ratio of the user-modified data 233 to the training data 232 exceeds a reference ratio.

The processing device 240 may re-train the object identification engine 231 with various data.

For example, the processing device 240 may re-train the object identification engine 231 with data in which the training data 232 and the user-modified data 233 are combined. Furthermore, the ratio of the user-modified data 233 to the training data 232 may be set in advance, or set by the manager or the user.

In another example, the processing device 240 may re-train the object identification engine 231 only with the user-modified data 233.

As described above, the user may modify information relating to a food identified by the computing apparatus 200, and the computing apparatus 200 may re-train the object identification engine 231 with the user-modified food-related information.

Thus far, operation of the computing apparatus 200 provided separately from the refrigerator 100 to identify a food in a food image was described.

However, the computing apparatus 200 is not limited to being provided separately from the refrigerator 100. For example, the computing apparatus 200 may be integrated with the refrigerator 100.

In this case, the refrigerator 100 may identify a food in a food image. For example, the refrigerator 100 may include the area detection engine 251, the area classification engine 252, and the identification engine 253, as described above in connection with FIG. 11.

Figure 34:
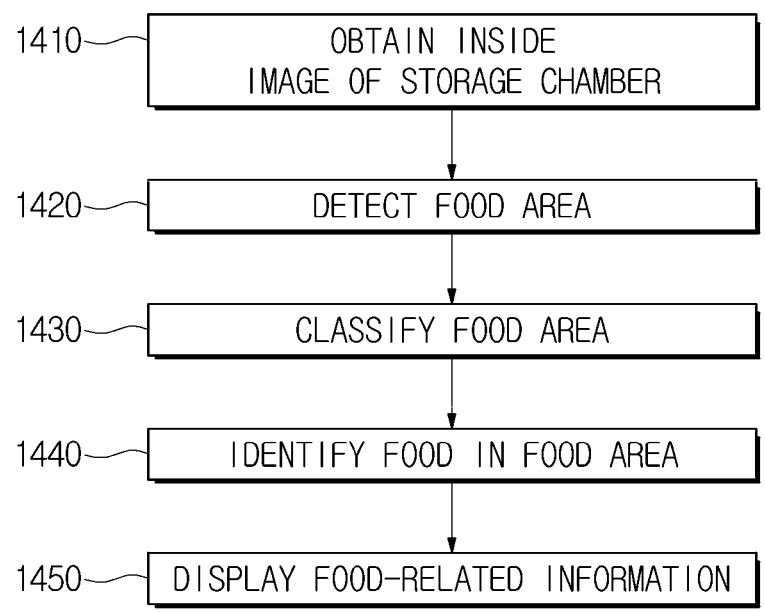
FIG. 34 is a flowchart illustrating a method of identifying a food by a refrigerator, according to an embodiment.

FIG. 34 is a flowchart illustrating a method of identifying a food by a refrigerator, according to an embodiment.

A food identification method 1400 of the refrigerator 100 will be described in connection with FIG. 26.

The refrigerator 100 obtains an inside image of the storage chamber 110, in 1410.

The refrigerator 100 may take a picture of the inside of the storage chamber 110 with the camera 150, and obtain an inside image of the storage chamber 110.

Operation 1410 may be the same as operation 1110.

The refrigerator 100 detects food areas from the inside image of the storage chamber 110, in 1420.

The controller 190 may identify food areas where foods are located in the storage chamber inside image. For example, the controller 190 may separate the food areas from the background area based on a difference between an inside image of the empty storage chamber 110 and the inside image of the storage chamber 110 with foods stored therein.

The refrigerator 100 classifies the identified food areas, in 1430.

The controller 190 may classify the food areas according to a food identification method or by level of difficulty in food identification. For example, the controller 190 may classify the food areas into a letter identification area in which a letter is detected, an image identification area in which a single food is detected, and an image division area in which a plurality of foods are detected.

The refrigerator 100 identifies a food in a food area, in 1440.

The controller 190 identifies foods in the classified food areas in various methods.

For example, the controller 190 may apply a letter identification algorithm for the letter identification area to identify a food, and apply an image identification algorithm for the image identification area to identify a food. Furthermore, the controller 190 may separate food images contained in the image division area, and apply the letter identification algorithm or the image identification algorithm for the separated food images to identify foods.

For example, the controller 190 may include an object identification engine that employs a neural network. The controller 190 may input a luminance value and/or a color value of each of the plurality of pixels included in the image to each of the plurality of input nodes i1, i2 of the neural network. The controller 190 may apply weights w1 to w4 to values of the plurality of input nodes i1, i2, and output the weighted values to the plurality of hidden nodes h1, h2. The controller 190 may input the values input to the plurality of hidden nodes h1, h2 to the sigmoid function, and apply the weights w5 to w8 to the output values of the sigmoid function and output the weighted output values to the plurality of output nodes o1, o2. The processing device 240 may input the values input to the plurality of output nodes o1, o2 to the sigmoid function, and output values of the sigmoid function are outputs of the neural network. Each of the plurality of output nodes o1, o2 is allocated a food, and an output value of each of the plurality of output nodes o1, o2 may represent a probability of being the allocated food. The controller 190 may identify a food based on the outputs of the plurality of output nodes o1, o2.

The refrigerator 100 displays information relating to the identified food, in 1450.

The controller 190 may display the information relating to the identified food on the touch screen display 130. For example, the controller 190 may display an image, e.g., an image of a food area separated from the storage chamber inside image, name, category, and shelf life for refrigeration (or freezing) of the food on the touch screen display 130. The shelf life for refrigeration (or freezing) indicates an expiration date until which the user eats the food safely.

As described above, the refrigerator 100 may identify a food stored in the storage chamber 110 on its own, and display information relating to the food stored in the storage chamber 110. In other words, the refrigerator 100 may display information relating to a food stored in the storage chamber 110 without an input from the user.

Figure 35:
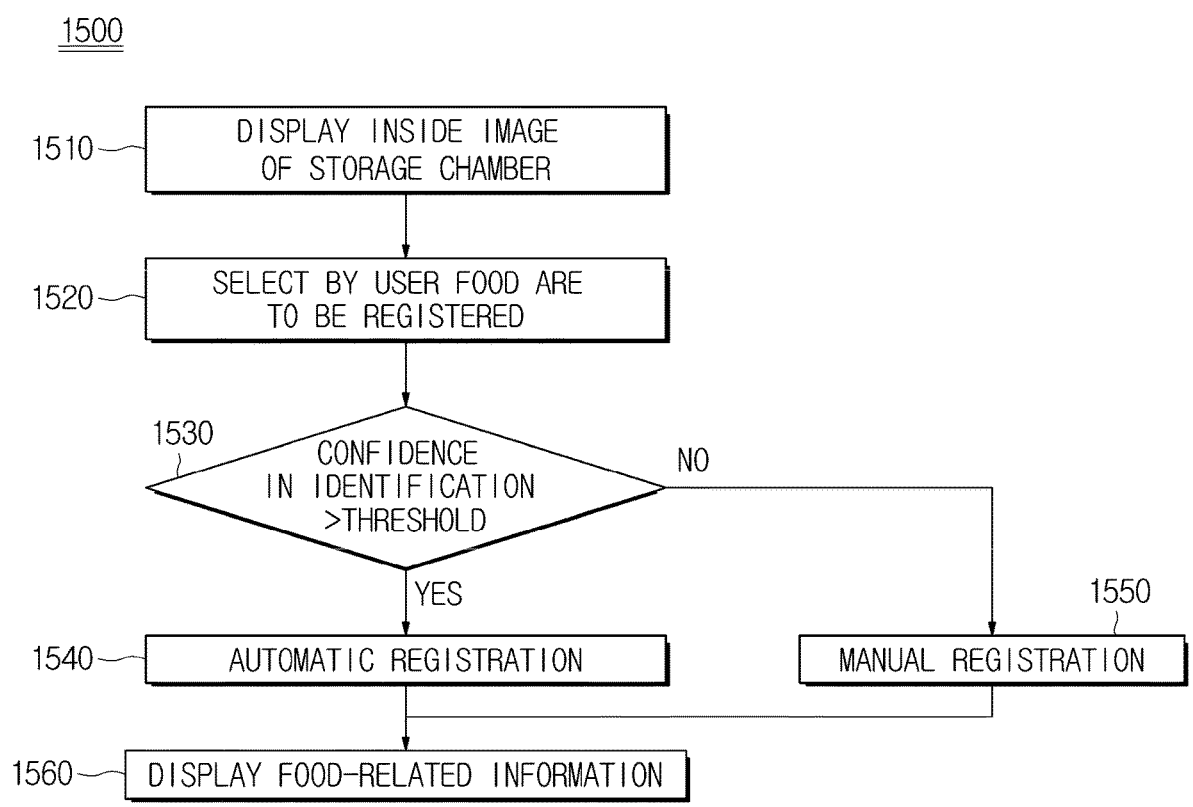
FIG. 35 is a flowchart illustrating a method of individually identifying foods by a food management system, according to an embodiment.
Figure 36:
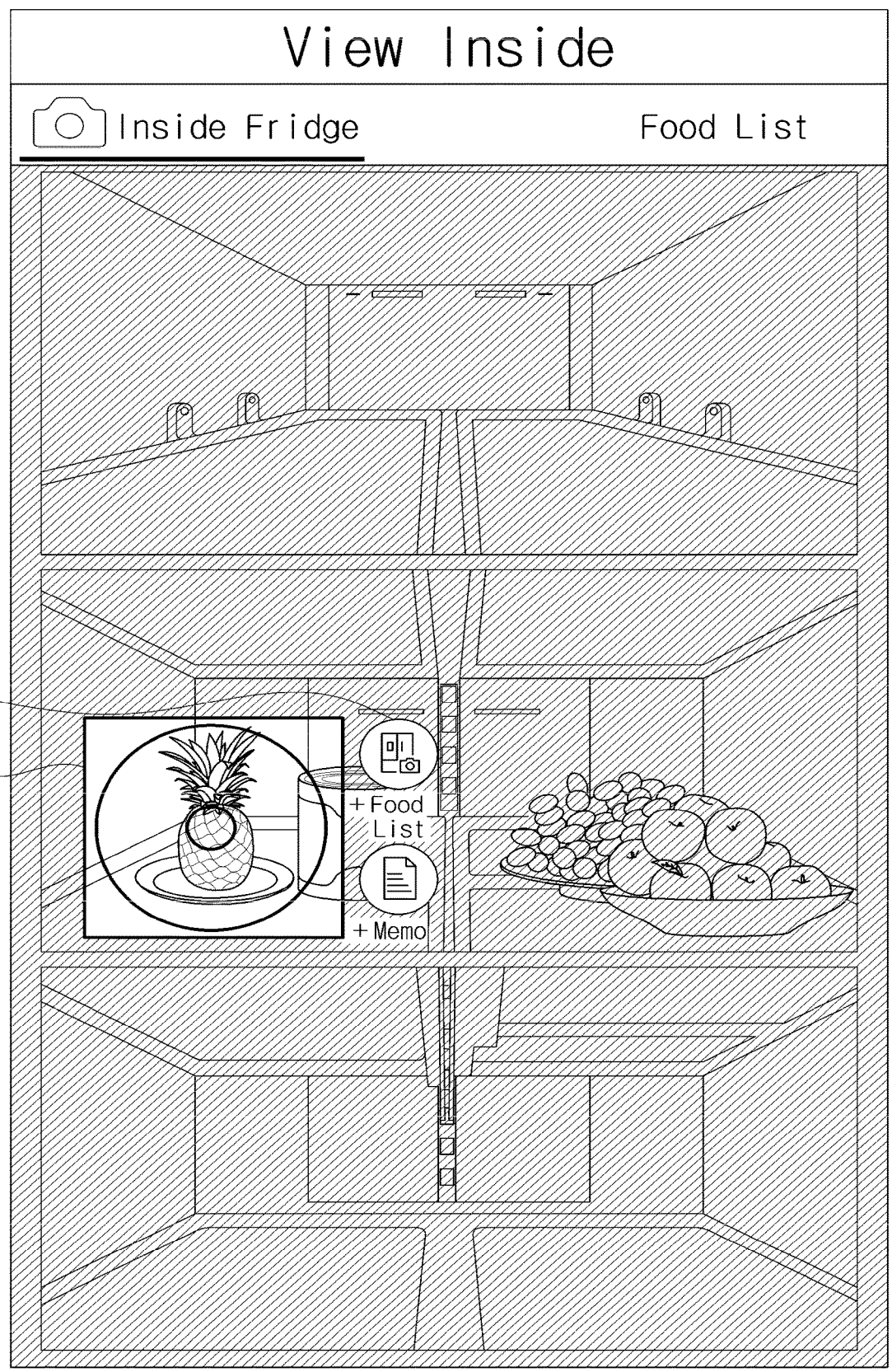
FIG. 36 shows an example of manually entering food-related information according to the food identification method shown in FIG. 35.

FIG. 35 is a flowchart illustrating a method of individually identifying foods by a food management system, according to an embodiment. FIG. 36 shows an example of manually entering food-related information according to the food identification method shown in FIG. 35.

A food management method 1500 of the food management system 1 will be described in connection with FIGS. 35 and 36.

The refrigerator 100 displays an inside image of the storage chamber 110, in 1510.

The refrigerator 100 may take a picture of the inside of the storage chamber 110 with the camera 150, and obtain an inside image of the storage chamber 110. Furthermore, the refrigerator 100 may display the inside image of the storage chamber 110 captured by the camera 150 on the touch screen display 130.

Operation 1510 may be the same as operation 1110.

The refrigerator 100 receives a choice of a food area to be registered from the user, in 1520.

When the inside image of the storage chamber 110 is displayed on the touch screen display 130, the user may choose a food area through the touch screen display 130. For example, the user may choose a food area 840 by touching the touch screen display 130 corresponding to the inside image of the storage chamber 110.

The controller 190 may display the food area 840 chosen by the user to be distinguished from other areas. For example, as shown in FIG. 28, all the areas except for the food area 840 may be displayed to be dark. Furthermore, the controller 190 may display a food addition button 850 on the touch screen display 130 to register a food contained in the food area 840.

In response to the user's touch on the food addition button 850, the refrigerator 100 may register a food contained in the food area 840 chosen by the user.

After this, the refrigerator 100 determines whether confidence in the food identification is higher than a threshold, in 1530.

The confidence in food identification may represent confidence in the food identification operation performed by the refrigerator 100 or the computing apparatus 200. The confidence may indicate, for example, a ratio of the number of times that the identified food has been registered without modification of the user to the number of times of the entire food identification operations. In other words, the confidence may indicate a success rate in food identification performed by the refrigerator 100 or the computing apparatus 200.

The threshold is a base to evaluate the confidence in food identification of the refrigerator 100 or the computing apparatus 200, which may be set in advance by the designer or set ex post by the manager or the user.

The refrigerator 100 may compute the confidence in food identification based on previous results of food identification operations and modifications to the food-related information made by the user, and compare the confidence in food identification with the threshold.

When the confidence in food identification is higher than the threshold in 1530, the refrigerator 100 automatically registers the food in the chosen food area 840 in 1540.

The refrigerator 100 may identify the food in the food area 840 and automatically register the identified food.

For example, the refrigerator 100 may send an image of the food area 840 chosen by the user to the computing apparatus 200, and the computing apparatus 200 may use the object identification engine 231 to identify a food in the image of the food area 840. The refrigerator 100 may receive information relating to the food from the computing apparatus 200 and register the received information relating to the food.

In another example, the refrigerator 100 may use the object identification engine 231 to directly identify a food from the image of the food area 840. Furthermore, the refrigerator 100 may register information about the identified food.

When the confidence in food identification is equal to or lower than the threshold in 1530, the refrigerator 100 manually registers the food in the chosen food area 840 in 1550.

The refrigerator 100 may receive information relating to the food in the food area 840 from the user.

For example, the refrigerator 100 may display an image of the food area 840 to receive the information relating to the food in the food area 840, and display a keyboard to input the information relating to the food. The user may input information relating to the food through the keyboard, such as a name of the food. Furthermore, the refrigerator 100 may register the input information relating to the food.

After the food is registered automatically or manually, the refrigerator 100 displays the information relating to the food, in 1560.

The controller 190 may display the registered food-related information on the touch screen display 130. The food-related information may include an image, e.g., location of the food image in the storage chamber inside image, name, category, and shelf life for refrigeration (or freezing) of the food.

As described above, the refrigerator 100 may selectively register a food contained in a food area chosen by the user. Furthermore, the refrigerator 100 may automatically (with an object identification engine) or manually (with a user input) identify a food based on the confidence in food identification, and register the identified food.

Figure 37:
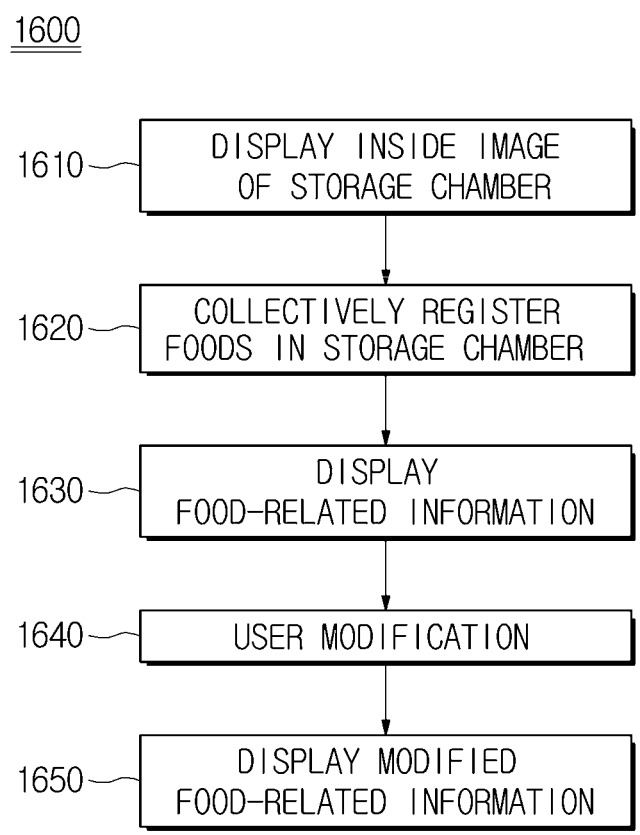
FIG. 37 is a flowchart illustrating a method of collectively identifying foods by a food management system, according to an embodiment.
Figure 38:
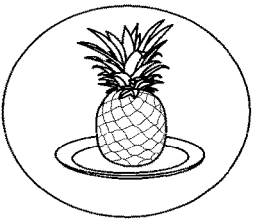
FIG. 38 shows an example of modifying food-related information according to the food identification method shown in FIG. 37.
Figure 39:
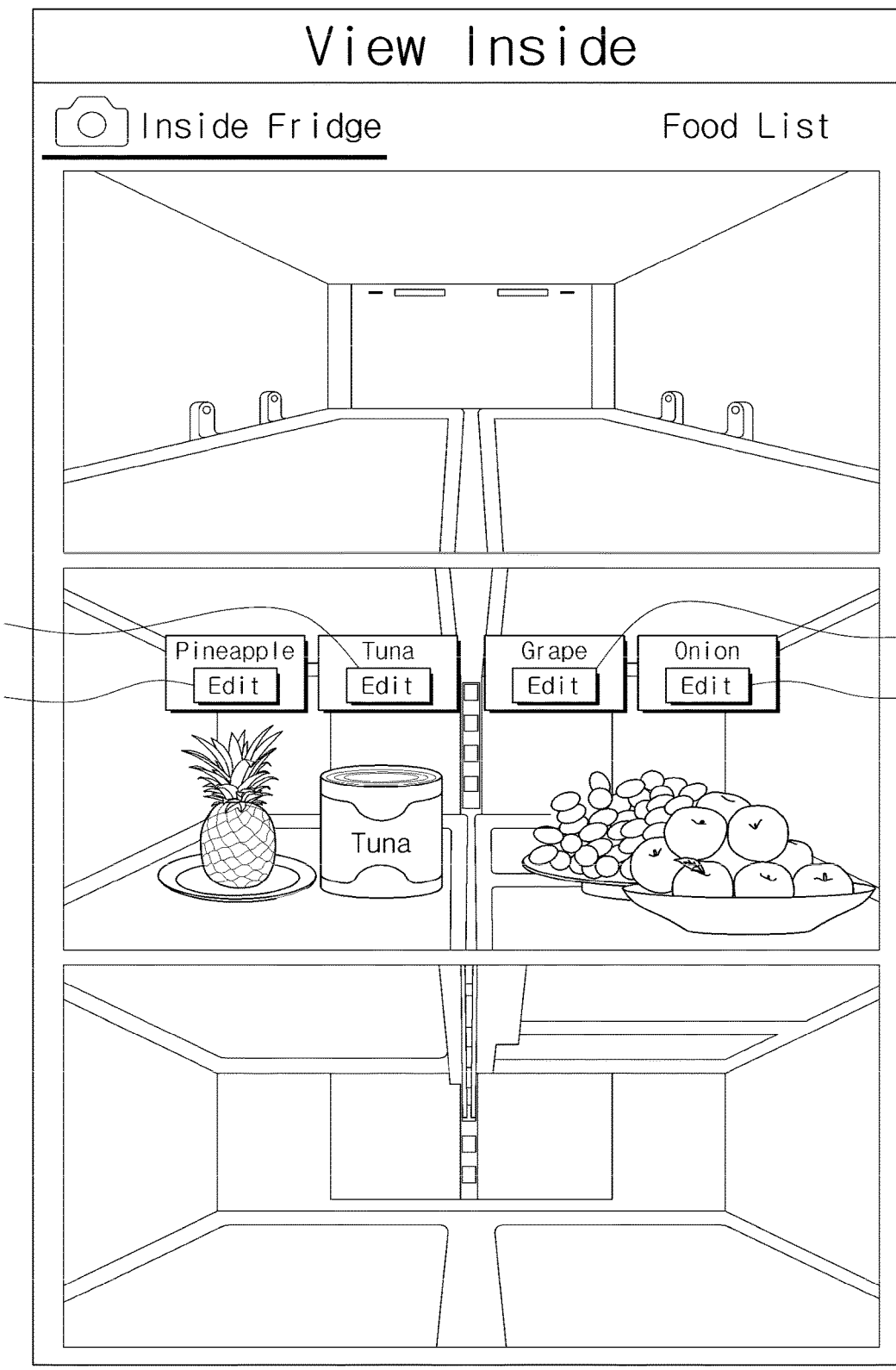
FIG. 39 shows another example of modifying food-related information according to the food identification method shown in FIG. 37.

FIG. 37 is a flowchart illustrating a method of collectively identifying foods by a food management system, according to an embodiment. FIG. 38 shows an example of modifying food-related information according to the food identification method shown in FIG. 37. FIG. 39 shows another example of modifying food-related information according to the food identification method shown in FIG. 37.

A food management method 1600 of the food management system 1 will be described in connection with FIGS. 37, 38, and 39.

The refrigerator 100 displays an inside image of the storage chamber 110, in 1610.

The refrigerator 100 may take a picture of the inside of the storage chamber 110 with the camera 150, and obtain an inside image of the storage chamber 110. Furthermore, the refrigerator 100 may display the inside image of the storage chamber 110 captured by the camera 150 on the touch screen display 130.

Operation 1610 may be the same as operation 1110.

The refrigerator 100 receives an input from the user to collectively register foods, in 1620.

When the inside image of the storage chamber 110 is displayed on the touch screen display 130, the user may enter an input to collectively register foods.

In response to the input to collectively register foods, the refrigerator 110 may identify foods contained in the inside image of the storage chamber 110.

For example, the refrigerator 100 may send an image of a food area chosen by the user to the computing apparatus 200, and the computing apparatus 200 may use the object identification engine 231 to identify a food in the image of the food area.

In another example, the refrigerator 100 may use the object identification engine 231 to directly identify a food from the image of the food area.

The refrigerator 100 displays information relating to the identified food, in 1630.

The controller 190 may display the identified food-related information on the touch screen display 130. The food-related information may include an image, e.g., location of the food image in the storage chamber inside image, name, category, and shelf life for refrigeration (or freezing) of the food.

The refrigerator 100 receives a modification of the user to the food-related information, in 1640.

The user may check the food-related information displayed on the touch screen display 130 and modify the food-related information.

For example, as shown in FIG. 38, the refrigerator 100 may display a list containing information about a pineapple, information about a can, and information about grapes, and information about apples. The refrigerator 100 may display wrong information about "apple" (e.g., that wrongly identifies "apple" as "onion"). The user may modify the wrong information about "apple". For example, the user may touch an edit button 860 displayed on the touch screen display 130. In response to the touch on the edit button 860, the refrigerator 100 may display a food information input screen. The food information input screen may include an image of a food to be modified and a keyboard to input information relating to the food. The user may use the keyboard to modify the name of the food from "onion" to "apple".

In another example, as shown in FIG. 39, the refrigerator 100 may display information about a pineapple, information about a can, information about grapes, and information about apples by overlaying them on the inside image of the storage chamber 110. The user may touch an edit button 861 displayed on the touch screen display 130. In response to the touch on the edit button 861, the refrigerator 100 may display a food information input screen. The food information input screen may include an image of a food to be modified and a keyboard to input information relating to the food. The user may use the keyboard to modify the name of the food from "onion" to "apple".

The refrigerator 100 displays the food-related information modified by the user, in 1650.

The controller 190 may display the user-modified food-related information on the touch screen display 130.

As described above, the refrigerator 100 may collectively register foods stored in the storage chamber 110. Furthermore, the refrigerator 100 may modify the food-related information according to an input from the user.

Figure 40:
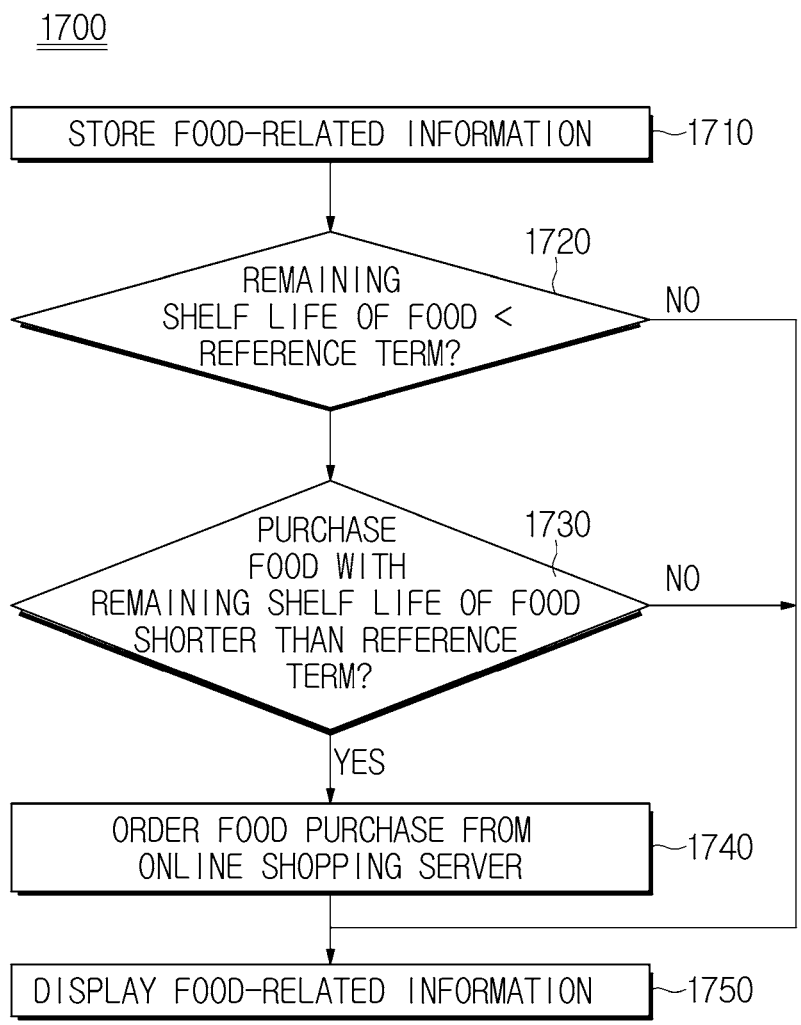
FIG. 40 is a flowchart illustrating a food identification method of a food management system, according to an embodiment.
Figure 41:
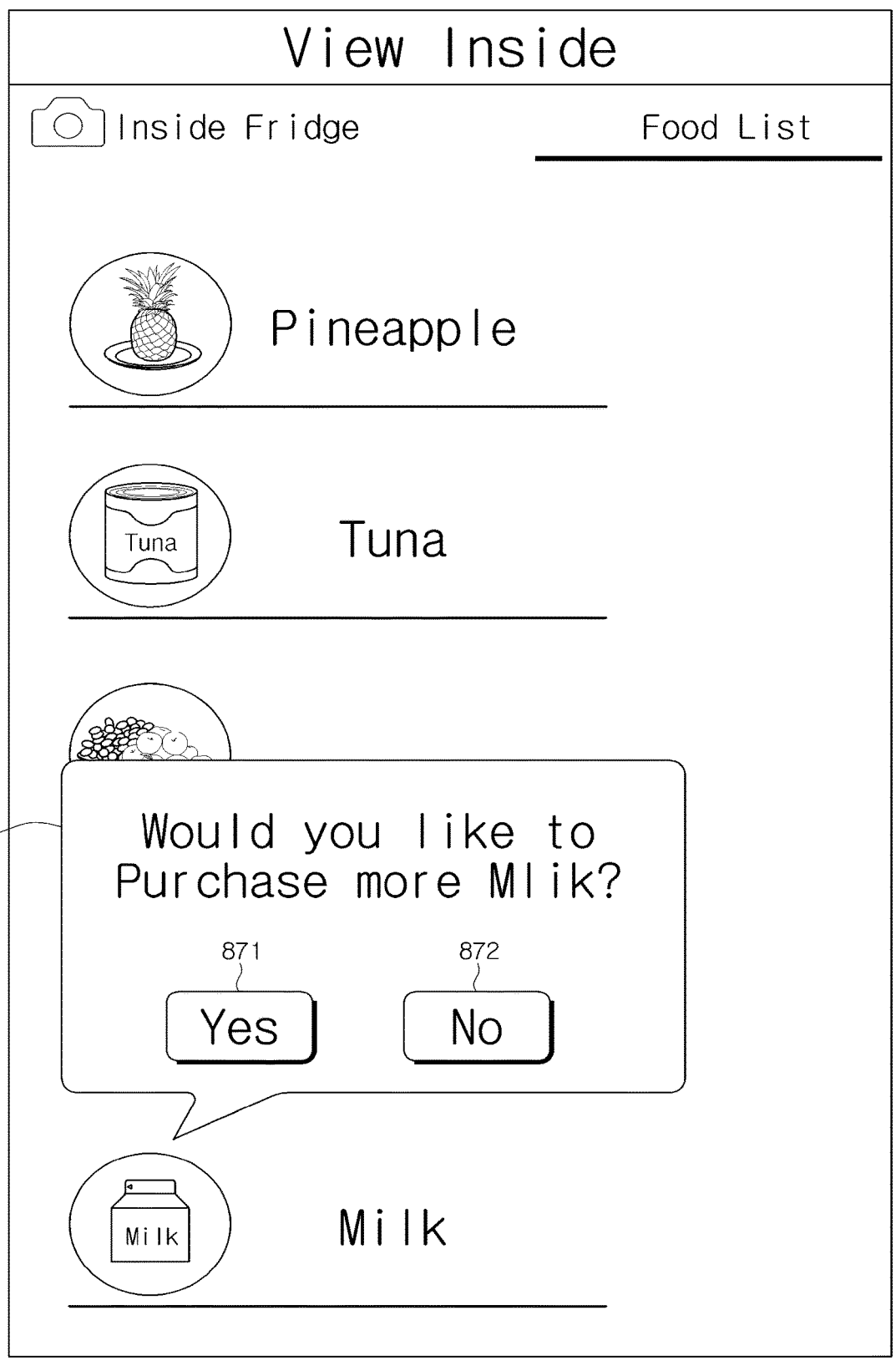
FIG. 41 shows an example of purchasing a food according to the food identification method shown in FIG. 40.

FIG. 40 is a flowchart illustrating a food identification method of a food management system, according to an embodiment. FIG. 41 shows an example of purchasing a food according to the food identification method shown in FIG. 40.

A food management method 1700 of the food management system 1 will be described in connection with FIGS. 40 and 41.

The refrigerator 100 stores information relating to a food stored in the storage chamber 110, in 1710.

The refrigerator 100 may capture and send an image of the inside of the storage chamber 110 to the computing apparatus 200. The computing apparatus 200 may use the object identification engine 231 to identify a food from the inside image of the storage chamber 110, and send information relating to the identified food to the refrigerator 100. The refrigerator 100 may receive the information relating to a food stored in the storage chamber 110 from the computing apparatus 200 and store the received food-related information. For example, the food-related information may include an image, e.g., location of the food image in the storage chamber inside image, name, category, and shelf life for refrigeration (or freezing) of the food.

Furthermore, the refrigerator 100 may capture an image of the inside of the storage chamber 110 and identify a food from the captured inside image of the storage chamber 110. The refrigerator 100 may store the information relating to the identified food.

The refrigerator 100 determines whether a remaining shelf life of the food is shorter than a reference term, in 1720.

The controller 190 may compute the remaining shelf life based on a date when the food is stored, current date, and the shelf life for refrigeration (or freezing) of the food from the food-related information, and compare the remaining shelf life and the reference term. The reference term is a term to warn expiration of the shelf life for refrigeration (or freezing) of the food and recommend consumption of the food, which may be set in advance by the designer or adjusted ex post by the user.

When the remaining shelf life of the food is shorter than the reference term in 1720, the refrigerator 100 determines whether to purchase the food with the remaining shelf life shorter than the reference term, in 1730.

The controller 190 may determine whether to purchase the food according to a user input.

For example, as shown in FIG. 41, the controller 190 may display a food purchase window 870 to purchase a food with the remaining shelf life shorter than the reference term. The food purchase window 870 may display information relating to the food with the remaining shelf life shorter than the reference term, and include a confirm button (yes) 871 to purchase the food and a cancel button (no) 872 to cancel purchasing the food.

When it is determined to purchase the food in 1730, the refrigerator 100 orders a food purchase from an online shopping server, in 1740.

Upon receiving the user input to permit a purchase of the food with the remaining shelf life shorter than the reference term, the controller 190 may access the online shopping server over the communication network NET. Furthermore, the controller 190 may order the food purchase from the online shopping server and pay for the food using a payment method set in advance by the user.

When it is determined that the remaining shelf life of the food is not shorter than the reference term in 1720 or it is determined not to purchase the food in 1730 or after the food is purchased, the refrigerator 100 displays information relating to the food in 1750.

The controller 190 may display the food-related information on the touch screen splay 130. For example, when the food is purchased, the controller 190 may display information relating to the purchased food.

As described above, the refrigerator 100 may provide the user with information relating to a food purchase based on the food-related information, and the user may purchase a food with a shelf life whose expiry draws near according to the user input.

Figure 42:
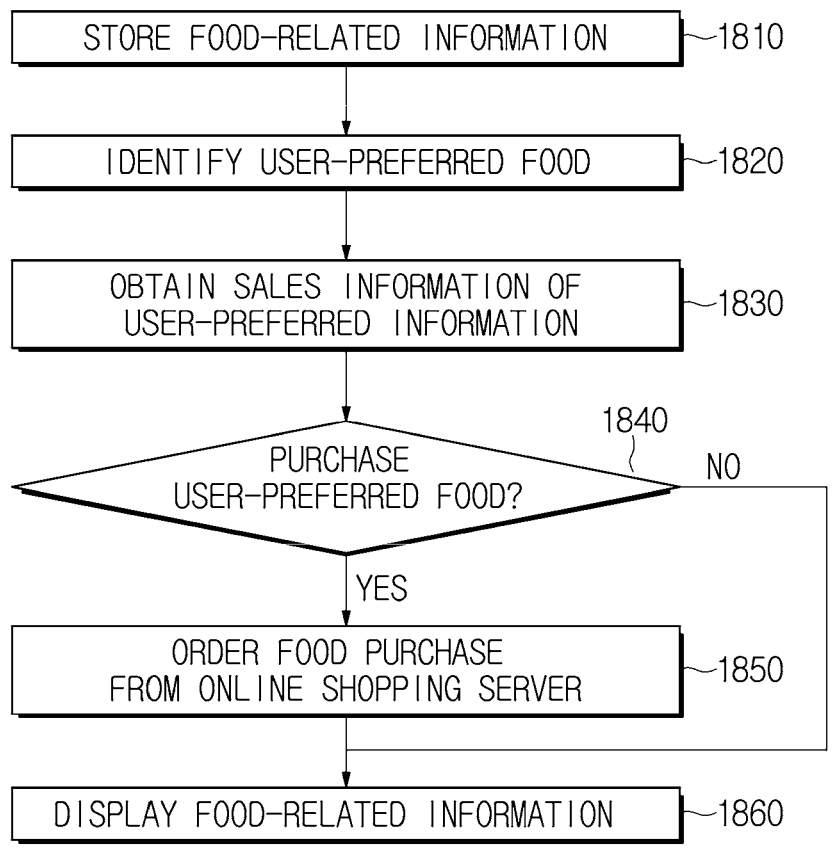
FIG. 42 is a flowchart illustrating a food management method of a food management system, according to an embodiment.

FIG. 42 is a flowchart illustrating a food management method for a food management system, according to an embodiment.

A food management method 1800 of the food management system 1 will be described in connection with FIG. 42.

The refrigerator 100 stores information relating to a food stored in the storage chamber 110, in 1810.

Operation 1810 may be the same as operation 1710.

The refrigerator 100 identifies a preferred food, in 1820.

The controller 190 may store information relating to a new food when the new food is stored in the storage chamber 110, and collect information relating to a food when the food is taken out from the storage chamber 110.

The controller 190 may analyze a purchasing pattern of buying the same (or similar) food and a consuming pattern of consuming a food, based on the information relating to the stored food and information relating to the food taken out. Furthermore, the controller 190 may identify a user-preferred food based on the purchasing pattern and consuming pattern of food.

The refrigerator 100 obtains sales information of the user-preferred food, in 1830.

The controller 190 may request and receive the sales information of the user-preferred food from an online shopping server over the communication network NET. For example, the sales information may include price information, discount information, and inventory information of the user-preferred food.

The refrigerator 100 determines whether to purchase the user-preferred food, in 1840.

The controller 190 may determine whether to purchase the food according to a user input. For example, the controller 190 may display the sales information of the user-preferred food on the touch screen display 130 and receive a user input about purchasing the user-preferred food through the touch screen display 130.

When it is determined to purchase the food in 1840, the refrigerator 100 orders a food purchase from the online shopping server, in 1850.

Operation 1850 may be the same as operation 1740.

When it is determined not to purchase the user-preferred food in 1850 or after the food is purchased, the refrigerator 100 displays information relating to the food in 1860.

The controller 190 may display the food-related information on the touch screen splay 130. For example, when the food is purchased, the controller 190 may display information relating to the purchased food.

As described above, the refrigerator 100 may provide the user with information relating to a food purchase based on logs of storing and taking out of a food, and the user may purchase the user-preferred food according to the user input.

Figure 43:
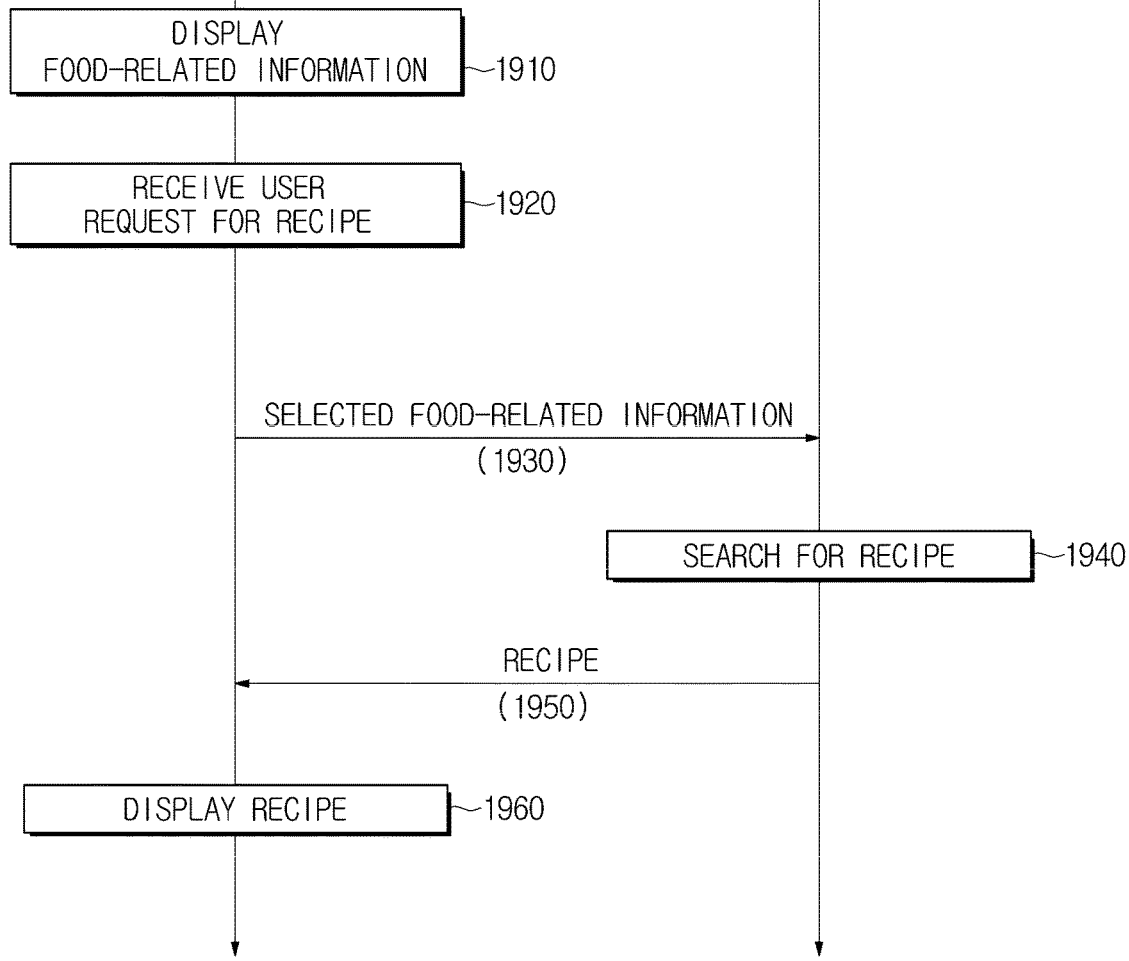
FIG. 43 is a flowchart of a method of providing a recipe by a food management system, according to an embodiment.
Figure 44:
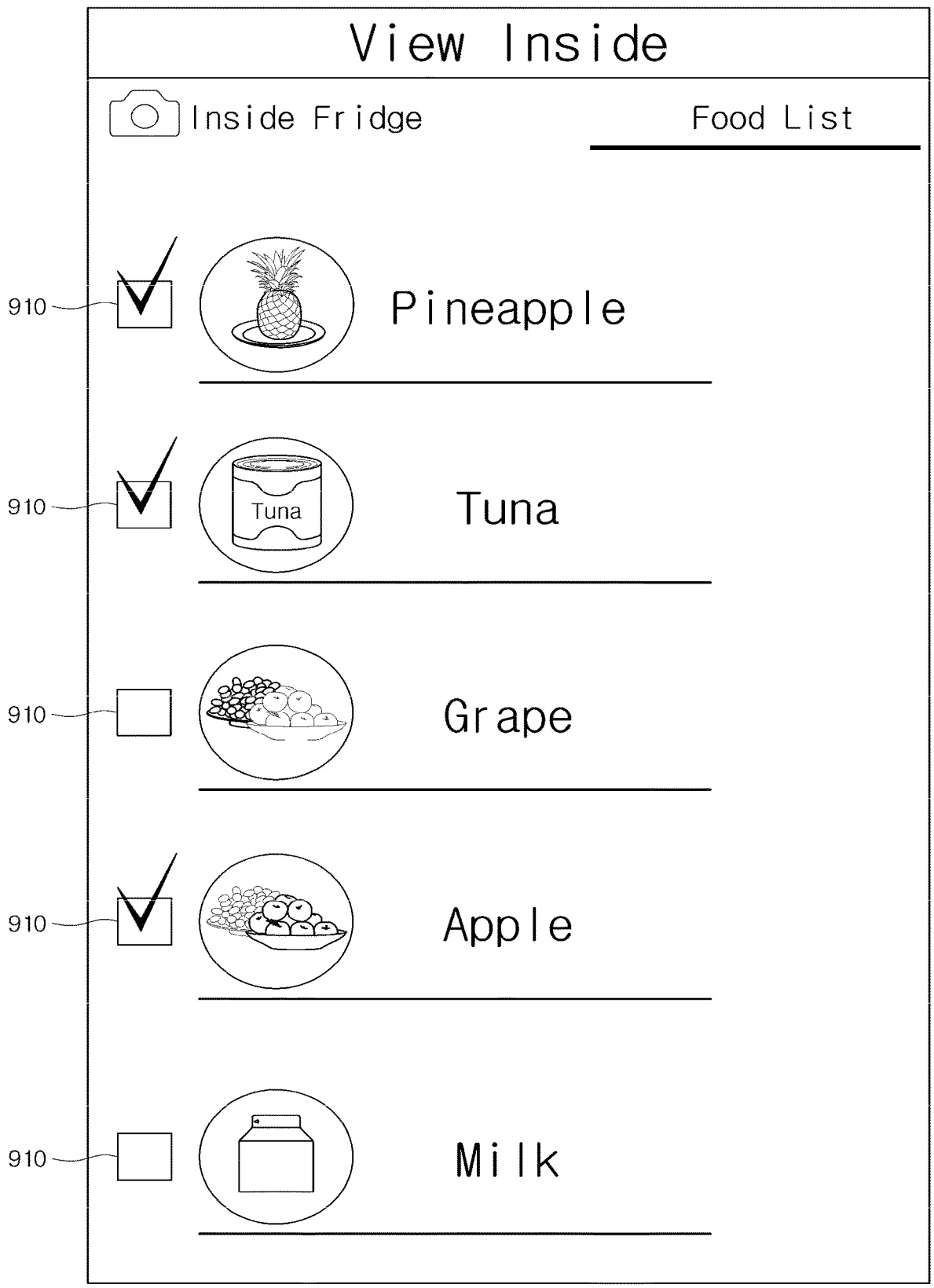
FIGS. 44 and 45 show an example of providing a recipe according to the method of providing a recipe shown in FIG. 43.
Figure 45:
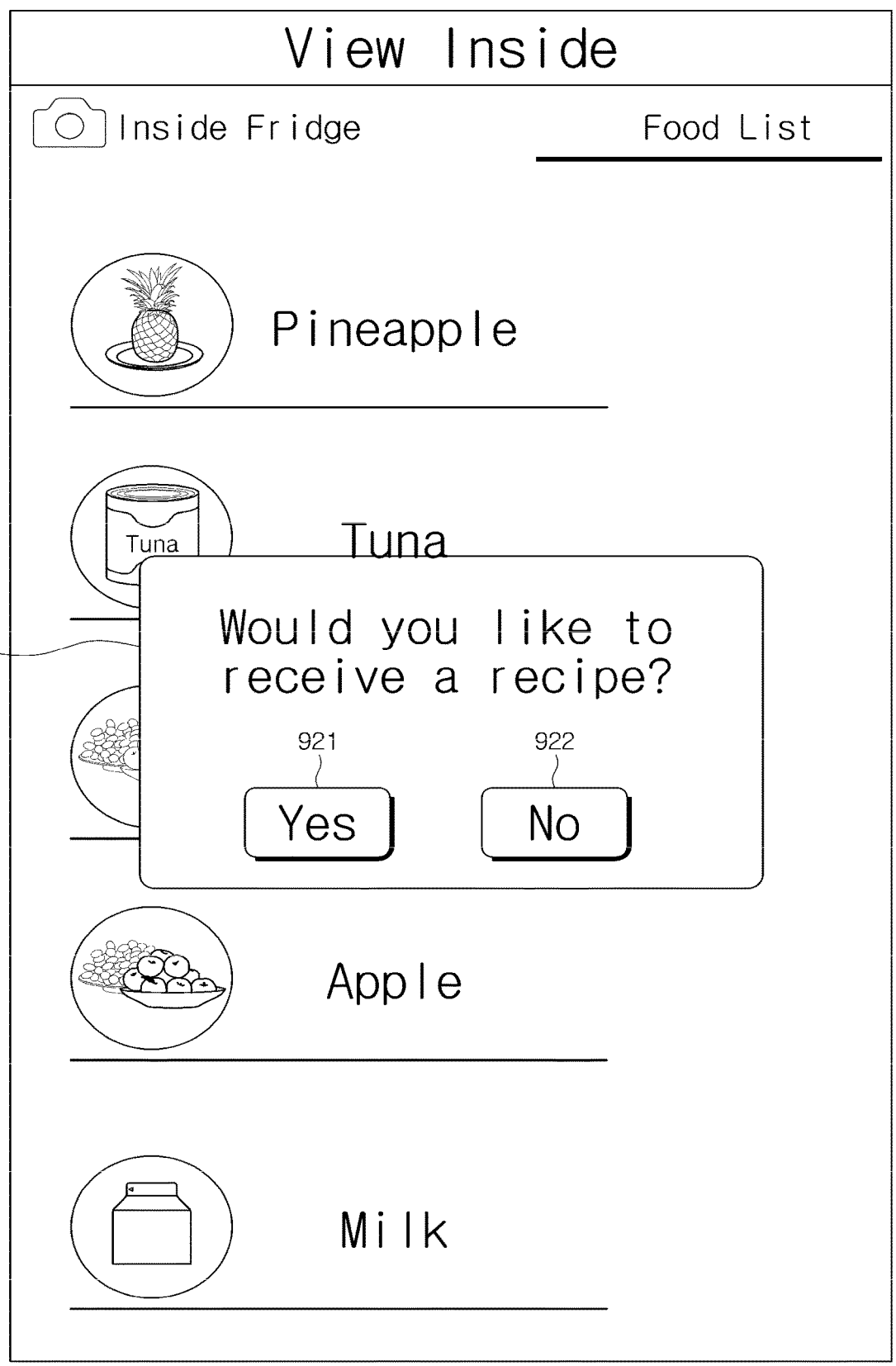
Figure 46:
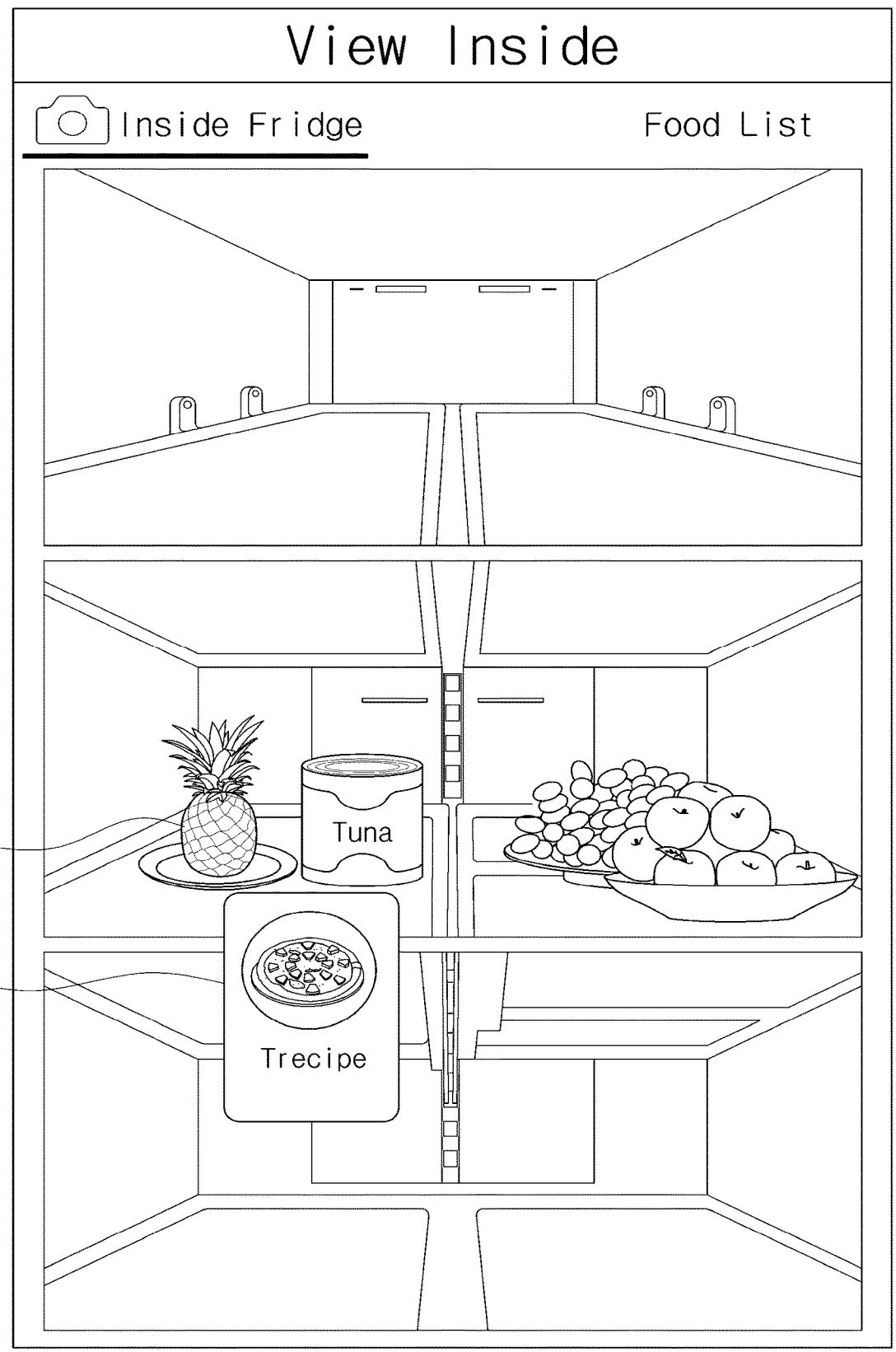
FIG. 46 shows another example of providing a recipe according to the method of providing a recipe shown in FIG. 43.

FIG. 43 is a flowchart of a method of providing a recipe by a food management system, according to another embodiment. FIGS. 44 and 45 show an example of providing a recipe according to the method of providing a recipe shown in FIG. 43. FIG. 46 shows another example of providing a recipe according to the method of providing a recipe shown in FIG. 43.

A recipe providing method 1900 of the food management system 1 will be described in connection with FIGS. 43, 44, 45 and 46.

The refrigerator 100 displays information relating to a food stored in the storage chamber 110, in 1910.

Operation 1910 may be the same as operation 1310.

The refrigerator 100 receives a request for a recipe from the user, in 1920.

The user may choose at last some of the food-related information displayed on the touch screen display 130 and request a recipe containing a food related to the selected information.

For example, the controller 190 may display food-related information and check boxes 910 to select the food-related information, as shown in FIG. 44. Furthermore, the controller 190 may display a recipe request window 920 to request a recipe, as shown in FIG. 45, and the recipe request window 920 may include a request button (yes) 921 and a cancel button (no) 922. When the user checks some of the check boxes 910 of the food-related information and touches the request button 921, the refrigerator 100 may receive a request for a recipe containing the checked food(s).

In another example, the controller 190 may display an inside image of the storage chamber 110 on the touch screen display 130, and receive a request for a recipe from the user through the touch screen display 130. As shown in FIG. 46, when the user touches a food image 911 for a long time, the controller 190 may display a recipe request pop-up 912. When the user touches the recipe request pop-up 912, the controller 190 may receive a request for a recipe containing the food in the food image 911.

The refrigerator 100 sends the food-related information selected by the user and the request for the recipe to the computing apparatus 200, and the computing apparatus 200 receives the food-related information and the request for the recipe from the refrigerator 100, in 1930.

The computing apparatus 200 searches for a recipe containing a food (or foods) selected by the user, in 1940.

The processing device 240 may retrieve a recipe stored in the storage 230 or request a recipe from other servers over the communication network NET, and obtain the recipe containing the food selected by the user.

The computing apparatus 200 sends information about the recipe to the refrigerator 100, and the refrigerator 100 receives the information about the recipe from the computing apparatus 200, in 1950.

The refrigerator 100 displays the recipe received from the computing apparatus 200, in 1960.

The controller 190 may display the recipe containing the food selected by the user on the touch screen display 130.

As described above, the refrigerator 100 may provide the user with a recipe containing the food selected by the user.

Figure 47:
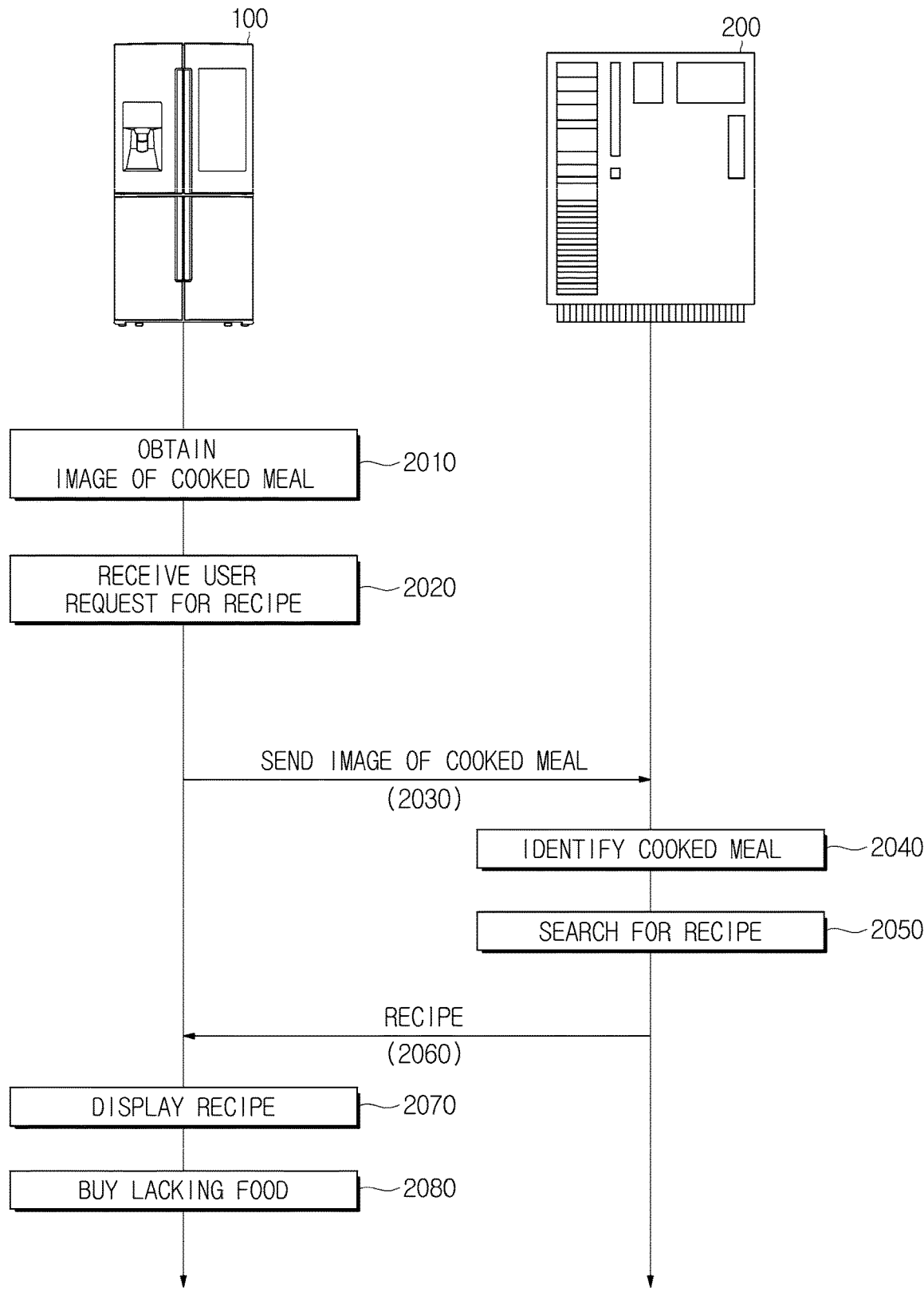
FIG. 47 is a flowchart of a method of providing a recipe by a food management system, according to another embodiment.
Figure 48:
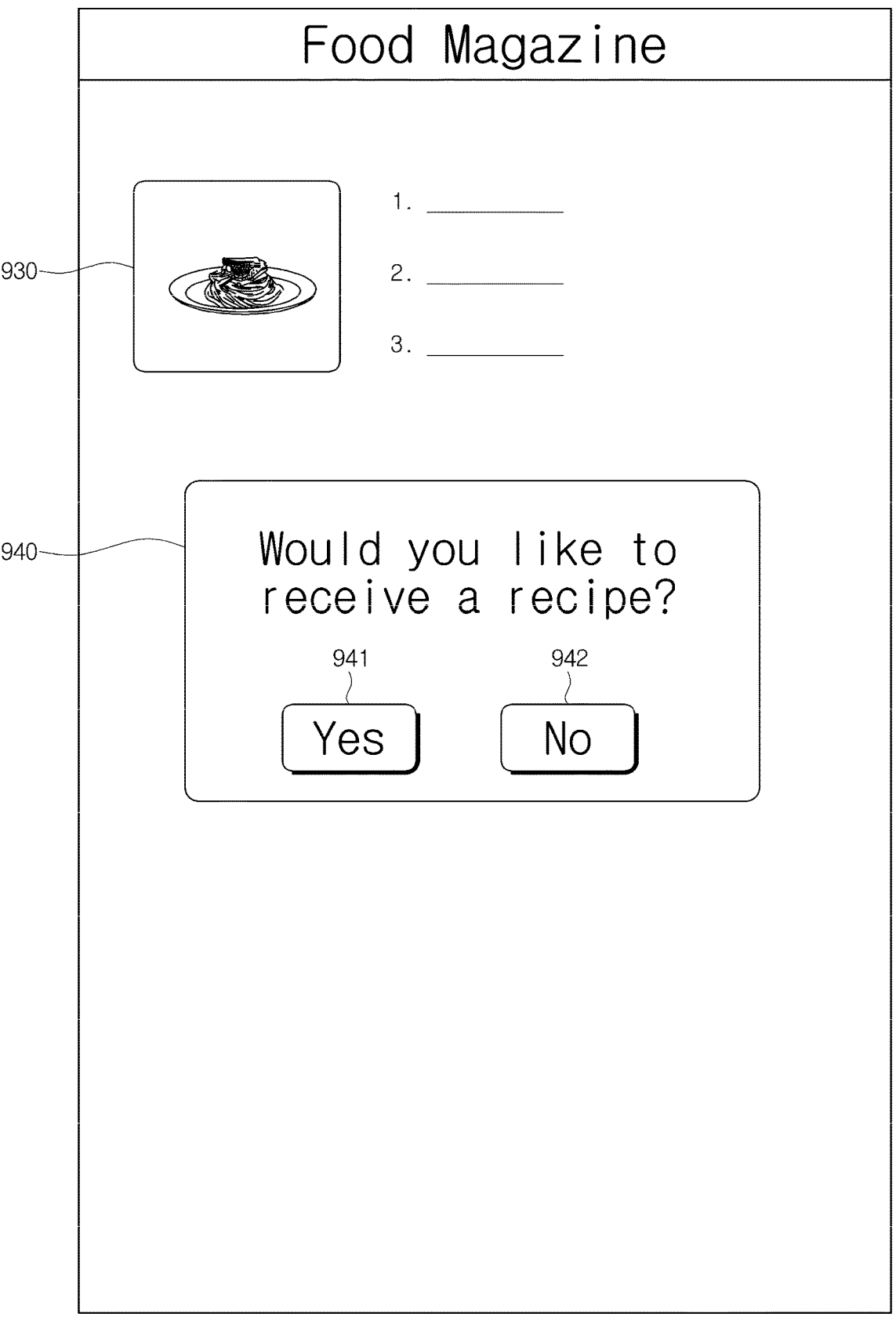
Figure 49:
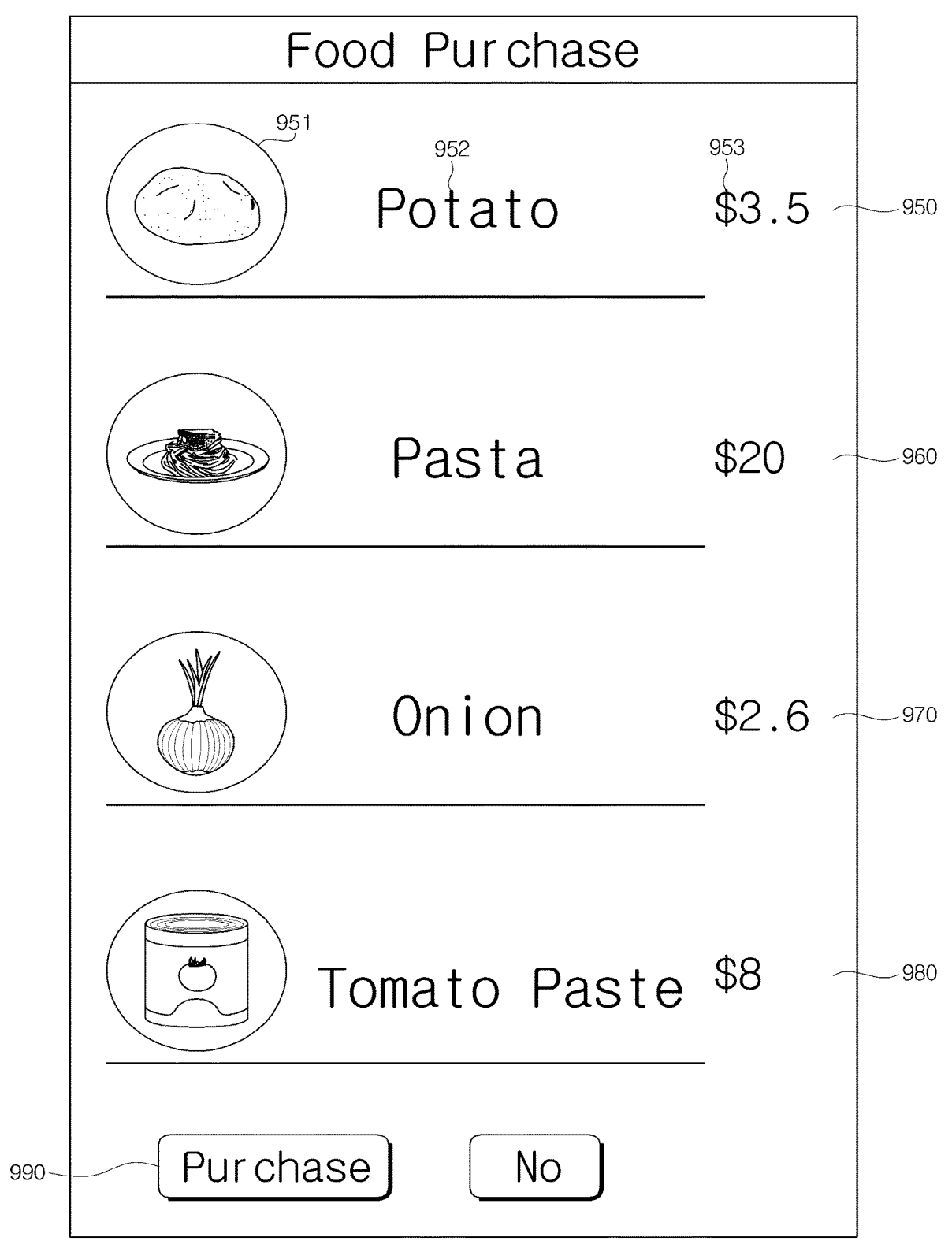

FIG. 47 is a flowchart of a method of providing a recipe by a food management system, according to another embodiment. FIGS. 48 and 49 show an example of providing a recipe according to the method of providing a recipe shown in FIG. 39.

A recipe providing method 2000 of the food management system 1 will be described in connection with FIGS. 47, 48, and 49.

The refrigerator 100 obtains an image of a cooked meal 930, in 2010.

The refrigerator 100 may obtain the image of a cooked meal 930 automatically or from the user.

For example, the controller 190 may access the communication network NET through the communicator 170 in response to a user input, and receive the image of a cooked meal 930 from another device connected to the communication network NET. Furthermore, the controller 190 may capture an image of the inside of the storage chamber 110 with the camera 150, and obtain the image of a cooked meal 930 stored in the storage chamber 110.

The refrigerator 100 receives a request for a recipe from the user, in 2020. The user may request a recipe to cook the meal contained in the image of a cooked meal 930.

For example, the controller 190 may display the image of a cooked meal 930, and a recipe request window 940 to request a recipe, as shown in FIG. 48. The recipe request window 940 may include a request button (yes) 941 and a cancel button (no) 942. When the user touches the request button 941, the refrigerator 100 may receive a request for a recipe for the image of a cooked meal 930.

The refrigerator 100 sends the image of a cooked meal 930 and the recipe request to the computing apparatus 200, and the computing apparatus 200 receives the image of a cooked meal 930 and the recipe request from the refrigerator 100, in 2030.

The computing apparatus 200 identifies a cooked meal from the image of a cooked meal 930, in 2040.

The processing device 240 may use the trained object identification engine 231 to identify a cooked meal contained in the image of a cooked meal 930.

For example, the processing device 240 may include the object identification engine 231 that employs neural network. The processing device 240 may input a luminance value and/or a color value of each of the plurality of pixels included in the image of a cooked meal 930 to the neural network. Furthermore, the processing device 240 may identify a cooked meal from the image of a cooked meal 930 based on an output of the neural network.

The computing apparatus 200 searches for a recipe for the identified cooked meal, in 2050.

The processing device 240 may retrieve a recipe stored in the storage 230 or request a recipe from other servers over the communication network NET, and obtain the recipe for the identified cooked meal.

The computing apparatus 200 sends information about the recipe to the refrigerator 100, and the refrigerator 100 receives the information about the recipe from the computing apparatus 200, in 2060.

The refrigerator 100 displays the recipe received from the computing apparatus 200, in 2070.

The controller 190 may display the recipe containing the food selected by the user on the touch screen display 130.

The refrigerator 100 displays a lacking food, in 2080.

The controller 190 may compare a list of foods stored in the storage chamber 110 with a list of ingredients contained in the recipe received from the computing apparatus 200, and identify a food absent in the storage chamber 110 among the ingredients of the recipe.

The controller 190 may display the lacking food among the ingredients of the recipe on the touch screen splay 130. For example, the controller 190 may display a lacking food among ingredients of a pasta dish. The controller 190 may display information about potatoes 950, information about pasta noodles 960, information about onions 970, and information about tomato paste 980 on the touch screen display 130, as shown in FIG. 49.

Furthermore, the controller 190 may further display a purchase button 990 on the touch screen display 130 to buy the lacking food. When the user touches the purchase button 990, the controller 190 may order the food purchase from an online shopping server and pay for the food using a payment method set in advance by the user.

As described above, the computing apparatus 200 may identify a cooked meal from an image of a cooked meal 930 received from the refrigerator 100 and search for a recipe of the cooked meal. Furthermore, the refrigerator 100 may receive the recipe of the cooked meal from the computing apparatus 200, and purchase a lacking food among ingredients contained in the recipe.

As described above, the display apparatus 100 may control a local scattering rate of the electro-optical layer 231 in order to perform local dimming.

Meanwhile, the disclosed embodiments may be implemented in the form of a recording medium that stores instructions executable by a computer. The instructions may be stored in the form of a program code, and when executed by a processor, may generate program modules to perform operations of the disclosed embodiments. The recording medium may be embodied as a computer-readable recording medium.

The computer-readable recording medium includes all kinds of recording media storing instructions that can be read by a computer. For example, there may be read only memory (ROM), random access memory (RAM), a magnetic tape, a magnetic disk, flash memory, and an optical data storage device.

As described above, the disclosed embodiments have been described with reference to the accompanying drawings. Those of ordinary skill in the art to which the posted embodiments belong will understand that they may be practiced in different forms from the disclosed embodiments without changing the technical spirit or essential features of the posted embodiments. The disclosed embodiments are illustrative and should not be construed as limiting.

The invention claimed is:

1. A refrigerator comprising:
   a storage chamber;
   a camera provided in the storage chamber;
   a touch detection display;
   a communicator configured to communicate with an external device; and
   a controller configured to:
     control the camera to capture an image of an inside of the storage chamber,
     display the captured image of the storage chamber on the touch detection display,
     control the communicator to transmit the image to the external device,
     receive, from the external device through the communicator, identification information of foods identified based on a plurality of sample images which are extracted from the captured image, and a position of a respective sample image of the plurality of sample images, each of the plurality of sample images being extracted with a predetermined size at an arbitrary position,
     receive a user's touch input on the touch detection display,
     based on comparing a position of the user's touch input with the position of the respective sample image, select a sample image corresponding to the user's touch input, and
     display identification information of a food identified based on the selected sample image on the touch detection display, the identification information of the food including a name of the food.

2. The refrigerator according to claim 1, wherein the controller is further configured to select the sample image having a minimum distance from the user's touch input among the plurality of sample images.

3. The refrigerator according to claim 2, wherein the controller is further configured to display the identification information of the food identified from the selected sample image on the touch detection display.

4. The refrigerator according to claim 3, wherein the controller is further configured to display the selected sample image, a name of the food identified from the selected sample image, and a storage period of the food identified from the selected sample image on the touch detection display.

5. The refrigerator according to claim 2,
   wherein the identification information of the food identified from the selected sample image comprises names of at least two foods, and
   wherein the controller is further configured to display at least two pieces of identification information on the touch detection display.

6. The refrigerator according to claim 5, wherein the controller is further configured to display any one identification information selected by the user among the at least two pieces of identification information on the touch detection display.

7. The refrigerator according to claim 1, wherein the controller is further configured to:
  receive correction of the identification information identified from the image from the user through the touch detection display, and
  transmit the correction of the identification information identified from the image to the external device.

8. A method of controlling a refrigerator, the refrigerator including a storage chamber, and a camera provided in the storage chamber, the method comprising:
  capturing an image of an inside of the storage chamber;
  displaying the captured image of the storage chamber on a touch detection display;
  transmitting the captured image to an external device;
  receiving, from the external device, identification information of foods identified based on a plurality of sample images, which are extracted from the captured image, and a position of a respective sample image of the plurality of sample images, each of the plurality of sample images being extracted with a predetermined size at an arbitrary position;
  receiving a user's touch input to the touch detection display
  based on comparing a position of the user's touch input with the position of the respective sample image, selecting a sample image corresponding to the user's touch input; and
  displaying identification information of a food identified based on the selected sample image on the touch detection display, the identification information of the food including a name of the food.

9. The method according to claim 8, wherein the selecting of the sample image corresponding to the user's touch input comprises:
  selecting the sample image having a minimum distance from the user's touch input among the plurality of sample images.

10. The method according to claim 9, wherein the displaying of the identification information on the touch detection display comprises:
  displaying the identification information of the food identified from the selected sample image on the touch detection display.

11. The method according to claim 10, further comprising:
  displaying the selected sample image, a name of the food identified from the selected sample image, and a storage period of the food identified from the selected sample image on the touch detection display.

12. The method according to claim 9,
  wherein the identification information of the food identified from the selected sample image comprises names of at least two foods, and
  wherein the displaying of the identification information on the touch detection display comprises:
    displaying at least two pieces of identification information on the touch detection display.

13. The method according to claim 12, wherein the displaying of the identification information on the touch detection display comprises:
  displaying any one identification information selected by the user among the at least two pieces of identification information on the touch detection display.

* * * * *